US010305110B2

(12) United States Patent
Umetsu et al.

(10) Patent No.: US 10,305,110 B2
(45) Date of Patent: May 28, 2019

(54) NONAQUEOUS LITHIUM-TYPE POWER STORAGE ELEMENT

(71) Applicant: Asahi Kasei Kabushiki Kaisha, Tokyo (JP)

(72) Inventors: Kazuteru Umetsu, Tokyo (JP); Yuichiro Hirakawa, Tokyo (JP); Yuima Kimura, Tokyo (JP); Hitoshi Morita, Tokyo (JP); Nobuhiro Okada, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/761,084

(22) PCT Filed: Jan. 20, 2017

(86) PCT No.: PCT/JP2017/002010
§ 371 (c)(1),
(2) Date: Mar. 16, 2018

(87) PCT Pub. No.: WO2017/126690
PCT Pub. Date: Jul. 27, 2017

(65) Prior Publication Data
US 2018/0269486 A1 Sep. 20, 2018

(30) Foreign Application Priority Data

Jan. 22, 2016 (JP) .................. 2016-010895
Aug. 8, 2016 (JP) .................. 2016-155394
Sep. 30, 2016 (JP) .................. 2016-192504
Sep. 30, 2016 (JP) .................. 2016-192546

(51) Int. Cl.
*H01G 11/50* (2013.01)
*H01M 4/62* (2006.01)
*H01G 11/06* (2013.01)
*H01G 11/24* (2013.01)
*H01G 11/30* (2013.01)
*H01G 11/64* (2013.01)
*H01M 4/1393* (2010.01)
*H01M 10/052* (2010.01)
*H01M 10/0567* (2010.01)
*H01M 10/0585* (2010.01)
*H01G 11/28* (2013.01)
*H01G 11/32* (2013.01)
*H01G 11/52* (2013.01)
*H01G 11/60* (2013.01)
*H01G 11/62* (2013.01)
*H01M 4/587* (2010.01)
*H01M 4/66* (2006.01)
*H01M 10/0525* (2010.01)
*H01M 10/0568* (2010.01)
*H01M 10/0569* (2010.01)
*H01M 4/02* (2006.01)

(52) U.S. Cl.
CPC ............ *H01M 4/628* (2013.01); *H01G 11/06* (2013.01); *H01G 11/24* (2013.01); *H01G 11/28* (2013.01); *H01G 11/30* (2013.01); *H01G 11/32* (2013.01); *H01G 11/50* (2013.01); *H01G 11/52* (2013.01); *H01G 11/60* (2013.01); *H01G 11/62* (2013.01); *H01G 11/64* (2013.01); *H01M 4/1393* (2013.01); *H01M 4/587* (2013.01); *H01M 4/661* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 10/0585* (2013.01); *H01M 2004/021* (2013.01); *H01M 2004/028* (2013.01); *H01M 2300/0037* (2013.01); *Y02E 60/122* (2013.01); *Y02E 60/13* (2013.01); *Y02T 10/7011* (2013.01)

(58) Field of Classification Search
None
See application file for complete search history.

(56) References Cited

U.S. PATENT DOCUMENTS

| 5,427,875 | A | 6/1995 | Yamamoto et al. | |
|---|---|---|---|---|
| 5,702,843 | A | 12/1997 | Mitate et al. | |
| 5,928,812 | A | 7/1999 | Xue | |
| 7,105,251 | B2 * | 9/2006 | Miyaki | H01M 4/131 429/137 |
| 9,269,502 | B2 * | 2/2016 | Chang | H01G 11/24 |
| 9,640,335 | B2 * | 5/2017 | Tsukagoshi | H01M 4/137 |
| 2004/0126659 | A1 | 7/2004 | Graetz et al. | |

(Continued)

FOREIGN PATENT DOCUMENTS

| CN | 101641811 A | 2/2010 |
|---|---|---|
| EP | 2219247 A1 | 8/2010 |

(Continued)

OTHER PUBLICATIONS

International Preliminary Report on Patentability and Written Opinion issued in corresponding International Patent Application No. PCT/JP2017/002010 dated Jul. 24, 2018.

(Continued)

*Primary Examiner* — David M Sinclair
(74) *Attorney, Agent, or Firm* — Morgan, Lewis & Bockius LLP

(57) ABSTRACT

Provided is a nonaqueous lithium-type power storage element in which a lithium compound is included in positive electrode, wherein energy loss due to voltage decrease under high temperatures and high voltages is reduced, and the high-load charge and discharge cycle characteristics are exceptional.

41 Claims, No Drawings

(56) References Cited

U.S. PATENT DOCUMENTS

| | | | |
|---|---|---|---|
| 2005/0233218 A1 | 10/2005 | Ogawa et al. | |
| 2005/0271944 A1 | 12/2005 | Suhara et al. | |
| 2006/0105242 A1 | 5/2006 | Sato et al. | |
| 2006/0194114 A1 | 8/2006 | Saito | |
| 2007/0281216 A1 | 12/2007 | Petrat et al. | |
| 2010/0117031 A1 | 5/2010 | Akagi et al. | |
| 2010/0255377 A1 | 10/2010 | Tsubata et al. | |
| 2011/0039160 A1* | 2/2011 | Takahata | H01M 2/34 429/231.1 |
| 2011/0159382 A1 | 6/2011 | Matsui et al. | |
| 2011/0189548 A1* | 8/2011 | Xu | H01M 6/00 429/332 |
| 2012/0094177 A1 | 4/2012 | Honoki et al. | |
| 2012/0212186 A1 | 8/2012 | Fujii et al. | |
| 2014/0356709 A1* | 12/2014 | Arikawa | H01M 4/587 429/215 |
| 2017/0237127 A1* | 8/2017 | Ishikawa | H01M 4/667 429/234 |

FOREIGN PATENT DOCUMENTS

| | | | | |
|---|---|---|---|---|
| EP | 2485303 A1 | 8/2012 | | |
| JP | 01241811 A * | 9/1989 | | H01G 11/62 |
| JP | H04-328278 A | 11/1992 | | |
| JP | 2001-84998 A | 3/2001 | | |
| JP | 2001-126718 A | 5/2001 | | |
| JP | 2001-167767 A | 6/2001 | | |
| JP | 2004-014300 A | 1/2004 | | |
| JP | 2004-095188 A | 3/2004 | | |
| JP | 2008-171593 A | 7/2008 | | |
| JP | 2008-177263 A | 7/2008 | | |
| JP | 2008-181830 A | 8/2008 | | |
| JP | 2012-074467 A | 4/2012 | | |
| JP | 2012-212629 A | 11/2012 | | |
| JP | 5278467 B | 9/2013 | | |
| JP | 2014-199723 A | 10/2014 | | |
| JP | 2015-011943 A | 1/2015 | | |
| JP | 2016-012620 A | 1/2016 | | |
| WO | 2011/058748 A1 | 5/2011 | | |
| WO | 2016/006632 A1 | 1/2016 | | |

OTHER PUBLICATIONS

International Search Report issued in corresponding International Patent Application No. PCT/JP2017/002010 dated Apr. 18, 2017.
Office Action issued in corresponding Japanese Patent Application No. 2017-509054 dated Sep. 19, 2017.
Supplemental European Search Report issued in related European Patent Application No. 17741564.3 dated Nov. 23, 2018.

* cited by examiner

NONAQUEOUS LITHIUM-TYPE POWER STORAGE ELEMENT

TECHNICAL FIELD

The present invention relates to a nonaqueous lithium-type storage element.

BACKGROUND ART

In recent years, with an aim toward effective utilization of energy for greater environmental conservation and reduced usage of resources, a great deal of attention is being directed to a power smoothing system of wind power generation or a midnight power storage system, a household dispersive power storage system based on solar power generation technology, a power storage system for electric vehicles, etc.

The number one requirement for cells used in these power storage systems is high energy density. Development of a lithium ion battery is advancing at a rapid pace, as an effective strategy for cells with high energy density that can meet such requirement.

The second requirement is high output characteristic. A high power discharging characteristics in the power storage system is required for the power storage system during acceleration, for example, in a combination of a highly efficient engine and the power storage system (for example, a hybrid electric vehicle), or a combination of a fuel cell and the power storage system (for example, a fuel cell electric vehicle).

An electric double layer capacitor, a nickel-hydrogen battery, etc. are currently under development as a high power storage device.

Electric double layer capacitors that employ activated carbon in an electrode has the output characteristics of about 0.5 to 1 kW/L. This electric double layer capacitor has been considered to be the most suitable device for fields requiring the high power, since it has not only high power characteristics but also high durability (cycle characteristics and high temperature storage characteristics). However, energy density thereof is only about 1 to 5 Wh/L. Accordingly, even higher energy density is necessary.

On the other hand, the nickel-hydrogen battery, which has been employed in current hybrid electric vehicles, has high power equivalent to that of the electric double layer capacitor, and has an energy density of about 160 Wh/L. However, research is being actively pursued toward further increasing their energy density and output characteristics, and increasing their durability (particularly, stability at high temperature).

Research is also advancing toward increased output in the lithium ion battery as well. For example, such a lithium ion battery are being developed that is capable of providing a high power of over 3 kW/L at 50% depth of discharge (value showing a state of what % of discharge capacitance of the storage element was discharged). However, it is designed to dare to suppress high energy density, which is the largest characteristics of the lithium ion battery, because energy density thereof is equal to or lower than 100 Wh/L. Durability (cycle characteristics and high temperature storage characteristics) thereof is inferior as compared with the electric double layer capacitor. Accordingly, such a lithium ion battery is used only in a narrower range than a depth of discharge range of 0 to 100%, to hold practical durability. Research is advancing at a rapid pace toward further increased durability, because practically usable capacitance is considered to be further decreased.

There is strong demand for implementation of the storage element exhibiting high energy density, high power characteristics and durability. However, each of these existing storage elements has its advantages and disadvantages. Accordingly, a new storage element satisfying these technological requirements has been required. The storage element known as a lithium ion capacitor are getting a lot of attention and being actively developed as a promising candidate.

The lithium ion capacitor is a storage element using a nonaqueous electrolytic solution containing a lithium salt (hereafter it may also be referred to as "nonaqueous lithium-type storage element"). It is a storage element which carries out charging and discharging by: non-Faraday reaction based on adsorption/desorption of anions, similar to an electric double layer capacitor, at about 3 V or higher, at the positive electrode; and Faraday reaction based on occlusion/releasing of lithium ions, similar to a lithium ion battery, at the negative electrode.

As for the electrode materials used in the storage elements, and characteristics thereof, in general, in the case where an activated carbon, etc., is used as a material for an electrode, and charging and discharging are carried out by adsorption/desorption (non-Faraday reaction) of ions at the surface of activated carbon, a high power as well as high durability are achieved, but an energy density decreases (for example, assuming it is 1). On the other hand, in the case where an oxide or a carbon material is used as a material for the electrode, and charging and discharging are carried out by Faraday reaction, an energy density is increased (for example, assuming it is ten times larger than that is achieved by non-Faraday reaction, using activated carbon), but there is a problem in their durability and output characteristics.

The electric double layer capacitor is characterized in that, among the above electrode materials, an activated carbon (having 1 energy density) is used in a positive electrode and a negative electrode, and charging and discharging are carried out by non-Faraday reaction at both of the positive and negative electrodes, and therefore it has low energy density (1 at the positive electrode×1 at the negative electrode=1), although it has a high power, as well as high durability.

The lithium ion secondary battery is characterized in that a lithium transition metal oxide (having 10 energy density) is used in a positive electrode, and a carbon material (having 10 energy density) is used in a negative electrode, and charging and discharging are carried out by Faraday reaction at both the positive and negative electrodes, and therefore it has high energy density (10 at the positive electrode×10 at the negative electrode=100), but it has a problem in their output characteristics and durability. Furthermore, a depth of discharge is limited in order to achieve a high durability, which is required for hybrid electric vehicles, and energy can be used in a lithium ion secondary battery is only 10 to 50% thereof.

The lithium ion capacitor is a asymmetric capacitor characterized in that an activated carbon (having one energy density) is used in a positive electrode, and a carbon material (having ten energy density) is used in a negative electrode, and charging and discharging are carried out by non-Faraday reaction at the positive electrode, and by Faraday reaction at the negative electrode, and therefore it has characteristics of both the electric double layer capacitor and the lithium ion capacitor. Further, the lithium ion capacitor is characterized in having a high energy density (1 at the positive electrode× 10 at the negative electrode=10), although it has a high power and high durability, and different from the lithium ion secondary battery, a depth of discharge is not necessarily limited.

PATENT LITERATURE (PTL) 1 proposes a lithium ion secondary battery using a positive electrode comprising lithium carbonate in a positive electrode, and having a current shutdown mechanism that works in response to increase of an inner pressure of the battery. PTL 2 proposes a lithium ion secondary battery using a lithium composite oxide, such as lithium manganate, etc., as a positive electrode, wherein an elution of manganese is reduced by adding lithium carbonate in a positive electrode. PTL 3 proposes a method for recovering a capacitance of a deteriorated storage element, by oxidation of various kinds of lithium compounds, as materials to be oxidized, at a positive electrode. PTL 4 proposes a method for preventing a capacitance from decrease during charging and discharging cycles, and increasing an initial capacitance, by adding lithium carbonate to a composite oxide containing lithium and nickel in a positive electrode.

CITATION LIST

Patent Literature

[PTL 1] JP-A-4-328278
[PTL 2] JP-A-2001-167767
[PTL 3] JP-B-5278467
[PTL 4] JP-A-2001-84998

DISCLOSURE OF THE INVENTION

Problems to be Solved by the Invention

These conventional methods, however, do not mention an energy loss due to voltage reduction of the storage element under a high temperature, or an increase in resistance by decomposition of the lithium compound in the positive electrode. Therefore they have further room for improvement on charging and discharging cycle characteristics under high load, and durability at high temperature.

The present invention has been achieved based on the above back grounds. Accordingly, in one embodiment, one of the problems to be solved by the present invention is to provide a nonaqueous lithium-type storage element containing lithium compound in a positive electrode, wherein an energy loss due to voltage reduction under high temperature and high voltage is decreased, and charging and discharging cycle characteristics under high load is superior. In one embodiment, one of the problems to be solved by the present invention is to provide a nonaqueous lithium-type storage element, exhibiting high I/O characteristic, superior charging and discharging cycle characteristics under high load, and storage durability at high temperature.

Means for Solving the Problems

The present invention has been proposed based on the above knowledge. Accordingly, the present invention has the following features.

[1] A nonaqueous lithium-type storage element, comprising a positive electrode containing a lithium compound other than a positive electrode active material, a negative electrode, a separator, and a nonaqueous electrolytic solution containing lithium ions,
wherein the positive electrode comprises a positive electrode power collector, and a positive electrode active material layer located at one surface or both surfaces of the positive electrode power collector, and containing the positive electrode active material,
the negative electrode comprises a negative electrode power collector, and a negative electrode active material layer located at one surface or both surfaces of the negative electrode power collector, and containing the negative electrode active material,

[7] The nonaqueous lithium-type storage element according to any one of the items 1 to 6, wherein (h) Fe/F is 1.01 or higher,
where Fe (F) is static capacitance after carrying out charging and discharging cycle 60,000 times under an environmental temperature of 25° C., a cell voltage of from 2.2 V to 3.8 V, a rate of an electric current value of 200C, and subsequently carrying out charging under a constant voltage of 4.5 V for 1 hour, and F (F) is static capacitance before the charging and discharging cycle, for the nonaqueous lithium-type storage element.

[8] The nonaqueous lithium-type storage element according to any one of the items 1 to 7, using a positive electrode precursor comprising the positive electrode active material layer containing the positive electrode active material containing activated carbon, and the lithium compound other than the positive electrode active material, wherein $20 \leq C_0 \leq 1300$ ppm, where $C_0$ (ppm) is concentration of Na and/or K element contained in the positive electrode active material layer of the positive electrode precursor; $8.0 \leq D_0 \leq 50.0$, where $D_0$ (g/m$^2$) is basis weight of the lithium compound other than the positive electrode active material contained in the positive electrode active material layer, per one surface of the positive electrode precursor; $10 \leq E_0 \leq 100$, $0.2 \leq C_0/D_0 \leq 38$, and $0.1 \leq C_0/E_0 \leq b$ 7.2,
where $E_0$ (g/m$^2$) is basis weight of the positive electrode active material contained in the positive electrode active material layer, per one surface of the positive electrode precursor.

[9] The nonaqueous lithium-type storage element according to any one of the items 1 to 8, wherein $1.00 \leq C_1/C_2 \leq 15.00$,
where $C_1$(ppm) is concentration of Na and/or K element contained in the negative electrode active material layer, and $C_2$(ppm) is concentration of Na and/or K element contained in the electrolytic solution,
the lithium compound is one or more compounds selected from lithium carbonate, lithium oxide, lithium hydroxide, lithium fluoride, lithium chloride, lithium bromide, lithium iodide, lithium nitride, lithium oxalate, and lithium acetate, $0.1 \mu m \leq X_1 \leq 1 \mu m$, wherein $X_1$ is average particle diameter of the lithium compound, $2 \mu m \leq Y_1 \leq 20 \mu m$, and $X_1 < Y_1$, where $Y_1$ is average particle diameter of the positive electrode active material, and an amount of the lithium compound contained in the positive electrode is 1% by weight to 50% by weight, based on the total weight of the positive electrode active material layer.

[10] The nonaqueous lithium-type storage element according to the item 9, wherein an amount of lithium, calculated from an area of peaks in -40 ppm to 40 ppm, in a solid $^7$Li-NMR spectrum of the positive electrode active material layer, is $10.0 \times 10^{-4}$ mol/g to $300 \times 10^{-4}$ mol/g.

[11] The nonaqueous lithium-type storage element according to the item 9 or 10, wherein the nonaqueous electrolytic solution contains at least one organic solvent selected from ethylene carbonate, propylene carbonate, butylene carbonate, vinylene carbonate and fluoroethylene carbonate.

[12] The nonaqueous lithium-type storage element according to any one of the items 9 to 11, wherein the nonaqueous electrolytic solution contains at least one of $LiPF_6$ and $LiBF_4$.
[13] The nonaqueous lithium-type storage element according to any one of the items 9 to 12, wherein concentration of $LiN(SO_2F)_2$ in the nonaqueous electrolytic solution is 0.3 mol/L to 1.5 mol/L, based on the total amount of the nonaqueous electrolytic solution.
[14] The nonaqueous lithium-type storage element according to any one of the items 9 to 13, wherein the positive electrode power collector and the negative electrode power collector are metal foils not having through holes.
[15] The nonaqueous lithium-type storage element according to any one of the items 9 to 14, wherein
(a) Ra·F, that is product of Ra and F, is 0.3 to 3.0,
(b) E/V is 15 to 50,
where Ra($\Omega$) is initial inner resistance at a cell voltage of 4 V, F(F) is static capacitance, E(Wh) is electric energy, and V(L) is volume of a casing containing an electrode laminated body, in the nonaqueous lithium-type storage element according to any one of the items 9 to 14.
[16] The nonaqueous lithium-type storage element according to any one of the items 9 to 15, wherein
(e) Rd/Ra is 0.9 to 3.0,
(g) Re/Ra is 0.9 to 2.0
where Ra ($\Omega$) is initial inner resistance at a cell voltage of 4 V, F (F) is static capacitance, Rd($\Omega$) is inner resistance at 25° C., after storage for 2 months at a cell voltage of 4 V and an environmental temperature of 60° C., and Re($\Omega$) is inner resistance after carrying out charging and discharging cycle 60,000 times under an environmental temperature of 25° C., a cell voltage of from 2.2 V to 3.8 V, and a rate of 300C, in the nonaqueous lithium-type storage element according to any one of the items 9 to 15.
[17] The nonaqueous lithium-type storage element according to any one of the items 1 to 16, wherein
the negative electrode active material contains a carbon material, which is capable of intercalating/releasing lithium ions,
the positive electrode active material contains activated carbon,
the positive electrode contains the lithium compound other than the positive electrode active material in an amount of 1% to 50% by weight, based on the total weight of the positive electrode active material layer,
Al concentration of the nonaqueous electrolytic solution is 1 ppm to 300 ppm.
[18] The nonaqueous lithium-type storage element according to the item 7, wherein the nonaqueous electrolytic solution further contains a lithium salt of
(A) at least one of $LiPF_6$ and $LiBF_4$; as well as
(B) at least one of $LiN(SO_2F)_2$, $LiN(SO_2CF_3)_2$, and $LiN(SO_2C_2F_5)_2$.
[19] The nonaqueous lithium-type storage element according to the item 18, wherein molar concentration ratio $M_A/(M_A+M_B)$ is in a range of from 1/10 to 9/10, where $M_A$ (mol/L) is the total molar concentration of the (A), and $M_B$ (mol/L) is the total molar concentration of the (B), based on the total amount of the nonaqeous electrolytic solution.
[20] The nonaqueous lithium-type storage element according to the item 19, wherein molar concentration ratio $M_A/M_B$ of the lithium salt is in a range of from 2/10 to 6/10.

[21] The nonaqueous lithium-type storage element according to any one of the items 18 to 20, wherein the total molar concentration $M_B$ (mol/L) of the (B) is 0.1 mol/L to 1.5 mol/L.
[22] The nonaqueous lithium-type storage element according to any one of the items 18 to 21, wherein the (A) is $LiPF_6$, and the (B) is $LiN(SO_2F)_2$.
[23] The nonaqueous lithium-type storage element according to any one of the items 17 to 22, wherein 0.1 $\mu m \leq X_1 \leq \mu m$, where $X_1$ is average particle diameter of the lithium compound other than the positive electrode active material contained in the positive electrode.
[24] The nonaqueous lithium-type storage element according to any one of the items 17 to 23, wherein the lithium compound other than the positive electrode active material contained in the positive electrode is lithium carbonate.
[25] The nonaqueous lithium-type storage element according to any one of the items 17 to 24, wherein
(a) Ra·F, that is product of Ra and F, is 0.3 to 3.0, where Ra ($\Omega$) is initial inner resistance in normal temperature discharging, and F (F) is static capacitance, of the nonaqueous lithium-type storage element. [26] The nonaqueous lithium-type storage element according to any one of the items 17 to 25, wherein
(e) Rd/Ra is 0.9 to 3.0,
(f) gas amount generated during storage for 2 months, under a cell voltage of 4 V, and an environmental temperature of 60° C., is 30 ×10$^{-3}$ cc/F or less, at 25° C.,
where Ra ($\Omega$) is initial inner resistance in normal temperature discharging, and Rd ($\Omega$) is inner resistance in normal temperature discharging, after storage for two months, under a cell voltage of from 4 V, and an environmental temperature of 60° C., of the nonaqueous lithium-type storage element.
[27] The nonaqueous lithium-type storage element according to any one of the items 17 to 26, wherein
(g) Re/Ra is 0.9 to 2.0,
where Ra ($\Omega$) is initial inner resistance in normal temperature discharging, and Re ($\Omega$) is inner resistance in normal temperature discharging, after carrying out charging and discharging cycle 60,000 times under an environmental temperature of 25° C., a cell voltage of from 2.2 V to 3.8 V, and a rate of 300C, of the nonaqueous lithium-type storage element.
[28] The nonaqueous lithium-type storage element according to any one of the items 1 to 27, wherein the positive electrode active material contained in the positive electrode active material layer is activated carbon, wherein $0.3 < V_1 \leq 0.8$, and $0.5 \leq V_2 \leq 1.0$, where $V_1$ (cc/g) is mesopore volume, derived from fine pores having a diameter of 20 Å to 500 Å, calculated by the BJH method, and $V_2$ (cc/g) is micropore volume, derived from fine pores having a diameter of smaller than 20 Å, calculated by the MP method, and a specific surface area of the activated carbon measured by the BET method is 1,500 m$^2$/g to 3,000 m$^2$/g.
[29] The nonaqueous lithium-type storage element according to any one of the items 1 to 27, wherein the positive electrode active material contained in the positive electrode active material layer is activated carbon, wherein $0.8 < V_1 \leq 2.5$, and $0.8 < V_2 \leq 3.0$, where $V_1$ (cc/g) is mesopore volume, derived from fine pores having a diameter of 20 Å to 500 Å, calculated by the BJH method, and $V_2$ (cc/g) is micropore volume, derived from fine pores having a diameter of smaller than 20 Å, calculated by the MP method, and a specific surface area of the activated carbon measured by the BET method is 2,300 m$^2$/g to 4,000 m$^2$/g.

[30] The nonaqueous lithium-type storage element according to any one of the items 1 to 29, wherein a doping amount of lithium ions of the negative electrode active material is 530 mAh/g to 2,500 mAh/g, per unit weight of the negative electrode active material.

[31] The nonaqueous lithium-type storage element according to any one of the items 1 to 30, wherein a BET specific area of the negative electrode active material is 100 m$^2$/g to 1500 m$^2$/g.

[32] The nonaqueous lithium-type storage element according to any one of the items 1 to 29, wherein a doping amount of lithium ions of the negative electrode active material is 50 mAh/g to 700 mAh/g, per unit weight of the negative electrode active material.

[33] The nonaqueous lithium-type storage element according to any one of the items 1 to 29 and 32, wherein a BET specific area of the negative electrode active material is 1 m$^2$/g to 50 m$^2$/g.

[34] The nonaqueous lithium-type storage element according to any one of the items 1 to 29, 32 and 33, wherein an average particle diameter of the negative electrode active material is 1 μm to 10 μm.

[35] A storage module using the nonaqueous lithium-type storage element according to any one of the items 1 to 34.

[36] A power regeneration system using the nonaqueous lithium-type storage element according to any one of the items 1 to 35.

[37] A power load leveling system using the nonaqueous lithium-type storage element according to any one of the items 1 to 35.

[38] An uninterruptible power source system using the nonaqueous lithium-type storage element according to any one of the items 1 to 35.

[39] A non-contact electric supply system using the nonaqueous lithium-type storage element according to any one of the items 1 to 35.

[40] An energy harvest system using the nonaqueous lithium-type storage element according to any one of the items 1 to 35.

[41] A power storage system using the nonaqueous lithium-type storage element according to any one of the items 1 to 35.

Effect of the Invention

According to the present invention, in one embodiment, a nonaqueous lithium-type storage element containing a lithium compound in a positive electrode is provided, wherein an energy loss due to voltage reduction under high temperature and high voltage is decreased, and charging and discharging cycle characteristics under high load is superior. In one embodiment, a nonaqueous lithium-type storage element exhibiting high I/O characteristics, superior charging and discharging cycle characteristics under high load, and storage durability at high temperature, is provided.

BEST MODE FOR CARRYING OUT THE INVENTION

Explanation will be given below in detail on embodiments of the present invention (hereafter it may be referred to as "the present embodiment"), however, the present invention should not be limited anyway to the present embodiment. The upper limit and the lower limit in each numerical range of the present embodiment can be combined arbitrarily and compose the arbitrary numerical value range.

The nonaqueous lithium-type storage element generally has the positive electrode, the negative electrode, the separator and the electrolytic solution, as major configuration elements. As the electrolytic solution, an organic solvent containing lithium ions (hereafter it may be referred to as "the nonaqueous electrolytic solution") is used.

<Positive Electrode>

The positive electrode in the present embodiment has the positive electrode power collector, and the positive electrode active material layer located at one surface or both surfaces of the positive electrode power collector, and containing the positive electrode active material.

It is preferable that the positive electrode in the present embodiment contains the lithium compound, as the positive electrode precursor before assembling the storage element. As will be described later, in the present embodiment, it is preferable that lithium ions are pre-doped in to the negative electrode in assembling of the storage element. As a pre-doping method in the present embodiment, it is preferable that voltage is applied between the positive electrode precursor and the negative electrode, after assembling of the storage element using the positive electrode precursor containing the lithium compound, the negative electrode, the separator and the nonageous electrolytic solution. It is preferable that the lithium compound is contained inside the positive electrode active material layer formed on the positive electrode power collector of the positive electrode precursor.

In the present specification, the positive electrode before lithium-doping is defined as "the positive electrode precursor", and the positive electrode after lithium-doping is defined as "the positive electrode".

[Positive Electrode Active Material Layer]

The positive electrode active material layer contains the positive electrode active material, and may contain, other than this, arbitrary components, such as conductive fillers, a binder, a dispersion stabilizer, etc., as needed. It is preferable that the positive electrode active material contains a carbon material.

It is preferable that the positive electrode active material layer of the positive electrode precursor contains the lithium compound.

[Positive Electrode Active Material]

It is preferable that the positive electrode active material contains the carbon material. Preferably, the carbon material includes a carbon nanotube, a conductive polymer, and a porous carbon material, and further preferably activated carbon. As the positive electrode active material, two or more kinds of materials may be mixed and contained, and materials other than the carbon material, for example, a composite oxide of lithium and a transition metal, etc. may be contained.

It is preferable that content ratio of the carbon material, is equal to or higher than 50% by weight, and more preferably equal to or higher than 70% by weight, relative to total weight of the positive electrode active material. It is allowed that content ratio of the carbon material is 100% by weight, however, it is preferably, for example, equal to or lower than 90% by weight, from the viewpoint of obtaining good effect by combined use of other materials, and it may be equal to or lower than 80% by weight.

When activated carbon is used as the positive electrode active material, an activated carbon and a raw material thereof are not limited. However, it is preferable to optimally control fine pores of activated carbon to satisfy both of high I/O characteristics and high energy density. Specifically, when $V_1$ (cc/cm$^2$) is mesopore volume, derived from fine pores having a diameter of equal to or larger than 20 Å and equal to or smaller than 500Å, calculated by the BJH method, and $V_2$ (cc/cm$^2$) is micropore volume, derived from fine pores having a diameter of smaller than 20Å, calculated by the MP method, (1) activated carbon satisfying $0.3<V_1\leq0.8$, and $0.5\leq V_2\leq1.0$, and having a specific surface area, measured by the BET method, of equal to or larger than 1,500 m$^2$/g and equal to or smaller than 3,000 m$^2$/g (hereafter it is referred to also as "activated carbon 1") is preferable, to obtain high I/O characteristics, and (2) activated carbon satisfying $0.8<V_1\leq2.5$ and $0.8<V_2\leq3.0$, and having a specific surface area, measured by the BET method, of equal to or larger than 2,300 m$^2$/g and equal to or smaller than 4,000 m$^2$/g (hereafter it is referred to also as "activated carbon 2") is preferable, to obtain high energy density.

Explanation will be given below individually and sequentially on (1) activated carbon 1 and (2) activated carbon 2.

(Activated Carbon 1)

Mesopore volume $V_1$ of activated carbon 1 is preferably a value larger than 0.3 cc/g, from the view point of enhancing I/O characteristics when the positive electrode material is incorporated in the storage element. $V_1$ of activated carbon 1 is preferably equal to or smaller than 0.8 cc/g, from the view point of suppressing decrease in bulk density of the positive electrode. $V_1$ of activated carbon 1 is more preferably equal to or larger than 0.35 cc/g and equal to or smaller than 0.7 cc/g, and further preferably equal to or larger than 0.4 cc/g and equal to or smaller than 0.6 cc/g.

Micropore volume $V_2$ of activated carbon 1 is preferably equal to or larger than 0.5 cc/g, to enlarge specific surface area of activated carbon, and increase capacitance. $V_2$ of activated carbon 1 is preferably equal to or smaller than 1.0 cc/g, from the view point of suppressing bulk of activated carbon, increasing density as the electrode, and increasing capacitance per unit volume. $V_2$ of activated carbon 1 is more preferably equal to or larger than 0.6 cc/g and equal to or smaller than 1.0 cc/g, and further preferably equal to or larger than 0.8 cc/g and equal to or smaller than 1.0 cc/g.

Ratio, ($V_1/V_2$), of mesopore volume $V_1$ relative to micropore volume $V_2$, of activated carbon 1, is preferably in a range of $0.3\leq V_1/V_2\leq0.9$. Accordingly, it is preferable that $V_1/V_2$ of activated carbon 1 is equal to or larger than 0.3, from the view point of enlarging ratio of mesopore volume relative to micropore volume, in a degree that is capable of suppressing decrease in output characteristics, while maintaining high capacitance. It is preferable that $V_1/V_2$ of activated carbon 1 is equal to or smaller than 0.9, from the view point of enlarging ratio of micropore volume relative to mesopore volume, in a degree that is capable of suppressing decrease in capacitance, while maintaining high power characteristics. More preferable range of $V_1/V_2$ of activated carbon 1 is $0.4\leq V_1/V_2\leq0.7$, and further preferable range $0.55\leq V_1/V_2\leq0.7$.

Average fine pore diameter of activated carbon 1 is preferably equal to or larger than 17 Å, more preferably equal to or larger than 18 Å, and most preferably equal to or larger than 20 Å, from the view point of increasing output of the resulting storage element. Average fine pore diameter of activated carbon 1 is preferably equal to or smaller than 25 Å, from the view point of increasing capacitance.

Specific BET surface area of activated carbon 1 is preferably equal to or larger than 1,500 m$^2$/g and equal to or smaller than 3,000 m$^2$/g, and more preferably equal to or larger than 1,500 m$^2$/g and equal to or smaller than 2,500 m$^2$/g. When specific BET surface area of activated carbon 1 is equal to or larger than 1,500 m$^2$/g, good energy density is easily obtainable, and on the other hand, when specific BET surface area of activated carbon 1 is equal to or smaller than 3,000 m$^2$/g, performance per electrode volume is enhanced, because the addition of a large quantity of the binder is not necessary, to maintain strength of the electrode.

Activated carbon 1 having such characteristics as described above can be obtained using, for example, raw materials and treatment methods to be explained below.

In the present embodiment, a carbon source to be used as a raw material of activated carbon 1 is not limited. It includes, for example, a plant-based raw material, such as wood, wood flour, a coconut shell, a byproduct in pulp production, bagasse, waste molasses, etc.; a fossil-based raw material, such as peat, lignite, brown coal, bituminous coal, anthracite, petroleum distillation residues, petroleum pitch, coke, coal tar, etc.; various kinds of synthetic resins, such as a phenol resin, a vinyl chloride resin, a vinyl acetate resin, a melamine resin, a urea resin, a resorcinol resin, celluloid, an epoxy resin, a polyurethane resin, a polyester resin, a polyamide resin, etc.; synthetic rubber, such as polybutylene, polybutadiene, polychloroprene, etc.; and other synthetic wood, synthetic pulp, etc., and carbonized products thereof. Among these raw materials, the plant-based material, such as the coconut shell, wood powder, and carbonized products thereof are preferable, from the viewpoint of productivity and cost, and the coconut shell carbonized product is particularly preferable.

As a system of carbonization and activation for preparing activated carbon 1 from these materials, there can be adopted known methods, for example, a fixed bed system, a moving bed system, a fluid bed system, a slurry system, a rotary kiln system, etc.

The carbonization method of these raw materials includes a calcination method at 400 to 700° C., preferably about 450 to 600° C., over about 30 minutes to 10 hours, using inert gas, such as nitrogen, carbon dioxide, helium, xenon, neon, carbon monoxide, exhaust combustion gas, etc., or mixed gas with other gas, where theses inert gases are main components.

As the activation method for the carbonized product obtained by the carbonization method, a gas activation method for calcination, using activation gas, such as steam, carbon dioxide, oxygen, etc., is preferably used. The method for using steam or carbon dioxide, as activation gas, is more preferable.

In this activation method, it is preferable to activate the carbonized product by taking 3 to 12 hours, preferably 5 to 11 hours, and further preferably 6 to 10 hours, by increasing temperature up to 800 to 1,000° C., while supplying activation gas in a rate of 0.5 to 3.0 kg/h, preferably 0.7 to 2.0 kg/h.

Furthermore, the carbonized product may be subjected to primary activation, in advance, before activation treatment of the carbonized product. In this primary activation, gas activation is preferable, by calcination of the carbon material at a temperature of below 900° C., usually using activation gas, such as steam, carbon dioxide, oxygen, etc.

Activated carbon 1, which has characteristics as above, which is preferable in the present embodiment, can be produced by an appropriate combination of calcination temperature and calcination time, in the carbonization method, and supply amount of activation gas, temperature increasing rate, and maximum activation temperature, in the activation method.

It is preferable that average particle diameter of activated carbon 1 is 2 to 20 μm. When average particle diameter of activated carbon 1 is equal to or larger than 2 μm, capacitance per electrode volume tends to be increased, because density of the active material layer is high. Smaller average particle diameter of activated carbon 1 may decrease durability, however, when average particle diameter is equal to or larger than 2 μm, durability is difficult to decrease. When average particle diameter of activated carbon 1 is equal to or smaller than 20 μm, it tends to provide easier compatibility to high speed charging and discharging. Average particle diameter of activated carbon 1 is more preferably 2 to 15 μm, and further preferably 3 to 10 μm.

(Activated Carbon 2)

Mesopore volume $V_1$ of activated carbon 2 is preferably a value larger than 0.8 cc/g, from the view point of enhancing output characteristics, when the positive electrode material is incorporated in the storage element, and on the other hand, it is preferably equal to or smaller than 2.5 cc/g, from the view point of suppressing decrease in capacitance of the storage element. $V_1$ of activated carbon 2 is more preferably equal to or larger than 1.00 cc/g and equal to or smaller than 2.0 cc/g, and further preferably equal to or larger than 1.2 cc/g and equal to or smaller than 1.8 cc/g.

Micropore volume $V_2$ of activated carbon 2 is preferably a value equal to or larger than 0.8 cc/g, to enlarge specific surface area of activated carbon, and increase capacitance. $V_2$ of activated carbon 2 is preferably equal to or smaller than 3.0 cc/g, from the view point of increasing density as the electrode of activated carbon, and increasing capacitance per unit volume. $V_2$ of activated carbon 2 is more preferably equal to or larger than 1.0 cc/g and equal to or smaller than 2.5 cc/g, and further preferably equal to or larger than 1.5 cc/g and equal to or smaller than 2.5 cc/g.

Activated carbon 2, having the mesopore volume and the micropore volume as above, is the one having higher BET specific surface area than that of activated carbon which has been used for the conventional electric double layer capacitor or the lithium ion capacitor. As specific value of BET specific surface area of activated carbon 2, it is preferably equal to or larger than 3,000 m²/g, and equal to or smaller than 4,000 m²/g, and more preferably equal to or larger than 3,200 m²/g, and equal to or smaller than 3,800 m²/g. When BET specific surface area of activated carbon 2 is equal to or larger than 3,000 m²/g, good energy density is obtained easily, and when BET specific surface area of activated carbon 2 is equal to or smaller than 4,000 m²/g, performance per electrode volume is enhanced, because it is not necessary to add a large quantity of the binder to hold strength of the electrode.

Activated carbon 2, having characteristics as above, can be obtained using, for example, raw materials and treatment methods to be explained below.

The carbonaceous material to be used as a raw material of the activate carbon 2 is not limited, as long as it is a carbon source commonly used as an activated carbon raw material, and includes, for example, a plant based material, such as wood, wood powder and coconut shell, etc.; a fossil based raw material, such as petroleum pitch, coke, etc.; various kinds of synthetic resins, such as a phenol resin, a furan resin, a vinyl chloride resin, a vinyl acetate resin, a melamine resin, a urea resin, a resorcinol resin, etc. Among these raw materials, the phenol resin and the furan resin are particularly preferable, because they are suitable for preparing activated carbon 2 having high specific surface area.

As the carbonization system, or a heating method in the activation treatment of these raw materials, there can be included known systems, for example, a fixed bed system, a moving bed system, a fluid bed system, a slurry system, a rotary kiln system, etc. As for atmosphere in heating, inert gas, such as nitrogen, carbon dioxide, helium, argon, etc., or mixed gas with other gas, where theses inert gases are main components, can be used. A general method is calcination at a carbonization temperature of about 400 to 700° C. for about 0.5 to 10 hours.

The activation method for the carbonized product after carbonization treatment includes a gas activation method for calcination using activation gas, such as steam, carbon dioxide, oxygen, etc.; and an alkali metal activation method for carrying out heat treatment, after mixing with the alkali metal compound; and the alkali metal activation method is preferable in preparing activated carbon having large specific surface area.

In this activation method, it is preferable that heating is carried out under inert gas atmosphere at a range of 600 to 900° C. for 0.5 to 5 hours, after mixing so as to attain a weight ratio of the carbonized product and the alkali metal compound, such as KOH, NaOH, etc., of equal to or larger than 1: 1 (amount of the alkali metal compound is the same or more than amount of the carbonized product), and then the alkali metal compound is removed by washing with an acid and water, and further drying is carried out.

It is preferable that weight ratio of the carbonized product and the alkali metal compound (=the carbonized product: the alkali metal compound) is equal to or more than a 1:1. It is preferable that the alkali metal compound is more than a weight ratio of 1:3, and equal to or less than 1:5.5, because amount of the alkali metal compound increases the more, mesopore volumes increases the more, and pore volume tends to abruptly increase at the border of vicinity of a weight ratio of 1:3.5. When weight ratio of the alkali metal compound increases the more, pore volumes increases the more, however, it is preferable to be equal to or less than 1: 5.5, in consideration of processing efficiency of, such as washing, etc., after that.

It is good to mix a little more amount of the carbonized product with KOH in activation to increase micropore volume and not to increase mesopore volume. It is good to use a little more amount of KOH to increase both of micropore volume and mesopore volume. It is good to carry out steam activation, after carrying out alkali activation treatment, to increase mainly mesopore volume.

Average particle diameter of activated carbon 2 is preferably equal to or larger than 2 μm and equal to or smaller than 20 μm, and more preferably equal to or larger than 3 μm and equal to or smaller than 10 μm.

(Use Aspect of Activated Carbon)

The activated carbons 1 and 2 may be one kind of activated carbon, and may be a mixture of two or more kinds of activated carbons, as long as being the one exhibiting the characteristics by the mixture as a whole.

As for the activated carbons 1 and 2, either one of these may be selected and used, and both may be used by mixing.

The positive electrode active material may contain materials other than the activated carbons 1 and 2, for example, activated carbon not having the specific $V_1$ and/or $V_2$, or a material other than activated carbon, for example, a composite oxide of lithium and transition metals, etc. In the exemplified aspect, it is preferable that each of content of activated carbon 1, or content of activated carbon 2, or total content of the activated carbons 1 and 2 is preferably more than 50% by weight, more preferably more than 70% by weight, further preferably more than 90% by weight, and more further preferably 100% by weight of the whole positive electrode active material.

Content ratio of the positive electrode active material in the positive electrode active material layer is preferably equal to or higher than 35% by weight and equal to or lower than 95% by weight, based on total weight of the positive electrode active material layer in the positive electrode precursor. The lower limit of content ratio of the positive electrode active material is more preferably equal to or higher than 45% by weight, and further preferably equal to or higher than 55% by weight. The upper limit of content ratio of the positive electrode active material is more preferably equal to or lower than 90% by weight, and further preferably equal to or lower than 85% by weight. Suitable charging and discharging characteristics is expressed, by setting content ratio of the positive electrode active material to this range.

(Lithium Compound)

"The lithium compound" in the present specification means a lithium compound, which is not the positive electrode active material, and is no more a lithium-containing deposit, which may deposit in the positive electrode active material layer by charging and discharging.

The lithium compound includes a lithium compound capable of decomposing at the positive electrode in lithium doping to be described later, and releasing lithium ions, and includes one or more kinds selected from, for example, lithium carbonate, lithium oxide, lithium hydroxide, lithium fluoride, lithium chloride, lithium bromide, lithium iodide, lithium nitride, lithium oxalate and lithium acetate. Among them, such a lithium compound is more preferable that is capable of adsorbing fluorine ions in the electrolytic solution, for example, lithium carbonate, lithium oxide and lithium hydroxide. Lithium carbonate is further preferable, from the view point possibility of handling in air, and having low hygroscopic property. The lithium compound like this decomposes by voltage application, functions as a dopant source of lithium doping in to the negative electrode, as well as forming voids in the positive electrode active material layer, and is therefore capable of forming the positive electrode superior in retention of the electrolytic solution and ion conductivity.

[Lithium Compound of Positive Electrode Precursor]

The lithium compound is preferably a particulate. It is preferable that average particle diameter of the lithium compound contained in the positive electrode precursor is equal to or larger than 0.1μm and equal to or smaller than 100 μm. It is more preferable that the upper limit of average particle diameter of the lithium compound contained in the positive electrode precursor is equal to or smaller than 50 μm, further preferably equal to or smaller than 20 μm, and most preferably equal to or smaller than 10 μm. It is more preferable that the lower limit of average particle diameter of the lithium compound contained in the positive electrode precursor is equal to or larger than 0.3 μm, and further preferably equal to or larger than 0.5 μm. When average particle diameter of the lithium compound is equal to or larger than 0.1 μm, charging and discharging characteristics under high load is enhanced, because voids remaining after an oxidation reaction of the lithium compound in the positive electrode have sufficient volume to hold the electrolytic solution. When average particle diameter of the lithium compound is equal to or smaller than 100 μm, oxidation reaction rate of the lithium compound can be secured, because surface area of the lithium compound is not excessively decreased. The upper limit and the lower limit of a range of average particle diameter of the lithium compound may be combined arbitrarily.

Various methods can be used for atomization of the lithium compound. A grinding machine, for example, a ball mill, a beads mill, a ring mill, a jet mill, a rod mill, etc., can be used.

Content ratio of the lithium compound in the positive electrode active material layer of the positive electrode precursor is preferably equal to or higher than 5% by weight and equal to or lower than 60% by weight, and more preferably equal to or higher than 10% by weight and equal to or lower than 50% by weight, based on total weight of the positive electrode active material layer in the positive electrode precursor. It is preferable to set content ratio to this range, because suitable function as a dopant source in to the negative electrode is expressed, as well as suitable degree of porosity can be furnished to the positive electrode, and owing to both, the storage element superior in charging and discharging efficiency under high load of can be provided. The upper limit value and the lower limit value of a range of this content ratio can be combined arbitrarily.

[Average Particle Diameter of Lithium Compound and Positive Electrode Active Material of Positive Electrode]

It is preferable that $0.1 \mu m \leq X_1 \leq 10 \mu m$, where $X_1$ is average particle diameter of the lithium compound contained in the positive electrode, $2 \mu m \leq Y_1 \leq 20 \mu m$, and $X_1 < Y_1$, where $Y_1$ is average particle diameter of the positive electrode active material. It is further preferable that $0.5 \mu m \leq X_1 \leq 5 \mu m$ and $3 \mu m \leq Y_1 \leq 10 \mu m$. When $X_1$ is equal to or larger than 0.1 μm, charging and discharging cycle characteristics under high load is enhanced, because the lithium compound adsorbs fluorine ions generated in charging and discharging cycles under high load. When $X_1$ is equal to or smaller than 10 μm, adsorption of fluorine ions can be carried out efficiently, because reaction area increases for the lithium compound and fluorine ions generating in charging and discharging cycles under high load. When $Y_1$ is equal to or larger than 2 μm, electron conductivity among the positive electrode active materials can be secured. When $Y_1$ is equal to or smaller than 20 μm, high power characteristics can be expressed, because reaction area with electrolyte ions increases. When $X_1 < Y_1$, electron conductivity among the positive electrode active materials can be secured, as well as energy density can be increased, because lithium carbonate is filled in the gaps generating among the positive electrode active materials.

A measurement method for $X_1$ and $Y_1$ is not limited, and it can be calculated from a SEM image and a SEM-EDX image of the cross-section of the positive electrode. As for the formation method for the cross-section of the positive electrode, BIB processing can be used, wherein argon beams are irradiated from the upper part of the positive electrode, and the smooth cross-section is prepared along the end part of a shielding plate located right above the sample. When lithium carbonate is made contained in the positive electrode, distribution of carbonated ions can also be determined by measuring Raman imaging of the cross-section of the positive electrode.

The upper limit value and the lower limit value of the $V_1$, and the upper limit value and the lower limit value of the $V_2$ can be combined arbitrarily. In the present specification, combination of the upper limit value and the lower limit value of other component requirements themselves is also similar.

[Discrimination Method for Lithium Compound and Positive Electrode Active Material]

The lithium compound and the positive electrode active material can be discriminated by oxygen mapping using the SEM-EDX image of the cross-section of the positive electrode, measured by an observation magnification of 1000 times to 4000 times. As for the measurement method of the SEM-EDX image, it is preferable that luminance and contrast are adjusted so that there are no pixels attaining to the maximum luminance, and average value of brightness falls in a range of 40% to 60% of luminance. Such particle that has a bright part, binarized based on average value of brightness for the resulting oxygen mapping, in an area of equal to or larger than 50% can be discriminated as the lithium compound.

(Calculation Method for $X_1$ and $Y_1$)

$X_1$ and $Y_1$ can be determined by analysis of the image obtained from SEM-EDX of the cross-section of the positive electrode, which was measured in the same view field as SEM of the cross-section of the positive electrode. Cross-sectional area S is determined on the whole particles of each of X and Y observed in the SEM image of the cross-section, where X is particles of the lithium compound discriminated by the SEM image of the cross-section of the positive electrode, and Y is particles of the positive electrode active material other than those particles, and particle diameter d is calculated by the following equation (7). (circular constant is represented by π.)

$$d=2\times(S/\pi)^{1/2} \quad \text{formula(7)}$$

Volume average particle diameters $X_0$ and $Y_0$ are determined by the following equation (8), using the resulting particle diameter d.

$$X_0=\Sigma[4/3\pi\times(d/2)^3\times d]/\Sigma[4/3\pi\times(d/2)^3] \quad \text{formula(8)}$$

Average particle diameters $X_1$ and $Y_1$ are determined as each average value of $X_0$ and $Y_0$, measured at equal to or more than 5 points, by changing view field of the cross-section of the positive electrode.

(Amount of Lithium Compound of Positive Electrode)

The lithium compound other than the positive electrode active material, contained by the positive electrode, is characterized in being equal to or more than 1% by weight and equal to or less than 50% by weight, based on total weight of the positive electrode active material layer in the positive electrode, and it is more preferably equal to or more than 2.5% by weight and equal to or less than 25% by weight. When amount of the lithium compound is equal to or more than 1% by weight, durability at high temperature is enhanced, because lithium carbonate suppresses a decomposition reaction of an electrolytic solution solvent on the positive electrode under high temperature environment, and effect thereof is significant at equal to or more than 2.5% by weight. When amount of the lithium compound is equal to or less than 50% by weight, high I/O characteristics is shown, because inhibition of electron conductivity among the positive electrode active materials by the lithium compound is relatively small, and when it is equal to or less than 25% by weight, it is particularly preferable, in particular from the view point of I/O characteristics. Combination of the upper limit value and the lower limit value can be the arbitrary one.

D ($g/m^2$), which is basis weight of the lithium compound other than the positive electrode active material, contained in the positive electrode active material, per one surface of the positive electrode, is equal to or larger than 0.1 and equal to or smaller than 15. Basis weigh D is preferably equal to or larger than 0.5 and equal to or smaller than 10. When basis weigh D of the lithium compound is equal to or larger than 0.1 $g/m^2$, charging and discharging cycle characteristics under high load is enhanced, because lithium carbonate is present in sufficient amount to adsorb fluorine ions generating in charging and discharging cycles under high load. When basis weigh D of the lithium compound is equal to or smaller than 15 $g/m^2$, energy density of the nonaqueous lithium-type storage element can be enhanced.

The positive electrode active material contains sodium (Na) and/or potassium (K) elements, together with the lithium compound. Concentration C of the Na and/or K elements is equal to or higher than 2 ppm and equal to or lower than 300 ppm. Concentration C is preferably equal to or higher than 2.5 ppm and equal to or lower than 250 ppm, and more preferably equal to or higher than 3 ppm and equal to or lower than 200 ppm. When concentration C is equal to or higher than 2 ppm, energy loss caused by voltage reduction under high temperature and high voltage can be suppressed. When concentration C is equal to or lower than 300 ppm, capacitance decrease after charging and discharging cycles under high load can be suppressed. The positive electrode active material is enough to contain either one of Na and K element, and may contain both. When the positive electrode active material contains both of Na and K, total concentration C of Na and K may be equal to or higher than 2 ppm and equal to or lower than 300 ppm.

E ($g/m^2$), which is basis weight of the positive electrode active material contained in the positive electrode active material, per one surface of the positive electrode, is equal to or larger than 10 and equal to or smaller than 100. Basis weigh E is preferably equal to or larger than 15 and equal to or smaller than 80. When basis weigh E of the positive electrode active material is equal to or larger than 10 $g/m^2$, energy density can be increased. When basis weigh E of the positive electrode active material is equal to smaller than 10 $g/m^2$, lower resistance can be attained.

Ratio of concentration C (ppm) and basis weight D ($g/m^2$), C/D, is preferably equal to or higher than 0.2 and equal to or lower than 38. When C/D is equal to or higher than 0.2, voltage reduction under high temperature and high voltage can be suppressed, by suppression of elution of lithium ions from the lithium compound. When C/D is equal to or lower than 30, capacitance decrease can be suppressed, because the lithium compound is capable of capturing fluorine ions generating in charging and discharging cycles under high load.

Ratio of concentration C (ppm) and basis weight E ($g/m^2$), C/E, is preferably equal to or higher than 0.1 and equal to or lower than 3. When C/E is equal to or higher than 0.1, capacitance decrease can be suppressed, because the lithium compound is capable of capturing fluorine ions generating in charging and discharging cycles under high load. When C/E is equal to or lower than 3, energy density can be increased, because ratio of active materials in the positive electrode increases.

When the nonaqueous lithium-type storage element is stored under a high temperature of 60° C., for example, by charging to a high voltage of 4.0 V, voltage reduction generates gradually, resulting in loss of charged energy. In particular, in the nonaqueous lithium-type storage element containing the lithium compound in the positive electrode, reaction active species generate by ionization of lithium from the lithium compound in the positive electrode, and by being released in to the electrolytic solution, and by reaction with the electrolytic solution or electrolytes, energy charged in the positive electrode is consumed, resulting in voltage reduction.

The present inventors have discovered that the voltage reduction can be suppressed by the addition, of a compound containing at least one kind of element selected from Na and K, in the positive electrode. Reason for that is not clear, but it is considered, without being limited to theory, that the compound containing cations of, such as Na and/or K, etc., having larger ion radius as compared with lithium (Li) ions, is more easily ionized, because it is able to delocalize positive charges on the cations more as compared with Li ions. As a result, it is considered that generation of reaction active species can be suppressed, and voltage reduction in a high temperature and high voltage state can be suppressed, by suppressing releasing of Li ions from the lithium compound.

A method for adding Na and/or K includes, but is not limited to, for example, mixing and pulverizing the compound containing Na and/or K, with the lithium compound to support it on to a positive electrode precursor; coating a compound containing Na and/or K on a positive electrode precursor by sputtering or vacuum deposition; preparing a positive electrode precursor after treating a positive electrode active material with a solution containing Na and/or K; supporting Na and/or K on to a positive electrode, by dissolving a salt containing Na and/or K in an electrolytic solution, and oxidatively decomposing it on the positive electrode; etc.

Quantitative determination method for Na and/or K can be performed by calculation using ICP-AES, atomic absorption spectrometry, a fluorescent X-ray analysis method, a neutron radio-activation analysis method, and IPS-MS, to be described later, etc.

The lithium compound contained in the positive electrode active material layer in the positive electrode induces increase in resistance, because it gradually decomposes to generate gas, when exposed to a high potential of equal to or higher than about 4.0 V, and generated gas inhibits diffusion of ions in the electrolytic solution. Accordingly, it is preferable to suppress a reaction of the lithium compound, by forming a coated film composed of a fluorine-containing compound at the surface of the lithium compound.

A method for forming a coated film composed of a fluorine-containing compound at the surface of a lithium compound includes, but is not limited to, adding a fluorine-containing compound, which decomposes at high potential, in to an electrolytic solution, and applying high voltage, which is equal to or higher than decomposition potential of the fluorine-containing compound, to a nonaqueous lithium-type storage element; heating up to a decomposition temperature or higher; etc.

Coating ratio of a fluorine compound, which was coated on the surface of the lithium compound, can be represented by $A_1$ and $A_2$, where $A_1$ is area overlap ratio of fluorine mapping to oxygen mapping, in the SEM-EDX image of the surface of the positive electrode, and $A_2$ is area overlap ratio of fluorine mapping to oxygen mapping, in the SEM-EDX image of the cross-section of the positive electrode.

It is preferable that overlap ratio $A_1$ is equal to or higher than 40% and equal to or lower than 99%. When overlap ratio $A_1$ is equal to or higher than 40%, decomposition of the lithium compound can be suppressed. When overlap ratio $A_1$ is equal to or lower than 99%, cycle characteristics under high load is superior, because basicity can be held at the vicinity of the positive electrode.

Overlap ratio $A_1$ can be determined by calculation of area overlap ratio of fluorine mapping to oxygen mapping, binarized based on average value of brightness, in the element mapping obtained using SEM-EDX of the surface of the positive electrode.

Measurement conditions of the element mapping of SEM-EDX are not limited, and preferably a pixel number is in a range of 128×128 pixels to 512×512 pixels, and a luminance and a contrast are adjusted so that there are no pixels attaining to brightness of the maximum luminance, and average value of brightness value falls within a range of a luminance of 40% to 60%.

Overlap ratio $A_2$ is measured by calculation of area overlap ratio of fluorine mapping to oxygen mapping, binarized based on average value of brightness, in the element mapping obtained using SEM-EDX of the cross-section of a broad ion beam (BIB) processed positive electrode. BIB processing is processing for preparation of a smooth cross-section, along the end part of the shielding plate located right above the sample, by irradiation of argon beams from the upper part of the positive electrode.

It is preferable that overlap ratio $A_2$ is equal to or higher than 10% and equal to or lower than 60%. When overlap ratio $A_2$ is equal to or higher than 10%, decomposition of the lithium compound can be suppressed. When overlap ratio $A_2$ is equal to or lower than 60%, cycle characteristics under high load is superior, because basicity can be held at the vicinity of the positive electrode, due to a non-fluorinated state as deep as the inside of the lithium compound.

(Other Components of Positive Electrode Active Material Layer)

The positive electrode active material layer in the present embodiment may contain arbitrary components, as needed, such as conductive fillers, the binder, the dispersion stabilizer, etc., other than the positive electrode active material and the lithium compound.

As the conductive fillers, a conductive carbonaceous material, having higher conductivity than that of the positive electrode active material, can be included. As such conductive fillers, for example, Ketjen black, acetylene black, a vapor-grown carbon fiber, graphite, a carbon nanotube, a mixture thereof, etc., are preferable.

Mixing amount of the conductive fillers in the positive electrode active material layer is preferably over 0 to 20 parts by weight, and more preferably in a range of 1 to 15 parts by weight, relative to 100 parts by weight of the positive electrode active material. It is preferable that the positive electrode active material layer contains the conductive fillers, from the viewpoint of high input. When mixing amount of the conductive fillers in the positive electrode active material layer is equal to or less than 20 parts by weight, energy density per volume of the positive electrode active material layer can be secured, because content ratio of the positive electrode active material in the positive electrode active material layer increases.

The binder includes, but is not limited to, for example, PVdF (polyvinylidene fluoride), PTFE (polytetrafluoroethylene), polyimide, latex, a styrene-butadiene copolymer, fluorocarbon rubber, an acrylic copolymer, etc. Use amount of the binder is preferably equal to or more than 1 part by weight and equal to or less than 30 parts by weight, more preferably equal to or more than 3 parts by weight and equal to or less than 27 parts by weight, and further preferably equal to or more than 5 parts by weight and equal to or less than 25 parts by weight, relative to 100 parts by weight of the positive electrode active material. When amount of the binder is equal to or more than 1% by weight, sufficient electrode strength is expressed. On the other hand, when the amount of the binder is equal to or less than 30 parts by weight, high I/O characteristics is expressed, without inhibiting entry and exit of ions into and from the positive electrode active material, and diffusion thereof.

The dispersion stabilizer includes, but is not limited to, for example, PVP (polyvinyl pyrrolidone), PVA (polyvinyl alcohol), a cellulose derivative, etc. Use amount of the dispersion stabilizer is preferably over 0 part by weight and equal to or less than 10 parts by weight, relative to 100 parts by weight of the positive electrode active material. When amount of the dispersion stabilizer is equal to or less than 10 parts by weight, high I/O characteristics is expressed without inhibiting entry and exit of ions into and from the positive electrode active material, and diffusion thereof.

[Positive Electrode Power Collector]

A material composing the positive electrode power collector in the present embodiment is not limited, as long as it is a material which has high electron conductivity, and little induces elution to the electrolytic solution and deterioration caused by reactions with the electrolytes or ions, etc., and a metal foil is preferable. As the positive electrode power collector in the nonaqueous lithium-type storage element of the present embodiment, an aluminum foil is particularly preferable.

The metal foil may be a usual metal foil not having ruggedness or through holes, or may be a metal foil having ruggedness, which was subjected to emboss finish, chemical etching, an electro-deposition method, blast finish, etc., or may be a metal foil having the through holes, such as an expand metal, a punching metal, an etching foil, etc.

Thickness of the positive electrode power collector is not limited, as long as shape and strength of the positive electrode can be held sufficiently, and it is preferably, for example, 1 to 100 μm.

[Production of Positive Electrode Precursor]

In the present embodiment, the positive electrode precursor, which is converted to the positive electrode of the nonaqueous lithium-type storage element, can be produced by production technology of the electrode of the known lithium ion battery, the electric double layer capacitor, etc. For example, the positive electrode precursor can be obtained by preparing a slurry-like coating solution by dispersing or dissolving the positive electrode active material and the lithium compound, as well as other arbitrary components to be used as needed, into water or an organic solvent, coating this coating solution onto one surface or both surfaces of the positive electrode power collector to form a coated film, and drying this. Film thickness or bulk density of the positive electrode active material layer may be adjusted by subjecting the resulting positive electrode precursor to press. Alternatively, such a method may also be possible for dry blending, the positive electrode active material and the lithium compound, as well as other arbitrary components to be used as needed, without using a solvent, press-molding the resulting mixture, and then sticking it to the positive electrode power collector using conductive adhesives.

The coating solution of the positive electrode precursor may be prepared by dry-blending a part of or all of various kinds powder materials containing the positive electrode active material, and next by the addition of water or an organic solvent, and/or a liquid or slurry material, where the binder or the dispersing agent is dissolved or dispersed. It may be prepared by the addition of various kinds of the powder materials containing the positive electrode active material, in the liquid or slurry material, where the binder or the dispersion stabilizer is dissolved or dispersed in water or the organic solvent. As the dry-blending method, the conductive material may also be coated onto the lithium compound having low conductivity, by pre-mixing the positive electrode active material and the lithium compound, as well as conductive fillers, as needed, using for example, a ball mill, etc. In this way, the lithium compound tends to be decomposed easily at the positive electrode precursor, in a lithium pre-doping to be described later. When water is used as a solvent of the coating solution, a pH modifier may be added, as needed, because the coating solution may exhibit alkaline by the addition of the lithium compound.

A method for dissolving or dispersing includes, but is not limited to, using a dispersing machine, such as a homo-disperser or a multi-axis dispersing machine, a planetary mixer, a thin film spin-type high speed mixer, etc. It is preferable to carry out dispersion under condition of a peripheral speed of equal to or faster than 1 m/sec and equal to or slower than 50 m/sec, to obtain a well dispersed-state coating solution. When peripheral speed is equal to or faster than 1 m/sec, it is preferable, because various kinds of materials are dissolved or dispersed well. When peripheral speed is equal to or slower than 50 m/sec, it is preferable, because various kinds of materials are not fractured by heat or shear force, due to dispersion, and reaggregation is decreased.

As for dispersity of the coating solution, it is preferable that particle size measured by a particle gauge is equal to or larger than 0.1 μm and equal to or smaller than 100 μm. As the upper limit of dispersity, particle size is more preferably equal to or smaller than 80 μm, and further preferably equal to or smaller than 50 μm. When particle size is equal to or larger than 0.1 μm, it means that various kinds of powder materials containing the positive electrode active material have not been excessively pulverized in preparing the coating solution. When particle size is 100 μm or less, stable coating is obtained without clogging in injection of the coating solution, or stripes on the coated film.

Viscosity (ηb) of the coating solution of the positive electrode precursor is preferably equal to or higher than 1,000 mPa·s and equal to or lower than 20,000 mPa·s. It is more preferably equal to or higher than 1,500 mPa·s and equal to or lower than 10,000 MPa·s, and further preferably equal to or higher than 1,700 mPa·s and equal to or lower than 5,000 mPa·s. When viscosity (ηb) of the coating solution of the positive electrode precursor is equal to or higher than 1,000 MPa·s, drip is suppressed in formation of the coated film, and width and thickness of the coated film can be controlled well. When viscosity (ηb) of the coating solution of the positive electrode precursor is equal to or lower than 20,000 MPa·s, stable coating is possible, because of low pressure loss at a flow passage of the coating solution, in using a coating machine, or the coated film thickness can be controlled to equal to or less than desired thickness.

TI value (thixotropy index value) of the coating solution of the positive electrode precursor is preferably equal to or higher than 1.1, more preferably equal to or higher than 1.2, and further preferably equal to or higher than 1.5. When TI value of the coating solution of the positive electrode precursor is equal to or higher than 1.1, width and thickness of the coated film can be controlled well.

A method for forming a coated film of a positive electrode precursor includes, but is not limited to, using a coating machine, such as a die coater or a comma coater, a knife coater, a gravure coating machine, etc.

The coated film may be formed by single-layer coating, or may be formed by multi-layer coating. In the case of the multi-layer coating, the composition of the coating solution may be adjusted so that content of the lithium compound in each of the coated film layer is different. Coating speed is preferably equal to or faster than 0.1 m/min and equal to or slower than 100 m/min, more preferably equal to or faster than 0.5 m/min and equal to or slower than 70 m/min, and further preferably equal to or faster than 1 m/min and equal to or slower than 50 m/min. When coating speed is equal to or faster than 0.1 m/min, stable coating is possible, and when coating speed is equal to or slower than 100 m/min, coating precision can be secured sufficiently.

A method for drying a coated film of a positive electrode precursor includes, but is not limited to, a drying method, such as hot air drying or infrared ray (IR) drying, etc. Drying of the coated film may be carried out by drying at single temperature, or by drying by changing temperature in multi-stages. It may be dried by a combination of a plurality of drying methods. Drying temperature is preferably equal to or higher than 25° C. and equal to or lower than 200° C., more preferably equal to or higher than 40° C. and equal to or lower than 180° C., and further preferably equal to or higher than 50° C. and equal to or lower than 160° C. When drying temperature is equal to or higher than 25° C., a solvent in the coated film can be volatilized sufficiently. When drying temperature is equal to or lower than 200° C., cracking of the coated film caused by abrupt volatilization of the solvent, localization of the binder caused by migration, and oxidation of the positive electrode power collector or the positive electrode active material layer can be suppressed.

A method for pressing a positive electrode precursor includes, but is not limited to, using a press machine, such as a hydraulic machine, a vacuum press machine, etc. Film thickness and bulk density of the positive electrode active material layer, and electrode strength can be adjusted by press pressure, clearance, and surface temperature of the press part, to be described later. Press pressure is preferably equal to or higher than 0.5 kN/cm and equal to or lower than 20 kN/cm, more preferably equal to or higher than 1 kN/cm and equal to or lower than 10 kN/cm, and further preferably equal to or higher than 2 kN/cm and equal to or lower than 7 kN/cm. When press pressure is equal to or higher than 0.5 kN/cm, electrode strength can be increased sufficiently. When press pressure is equal to or lower than 20 kN/cm, film thickness or bulk density of the positive electrode active material layer film can be easily adjusted to a desired level, without generation of warpage or wrinkle in the positive electrode precursor. Clearance between the press rolls can be set to an arbitrary value in response to film thickness of the positive electrode precursor after drying, so as to attain desired film thickness or bulk density of the positive electrode active material layer. Press speed may be set to arbitrary level so as to decrease warpage or wrinkle in the positive electrode precursor. Surface temperature of the press part may be room temperature, or heating may be carried out, as needed. The lower limit of surface temperature of the press part in the case of heating is preferably equal to or higher than melting point of the binder to be used minus 60° C., more preferably equal to or higher than melting point of the binder minus 45° C., and further preferably equal to or higher than melting point of the binder minus 30° C. The upper limit of surface temperature of the press part in the case of heating is preferably equal to or lower than melting point of the binder to be used plus 50° C., more preferably equal to or lower than melting point of the binder plus 30° C., and further preferably equal to or lower than melting point of the binder plus 20° C. For example, when PVdF (polyvinylidene fluoride: melting point 150° C.) is used as the binder, it is preferably heated to equal to or higher than 90° C. and equal to or lower than 200° C., more preferably heated to equal to or higher than 105° C. and equal to or lower than 180° C., and further preferably equal to or higher than 120° C. and equal to or lower than 170° C. When a styrene-butadiene copolymer (melting point 100° C.) is used as the binder, it is preferably heated to equal to or higher than 40° C. and equal to or lower than 150° C., more preferably heated to equal to or higher than 55° C. and equal to or lower than 130° C., and further preferably equal to or higher than 70° C. and equal to or lower than 120° C.

Melting point of the binder can be determined by an endothermic peak position of DSC (Differential Scanning calorimetry). For example, using a Differential Scanning calorimeter "DSC7", manufactured by Perkin Elmer Co., Ltd., setting 10 mg of a sample resin into a measurement cell, and increasing temperature from 30° C. to 250° C. in a temperature increasing rate of 10° C./min., under nitrogen gas atmosphere, endothermic peak temperature in temperature increasing step provides melting point.

Press may be carried out plural times by changing conditions of press pressure, clearance, speed, surface temperature of the press part.

Thickness of the positive electrode active material layer is preferably equal to or more than 20 μm and equal to or less than 200 μm, per one surface of the positive electrode power collector. Thickness of the positive electrode active material layer is more preferably equal to or more than 25 μm and equal to or less than 100 μm, per one surface, and further preferably equal to or more than 30 μm and equal to or less than 80 μm, per one surface. When thickness the positive electrode active material layer is equal to or more than 20 μm, sufficient charging and discharge capacitance can be expressed. When thickness the positive electrode active material layer is equal to or less than 200 μm, ion diffusion resistance inside the electrode can be maintained low. Therefore, when thickness the positive electrode active material layer is equal to or more than 20 μm and equal to or less than 200 μm, sufficient output characteristics can be obtained, as well as cell volume can be reduced, and thus energy density can be increased. Thickness of the positive electrode active material layer, in the case where the positive electrode power collector has the through halls or the ruggedness, means average value of thickness of the positive electrode active material layer, per one surface of portions not having the through halls or the ruggedness, of the positive electrode power collector.

It is preferable that $20 \leq C_0 \leq 13\ 1300$ ppm, where $C_0$ (ppm) is concentration of Na and/or K element contained in the positive electrode active material layer of the positive electrode precursor; $8.0 \leq D_0 \leq 50.0$, where $D_0$ (g/m$^2$) is basis weight of the lithium compound other than the positive electrode active material contained in the positive electrode active material layer, per one surface of the positive electrode precursor; $10 \leq E_0 \leq 100$, $0.2 \leq C_0/D_0 \leq 38$, and $0.1 \leq C_0/E_0 \leq 7.2$, where $E_0$ (g/m$^2$) is basis weight of the positive electrode active material contained in the positive electrode active material layer, per one surface of the positive electrode precursor. The nonaqueous lithium-type storage element having higher performance can be prepared, after lithium doping, to be described later, by preparing the positive electrode precursor in this range.

It is preferable that bulk density of the positive electrode active material layer, in the positive electrode after lithium doping, to be described later, is in a range of equal to or higher than 0.50 g/cm$^3$, and more preferably in a range of equal to or higher than 0.55 g/cm$^3$ to equal to or lower than 1.3 g/cm³. When bulk density of the positive electrode active material layer is equal to or higher than 0.50 g/cm³, high energy density can be expressed and miniaturization of the storage element can be attained. When bulk density of the positive electrode active material layer is equal to or lower than 1.3 g/cm³, high power characteristics is obtained, because diffusion of the electrolytic solution in voids inside the positive electrode active material layer is sufficient.

[Amount of Lithium in Positive Electrode Active Material Layer]

Amount of lithium of the positive electrode active material layer, in the present embodiment, is calculated from area of peaks observed in −40 ppm to 40 ppm of a solid $^7$Li-NMR spectrum, and it is preferable that amount of lithium is equal to or more than $10.0 \times 10^{-4}$ mol/g and equal to or less than $300 \times 10^{-4}$ mol/g. The mount of lithium is preferably equal to or more than $12.0 \times 10^{-4}$ mol/g and equal to or less than $280 \times 10^{-4}$ mol/g, more preferably equal to or more than $15.0 \times 10^{-4}$ mol/g and equal to or less than $260 \times 10^{-4}$ mol/g, further preferably equal to or more than $17.0 \times 10^{-4}$ mol/g and equal to or less than $240 \times 10^{-4}$ mol/g, and particularly preferably equal to or more than $20.0 \times 10^{-4}$ mol/g and equal to or less than $220 \times 10^{-4}$ mol/g.

It is not clear principle of enhancement of durability in charging and discharging cycles under high load, while maintaining high I/O characteristics, by adjustment of the amount of lithium in a specific range, but estimated as follows, without limiting to theory. It is considered that amount of lithium is mainly derived from a lithium-containing coated film in the positive electrode active material layer. This lithium-containing coated film has high ion conductivity, because it is internally polarized. Oxidative decomposition of the nonaqueous electrolytic solution can be suppressed by this lithium-containing coated film. The lithium-containing coated film is rarely fractured and rarely generates oxidative decomposition of the nonaqueous electrolytic solution newly, even after repeated charging and discharging cycles of extremely many times, because of stable presence in a charging and discharging process, as compared with an organic and inorganic coated film component not containing lithium ions. Accordingly, it is capable of exhibiting high charging and discharging cycle characteristics under high load.

When the amount of lithium is equal to or more than $10 \times 10^{-4}$ mol/g, oxidative decomposition of the nonaqueous electrolytic solution, during charging and discharging cycles, can be suppressed and thus high charging and discharging cycle characteristics under high load can be shown, because amount of the lithium-containing coated film formed in the positive electrode active material layer is sufficient. When this amount of lithium is equal to or less than $300 \times 10^{-4}$ mol/g, high I/O characteristics can be shown, because increase in resistance caused by the lithium-containing coated film can be suppressed.

In the present specification, amount of lithium contained the positive electrode active material layer can be calculated by the following method using a solid $^7$Li-NMR spectrum.

As a measurement instrument of solid $^7$Li-NMR spectrum, a commercially available one can be used. It is measured under room temperature environment by a single-pulse method under conditions of a rotation number of magic angle spinning of 14.5 Hz, an irradiation pulse width of 45° pulse. In the measurement, it is set so that repeated waiting time between measurements is taken sufficiently.

As a shift standard, an aqueous solution of 1 mol/L lithium chloride is used, and shift position thereof, measured separately as an external standard, is used as 0 ppm. The aqueous solution of lithium chloride is measured by the single-pulse method under an irradiation pulse width of 45° pulse, without rotation of the sample.

Peak area of components observed in a range of −40 ppm to 40 ppm is determined from a solid $^7$Li-NMR spectrum of the positive electrode active material layer, obtained under the condition. The amount of lithium can be calculated by dividing these peak areas with peak area of the aqueous solution of 1 mol/L lithium chloride, measured by setting sample height in a measurement rotor the same as in measurement of the positive electrode active material layer, and further by dividing with weight of the positive electrode active material layer to be used in measurement.

This amount of lithium is amount of total lithium including the lithium compound, and other lithium-containing compounds.

<Negative Electrode>

The negative electrode in the present embodiment has the negative electrode power collector, and the negative electrode active material layer located at one surface or both surfaces thereof, and containing the negative electrode active material.

[Negative Electrode Active Material Layer]

The negative electrode active material layer contains the negative electrode active material, and may contain arbitrary components, such as conductive fillers, the binder, the dispersion stabilizer, etc., as needed.

[Negative Electrode Active Material]

As the negative electrode active material, a material which is capable of intercalating/releasing lithium ions can be used. The negative electrode active material includes, specifically, the carbon material, titanium oxide, silicon, silicon oxide, a silicon alloy, a silicon compound, tin, and a tin compound, etc. Preferably, content ratio of the carbon material is equal to or larger than 50% by weight, and more preferably, equal to or larger than 70% by weight, relative to total weight of the negative electrode active material. Content ratio of the carbon material may be 100% by weight, however, it is preferable to be equal to or smaller than 90% by weight, from the view point of obtaining effect of combined use of other materials well, and it may be equal to or smaller than 80% by weight.

It is preferable that lithium ions are doped in to the negative electrode active material. In the present specification, as lithium ions doped in to the negative electrode active material, mainly three aspects are included.

The first aspect is lithium ions to be intercalated, in advance, as design value, in to the negative electrode active material, before preparation of the nonaqueous lithium-type storage element.

The second aspect is lithium ions intercalated in to the negative electrode active material, in preparation and shipment of the nonaqueous lithium-type storage element.

The third aspect is lithium ions intercalated in to the negative electrode active material, after using the nonaqueous lithium-type storage element, as a device.

Capacitance and operation voltage of the resulting nonaqueous lithium-type storage element can be controlled well, by doping lithium ions, in advance, in to the negative electrode active material.

The carbon material includes, for example, a hard carbon material; a soft carbon material; carbon black; carbon nanoparticles; activated carbon; artificial graphite; natural graphite; graphitized mesophase carbon microspheres; a graphite whisker; an amorphous carbonaceous material, such as a polyacene-based material; a carbonaceous material obtained by heat treatment of a carbon precursor, such as petroleum pitch, coal pitch, meso-carbon microbeads, coke, a synthetic resin (for example, a phenol resin, etc.), etc.; a thermal decomposition product of a furfuryl alcohol resin, or a novolac resin; fullerene; a carbon nanohorn; and a composite carbon material thereof.

Among them, such a composite carbon material is preferable, that is obtained by carrying out heat treatment in a state where both one or more carbon material (hereafter it may also be referred to as a substrate) and the carbonaceous material precursor are present, to make a composite between the substrate and the carbonaceous material derived from the carbonaceous material precursor, from the view point of decreasing resistance of the negative electrode. The carbonaceous material precursor is not limited, as long as being converted to the carbonaceous material by heat treatment, and petroleum-based pitch or coal-based pitch is particularly preferable. The substrate and the carbonaceous material precursor may be mixed at higher temperature than melting point of the carbonaceous material precursor, before carrying out heat treatment. Heat treatment temperature may be such temperature at which components generating by volatilization or thermal decomposition of the carbonaceous material precursor to be used are converted to the carbonaceous material, and preferably equal to or higher than 400° C. and equal to or lower than 2500° C., more preferably equal to or higher than 500° C. and equal to or lower than 2000° C., and further preferably equal to or higher than 550° C. and equal to or lower than 1500° C. Atmosphere for carrying out heat treatment is not limited, however, nonoxidative atmosphere is preferable.

(Composite Carbon Material 1)

The composite carbon material 1 is a composite carbon material, where one or more kinds of the carbon materials, having a BET specific surface area of equal to or larger than 100 m$^2$/g and equal to or smaller than 3000 m$^2$/g, is used as the substrate. The substrate includes, but is not limited to, an activated carbon or carbon black, template porous carbon, graphite having high specific surface area, carbon nanoparticles, etc.

It is preferable that BET specific surface area of the composite carbon material 1 is equal to or larger than 100 m$^2$/g and equal to or smaller than 1500 m$^2$/g, more preferably equal to or larger than 150 m$^2$/g and equal to or smaller than 1100 m$^2$/g, and further preferably equal to or larger than 180 m$^2$/g and equal to or smaller than 550 m$^2$/g. When this BET specific surface area is equal to or larger than 100 m$^2$/g, high I/O characteristics can be shown, because fine pores can be held moderately, and diffusion of lithium ions is good. When it is equal to or smaller than 1500 m$^2$/g, cycle durability is difficult to be impaired, because charging and discharging efficiency of lithium ions is enhanced.

Weight ratio of the carbonaceous material in the composite carbon material 1 to the substrate is preferably equal to or higher than 10% by weight and equal to or lower than 200% by weight. This weight ratio is preferably equal to or higher than 12% by weight and equal to or lower than 180% by weight, more preferably equal to or higher than 15% by weight and equal to or lower than 160% by weight, and particularly preferably equal to or higher than 18% by weight and equal to or lower than 150% by weight. When weight ratio of the carbonaceous material is equal to or higher than 10% by weight, good cycle durability can be shown, because the carbonaceous material is capable of moderately filling micropores which the substrate has, and charging and discharging efficiency of lithium ions enhances. When weight ratio of the carbonaceous material is equal to or lower than 200% by weight, high I/O characteristics can be shown, because fine pores can be held moderately, and diffusion of lithium ions is good.

Doping amount of lithium ions per unit weight of the composite carbon material 1 is preferably equal to or more than 530 mAh/g and equal to or less than 2,500 mAh/g. It is more preferably equal to or more than 620 mAh/g and equal to or less than 2,100 mAh/g, further preferably equal to or more than 760 mAh/g and equal to or less than 1,700 mAh/g, and particularly preferably equal to or more than 840 mAh/g and equal to or less than 1,500 mAh/g.

Potential of the negative electrode decreases by doping of lithium ions. Accordingly, when the negative electrode containing the composite carbon material 1 doped with lithium ions is combined with the positive electrode, voltage of the nonaqueous lithium-type storage element increases, as well as utilizable capacitance of the positive electrode increases. Therefore, capacitance and energy density of the resulting nonaqueous lithium-type storage element increase.

When doping amount is equal to or more than 530 mAh/g, lithium ions can be doped well, even in to irreversible sites, where lithium ions once inserted are not capable of eliminating, in the composite carbon material 1, and further, amount of the composite carbon material 1 can be decreased, relative to desired amount of lithium. Therefore, film thickness of the negative electrode can be made thinner, and high energy density can be obtained. When doping amount increases the more, potential of the negative electrode decreases the more, resulting in enhancement of I/O characteristics, energy density and durability.

On the other hand, when doping amount is equal to or less than 2,500 mAh/g, probability of generation of side effect, such as deposition of lithium metal, etc., can be precluded.

Explanation will be given below on the composite carbon material 1a, using activated carbon as the substrate, as a preferable example of the composite carbon material 1.

It is preferable that the composite carbon material 1a satisfies $0.010 \leq V_{m1} \leq 0.300$, and $0.001 \leq V_{m2} \leq 0.650$, where $V_{m1}$ (cc/g) is mesopore volume, derived from fine pores having a diameter of equal to or larger than 20 Å and equal to or smaller than 500Å, calculated by the BJH method, and $V_{m2}$ (cc/g) is micropore volume, derived from fine pores having a diameter of smaller than 20Å, calculated by the MP method.

Mesopore volume $V_{m1}$ is more preferably $0.010 \leq V_{m1} \leq 0.225$, and further preferably $0.010 \leq V_{m1} \leq 0.200$. Micropore volume $V_{m2}$ is more preferably $0.001 \leq V_{m2} \leq 0.200$, further preferably $0.001 \leq V_{m2} \leq 0.150$, and particularly preferably $0.001 \leq V_{m2} \leq 0.100$.

When mesopore volume $V_{m1}$ is equal to or smaller than 0.300 cc/g, BET specific surface area can be increased, and doping amount of lithium ions can be increased, as well as bulk density of the negative electrode can be increased. As a result, the thinner negative electrode can be attained. When micropore volume $V_{m2}$ is equal to or smaller than 0.650 cc/g, high charging and discharging efficiency to lithium ions can be maintained. When mesopore volume $V_{m1}$ and micropore volume $V_{m2}$ are equal to or larger than the lower limit ($0.010 \leq V_{m1}$, $0.001 \leq V_{m2}$), high I/O characteristics can be obtained.

It is preferable that BET specific surface area of the composite carbon material 1a is equal to or larger than 100 m$^2$/g and equal to or smaller than 1500 m$^2$/g. It is more preferably equal to or larger than 150 m$^2$/g and equal to or smaller than 1100 m$^2$/g, and further preferably equal to or larger than 180 m$^2$/g and equal to or smaller than 5500 m$^2$/g. When this BET specific surface area is equal to or larger than 100 m²/g, high I/O characteristics can be shown, because fine pores can be held moderately, and diffusion of lithium ions is good, or the thinner negative electrode can be attained, because doping amount of lithium ions can be increased. When BET specific surface area is equal to or smaller than 1500 m²/g, cycle durability is difficult to be impaired, because charging and discharging efficiency of lithium ions is enhanced.

Average fine particle diameter of the composite carbon material la is preferably equal to or larger than 20Å, more preferably equal to or larger than 25Å, and further preferably equal to or larger than 30Å, from the view point of attaining high I/O characteristics. Average fine particle diameter is preferably equal to or smaller than 65Å, and more preferably equal to or smaller than 60Å, from the view point of attaining high energy density.

Average particle diameter of the composite carbon material la is preferably equal to or larger than 10 μm. The lower limit is more preferably equal to or larger than 2 μm, and further preferably equal to or larger than 2.5 μm. The upper limit is more preferably equal to or smaller than 6 μm, and further preferably equal to or smaller than 4 μm. When average particle diameter is equal to or larger than 1 μm and equal to or smaller than 10 μm, good durability can be held.

Atomic number ratio (H/C) of hydrogen atom/carbon atom of the composite carbon material 1a is preferably equal to or higher than 0.05 and equal to or lower than 0.35, and more preferably equal to or higher than 0.05 and equal to or lower than 0.15. When H/C is equal to or lower than 0.35, capacitance (energy density) and charging and discharging efficiency increase, because a structure (typically a polycyclic aromatic-based conjugated structure) of the carbonaceous material deposited at the surface of activated carbon develops well. When H/C is equal to or higher than 0.05, good energy density is obtained, because excessive carbonization can be suppressed. H/C is measured by an element analysis apparatus.

The composite carbon material la has an amorphous structure derived from activated carbon of the substrate, and at the same time, has a crystal structure derived mainly from the carbonaceous material deposited. It is preferable, according to an X-ray wide angle diffraction method, that the composite carbon material 1a has a spacing d002 of (002) plain of equal to or larger than 3.60 Å and equal to or smaller than 4.00Å, and crystallite size Lc in a c axis direction, obtained from this half peak width, is preferably equal to or larger than 8.0 Å and equal to or smaller than 20.0Å, and more preferably the one having d002 of equal to or larger than 3.60 Å and equal to or smaller than 3.75Å, and crystallite size Lc in the c axis direction, obtained from this half peak width, of equal to or larger than 11.0 Å and equal to or smaller than 16.0 Å.

An activated carbon used as the substrate of the composite carbon material la is not limited, as long as the resulting composite carbon material la expresses desired characteristics. A commercially available product, obtained from various kinds of raw materials, for example, petroleum-based, coal-based, plant-based, polymer-based one, etc., can be used. Particularly, it is preferable to use activated carbon powder having an average particle diameter of equal to or larger than 1 μm and equal to or smaller than 15 μm. Average particle diameter is more preferably equal to or larger than 2 μm and equal to or smaller than 10 μm.

Fine pore distribution of activated carbon to be used as the substrate is important to obtain the composite carbon material la having a fine pore distribution range specified in the present embodiment.

In activated carbon, it is preferable to satisfy $0.050 \leq V_1 \leq 0.500$, $0.005 \leq V_2 \leq 1.000$, and $0.2 \leq V_1/V_2 \leq 20.0$, where $V_1$ (cc/g) is mesopore volume, derived from fine pores having a diameter of equal to or larger than 20 Å and equal to or smaller than 500Å, calculated by the BJH method, and $V_2$ (cc/g) is micropore volume, derived from fine pores having a diameter of smaller than 20Å, calculated by the MP method.

Mesopore volume $V_1$ is more preferably $0.050 \leq V_1 \leq 0.350$, and further preferably $100 \leq V_1 \leq 0.300$. Micropore volume $V_2$ is more preferably $0.005 \leq V_2 \leq 0.850$, and further preferably $0.100 \leq V_2 \leq 0.800$. Ratio of mesopore volume/micropore volume is more preferably $0.22 \leq V_1/V_2 \leq 15.0$, and further preferably $0.25 \leq V_1/V_2 \leq 10.0$. When mesopore volume $V_1$ of activated carbon is equal to or smaller than 0.500, and micropore volume $V_2$ is equal to or smaller than 1.000, a fine pore structure is controlled easy, because it is enough to deposit moderate amount of the carbonaceous material to obtain the fine pore structure of the composite carbon material la in the present embodiment. The structure can be easily obtained also when mesopore volume $V_1$ of activated carbon is equal to or larger than 0.050, when micropore volume $V_2$ is equal to or larger than 0.005, when $V_1/V_2$ is equal to or larger than 0.2, and when $V_1/V_2$ is equal to or smaller than 20.0.

The carbonaceous material precursor to be used as a raw material of the composite carbon material la is a solid, liquid or soluble-in-solvent organic material, which can make deposited the carbonaceous material on activated carbon by heat treatment. This carbonaceous material precursor includes, for example, pitch, mesocarbon microbeads, coke, a synthetic resin (for example, a phenol resin, etc.), etc. Among these carbonaceous material precursors, it is preferable to use inexpensive pitch, from the viewpoint of production cost. Pitch is largely classified into petroleum-based pitch and coal-based pitch. As petroleum-based pitch, there are exemplified, for example, distillation residue of crude oil, fluid catalytic cracking residue (decant oil, etc.), bottom oil derived from a thermal cracker, ethylene tar obtained in naphtha cracking, etc.

When pitch is used, the composite carbon material la is obtained by heat treatment of pitch under presence of activated carbon together, and subjecting volatilized components or thermally decomposed components of pitch to a thermal reaction on the surface of activated carbon, so that the carbonaceous material is deposited on activated carbon. In this case, deposition of volatilized components or thermally decomposed components of pitch inside the fine pores of activated carbon proceeds at a temperature of about 200 to 500° C., and a reaction of converting deposited components to the carbonaceous material proceeds at a temperature of equal to or higher than about 400° C. Peak temperature (highest temperature attained) in heat treatment is determined as appropriate, depending on characteristics of the resulting composite carbon material la, a thermal reaction pattern, thermal reaction atmosphere, etc. and preferably equal to or higher than 400° C., more preferably 450° C. to 1000° C., and further preferably about 500° C. to 800° C. Time for maintaining peak temperature in heat treatment is preferably for 30 minutes to 10 hours, more preferably for 1 hour to 7 hours, and further preferably for 2 hours to 5 hours. It is considered that the carbonaceous material deposited on the surface of activated carbon is converted to a polycyclic aromatic-based hydrocarbon, when heat treatment is carried out, for example, at a peak temperature of about 500° C. to 800° C., over 2 hours to 5 hours.

Softening point of pitch to be used is preferably equal to or higher than 30° C. and equal to or lower than 250° C., and further preferably equal to or higher than 60° C. and equal to or lower than 130° C. Such pitch that has a softening point of equal to or higher than 30° C. has no handling problems, and is capable of charging in good precision. Such pitch that has a softening point of equal to or lower than 250° C. richly contains relatively low molecular weight compounds, therefore when such pitch is used, deposition is possible as deep as inside the fine pores of activated carbon.

A specific method for producing the composite carbon material 1a includes, for example, a method for deposition of the carbonaceous material in vapor phase, by heat treatment of activated carbon under inert gas atmosphere containing hydrocarbon gas volatilized from the carbonaceous material precursor. There is also possible a method for carrying out heat treatment by pre-mixing of activated carbon and the carbonaceous material precursor, or a method for carrying out heat treatment after coating the carbonaceous material precursor dissolved in a solvent on to activated carbon, and drying.

Such one is preferable that has weight ratio of the carbonaceous material to activated carbon in the composite carbon material 1a is equal to or higher than 10% by weight and equal to or lower than 100% by weight. This weight ratio is preferably equal to or higher than 15% by weight and equal to or lower than 80% by weight. When weight ratio of the carbonaceous material is equal to or higher than 10% by weight, cycle durability is hardly impaired, because the carbonaceous material is capable of moderately filling micropores which activated carbon has, and charging and discharging efficiency of lithium ions enhances. When weight ratio of the carbonaceous material is equal to or lower than 100% by weight, fine pores of the composite carbon material 1a are held moderately, and large specific surface area is maintained as they are. Accordingly, doping amount of lithium ions can be increased, and thus high power density and high durability can be maintained, even when the negative electrode is made thinner.

(Composite Carbon Material 2)

The composite carbon material 2 is the composite carbon material, where one or more kinds of the carbon materials, having a BET specific surface area of equal to or larger than 0.5 $m^2/g$ and equal to or smaller than 80 $m^2/g$, is used as the substrate. The substrate includes, but is not limited to, natural graphite, artificial graphite, low crystalline graphite, hard carbon, soft carbon, carbon black, etc.

It is preferable that BET specific surface area of the composite carbon material 2 is equal to or larger than 1 $m^2/g$ and equal to or smaller than 50 $m^2/g$, more preferably equal to or larger than 1.5 $m^2/g$ and equal to or smaller than 40 $m^2/g$, and further preferably equal to or larger than 2 $m^2/g$ and equal to or smaller than 25 $m^2/g$. When this BET specific surface area is equal to or larger than 1 $m^2/g$, high I/O characteristics can be shown, because reaction field with lithium ions can be secured sufficiently. When it is equal to or smaller than 50 $m^2/g$, high cycle durability can be shown, because charging and discharging efficiency of lithium ions is enhanced, as well as a decomposition reaction of the nonaqueous electrolytic solution during charging and discharging can be suppressed.

Average particle diameter of the composite carbon material 2 is preferably equal to or larger than 1 μm and equal to or smaller than 10 μm. This average particle diameter is more preferably equal to or larger than 2 μm and equal to or smaller than 8 μm, and further preferably equal to or larger than 3 μm and equal to or smaller than 6 μm. When average particle diameter is equal to or larger than 1 μm, high cycle durability can be shown, because charging and discharging efficiency of lithium ions can be enhanced. When it is equal to or smaller than 10 μm, high I/O characteristics can be shown, because reaction area for the composite carbon material 2 and the nonaqueous electrolytic solution increases.

Weight ratio of the carbonaceous material in the composite carbon material 2 to the substrate is preferably equal to or higher than 1% by weight and equal to or lower than 30% by weight. This weight ratio is more preferably equal to or higher than 1.2% by weight and equal to or lower than 25% by weight, and further preferably equal to or higher than 1.5% by weight and equal to or lower than 20% by weight. When this weight ratio is preferably equal to or higher than 1% by weight, high I/O characteristics can be shown, because reaction sites with lithium ions can be increased by the carbonaceous material, as well as desolvation of lithium ions is made easy. When weight ratio of the carbonaceous material is equal to or lower than 20% by weight, high I/O characteristics can be shown, because diffusion in solid of lithium ions between the carbonaceous material and the substrate can be held well. High cycle durability can be shown, because charging and discharging efficiency of lithium ions can be enhanced.

Doping amount of lithium ions per unit weight of the composite carbon material 2 is preferably equal to or more than 50 mAh/g and equal to or less than 700 mAh/g. It is more preferably equal to or more than 70 mAh/g and equal to or less than 650 mAh/g, further preferably equal to or more than 90 mAh/g and equal to or less than 600 mAh/g, and particularly preferably equal to or more than 100 mAh/g and equal to or less than 550 mAh/g.

Potential of the negative electrode decreases by doping of lithium ions. Accordingly, when the negative electrode containing the composite carbon material 2 doped with lithium ions is combined with the positive electrode, voltage of the nonaqueous lithium-type storage element increases, as well as utilizable capacitance of the positive electrode increases. Therefore, capacitance and energy density of the resulting nonaqueous lithium-type storage element increase.

When doping amount is equal to or more than 50 mAh/g, high energy density can be obtained, because lithium ions can be doped well, even in to irreversible sites, where lithium ions once inserted are not capable of eliminating, in the composite carbon material 2. When doping amount increases the more, potential of the negative electrode decreases the more, resulting in enhancement of I/O characteristics, energy density and durability.

On the other hand, when doping amount is equal to or less than 700 mAh/g, probability of generation of side effect, such as deposition of lithium metal, etc., can be precluded.

Explanation will be given below on the composite carbon material 2a, using a graphite material as the substrate, as a preferable example of the composite carbon material 2.

Average particle diameter of the composite carbon material 2a is preferably equal to or larger than 1 μm and equal to or smaller than 10 μm. This average particle diameter is more preferably equal to or larger than 2 μm and equal to or smaller than 8 μm, and further preferably equal to or larger than 3 μm and equal to or smaller than 6 μm. When average particle diameter is equal to or larger than 1 μm, high cycle durability can be shown, because charging and discharging efficiency of lithium ions can be enhanced. When it is equal to or smaller than 10 μm, high I/O characteristics can be shown, because reaction area for the composite carbon material 2a and the nonaqueous electrolytic solution increases.

It is preferable that BET specific surface area of the composite carbon material 2a is equal to or larger than 1 $m^2/g$ and equal to or smaller than 200 $m^2/g$. It is more preferably equal to or larger than 1 $m^2/g$ and equal to or smaller than 15 $m^2/g$. When this BET specific surface area is equal to or larger than 1 $m^2/g$, high I/O characteristics can be shown, because reaction field with lithium ions can be secured sufficiently. When it is equal to or smaller than 20 $m^2/g$, high cycle durability can be shown, because charging and discharging efficiency of lithium ions is enhanced, as well as a decomposition reaction of the nonaqueous electrolytic solution during charging and discharging is suppressed.

The graphite material used as the substrate is not limited, as long as the resulting composite carbon material 2a expresses desires characteristics. For example, artificial graphite, natural graphite, graphitized mesophase carbon microspheres, graphite whisker, etc., can be used. Average particle diameter of the graphite material is preferably equal to or larger than 1 µm and equal to or smaller than 10 µm, and more preferably equal to or larger than 2 µm and equal to or smaller than 8 µm.

The carbonaceous material precursor to be used as a raw material of the composite carbon material 2a is a solid, liquid or soluble-in-solvent organic material, which can make a composite of the carbonaceous material with the graphite material by heat treatment. This carbonaceous material precursor includes, for example, pitch, mesocarbon microbeads, coke, a synthetic resin (for example, a phenol resin, etc.), etc. Among these carbonaceous material precursors, it is preferable to use inexpensive pitch, from the viewpoint of production cost. Pitch is largely classified into petroleum-based pitch and coal-based pitch. As petroleum-based pitch, there are exemplified, for example, distillation residue of crude oil, fluid catalytic cracking residue (decant oil, etc.), bottom oil derived from a thermal cracker, ethylene tar obtained in naphtha cracking, etc.

Weight ratio of the carbonaceous material in the composite carbon material 2a to the graphite material is preferably equal to or higher than 1% by weight and equal to or lower than 10% by weight. This weight ratio is more preferably equal to or higher than 1.2% by weight and equal to or lower than 8% by weight, further preferably equal to or higher than 1.5% by weight and equal to or lower than 6% by weight, and particularly preferably equal to or higher than 2% by weight and equal to or lower than 5% by weight. When this weight ratio is preferably equal to or higher than 1% by weight, high I/O characteristics can be shown, because reaction sites with lithium ions can be increased by the carbonaceous material, as well as desolvation of lithium ions is made easy. When weight ratio of the carbonaceous material is equal to or lower than 20% by weight, high I/O characteristics can be shown, because diffusion within solid of lithium ions between the carbonaceous material and the substrate can be held well. High cycle durability can be shown, because charging and discharging efficiency of lithium ions can be enhanced.

Doping amount (mAh/g) of lithium ions of the negative electrode active material in the nonaqueous lithium-type storage element, in shipping and after use in the present embodiment, can be known, for example, as follows.

Firstly, the negative electrode active material layer in the present embodiment is washed with ethyl methyl carbonate or dimethyl carbonate, air dried, and then an extracted solution, which was extracted using a mixed solvent composed of methanol and isopropanol, and the negative electrode active material layer after extraction are obtained. This extraction is carried out typically inside an Ar box, under an environmental temperature of 23° C.

Doping amount of lithium ions in negative electrode active material can be known by quantitative determination of each amount of lithium contained in the resulting extracted solution and the negative electrode active material layer after extraction, for example, using ICP-MS (Inductively Coupled Plasma Weight Spectrometry), etc., and determining sum thereof. Doping amount (mAh/g) of lithium ions may be calculated by dividing the resulting value with amount of the negative electrode active material provided to extraction.

The carbon material includes, but is not limited to, activated carbon, carbon black, template porous carbon, graphite having high specific surface area, carbon nanoparticles, etc.

(Other Components of Negative Electrode Active Material Layer)

The negative electrode active material layer in the present embodiment may contain arbitrary components, such the conductive fillers, the binder, the dispersion stabilizer, etc., as needed, other than the negative electrode active material.

The conductive fillers includes, but is not limited to, for example, acetylene black, Ketjen black, a vapor-grown carbon fiber, etc. Use amount of the conductive fillers is preferably over 0 part by weight and equal to or less than 30 parts by weight, more preferably over 0 part by weight and equal to or less than 20 parts by weight, and further preferably over 0 part by weight and equal to or less than 15 parts by weight, relative to 100 marts by weight of the negative electrode active material.

The binder includes, but is not limited to, for example, PVdF (polyvinylidene fluoride), PTFE (polytetrafluoroethylene), polyimide, latex, a styrene-butadiene copolymer, fluorocarbon rubber, an acryl copolymer, etc. Use amount of the binder is preferably equal to or more than 1 part by weight and equal to or less than 30 parts by weight, more preferably equal to or more than 2 parts by weight and equal to or less than 27 parts by weight, and further preferably equal to or more than 3 parts by weight and equal to or less than 25 parts by weight, relative to 100 parts by weight of the negative electrode active material. When amount of the binder is equal to or more than 1 part by weight, sufficient electrode strength can be expressed. When amount of the binder is equal to or less than 30 parts by weight, high I/O characteristics is expressed, without inhibiting entry and exit of lithium ions into and from the negative electrode active material.

The dispersion stabilizer includes, but is not limited to, for example, PVP (polyvinyl pyrrolidone), PVA (polyvinyl alcohol), a cellulose derivative, etc. Use amount of the dispersion stabilizer is preferably equal to or more than 0 part by weight and equal to or less than 10 parts by weight, relative to 100 parts by weight of the negative electrode active material. When amount of the dispersion stabilizer is equal to or less than 10 parts by weight, high I/O characteristics is expressed without inhibiting entry and exit of lithium ions into and from the negative electrode active material.

[Negative Electrode Power Collector]

A material for composing the negative electrode power collector in the present embodiment is preferably a metal foil, having high electron conductivity and does not induce elution to the electrolytic solution, and deterioration caused by reactions with electrolytes or ions, etc. The metal foil includes, but is not limited to, for example, an aluminum foil, a copper foil, a nickel foil, a stainless-steel foil, etc. As the negative electrode power collector in the nonaqueous lithium-type storage element of the present embodiment, the copper foil is preferable.

The metal foil may be a usual metal foil not having ruggedness or through holes, or may be a metal foil having ruggedness, which was subjected to emboss finish, chemical etching, an electro-deposition method, blast finish, etc., or it may be a metal foil having the through holes, such as an expand metal, a punching metal, an etching foil, etc.

Thickness of the negative electrode power collector is not limited, as long as shape and strength of the negative electrode can be held sufficiently, and it is preferable, for example, 1 to 100 μm.

[Production of Negative Electrode]

The negative electrode has the negative electrode active material layer at one surface or both surfaces of the negative electrode power collector. Typically, the negative electrode active material layer is firmly fixed to one surface or both surfaces of the negative electrode power collector.

The negative electrode can be produced by production technology of the electrode of the known lithium ion battery, the electric double layer capacitor, etc. For example, the negative electrode can be obtained by preparation of the slurry coating solution by dispersion or dissolution of various kinds of materials containing the negative electrode active material, into water or an organic solvent, coating this coating solution onto one surface or both surfaces of the negative electrode power collector to form a coated film, and drying this. Film thickness or bulk density of the negative electrode active material layer may be adjusted by subjecting the resulting negative electrode to press. Alternatively, such a method may also be possible for dry blending various kinds of materials containing the negative electrode active material, without using a solvent, press-molding the resulting mixture, and then sticking it to the negative electrode power collector using conductive adhesives.

The coating solution may be prepared by dry blending a part of or all of various kinds of powder materials containing the negative electrode active material, and next by the addition of water or an organic solvent, and/or a liquid or slurry material, where the binder or the dispersing agent is dissolved or dispersed. It may be prepared by the addition of various kinds of the powder materials containing the negative electrode active material, in the liquid or slurry material, where the binder or the dispersion stabilizer is dissolved or dispersed in water or an organic solvent.

A method for dissolving or dispersing includes, but is not limited to, a dispersing machine, such as a homo-disperser or a multi-axis dispersing machine, a planetary mixer, a thin film spin-type high speed mixer, etc. It is preferable to carry out dispersion under a peripheral speed of equal to or faster than 1 m/sec and equal to or slower than 50 m/sec, to obtain a well dispersed-state coating solution. When peripheral speed is equal to or faster than 1 m/sec, it is preferable, because various kinds of materials are dissolved or dispersed well. When peripheral speed is equal to or slower than 50 m/sec, it is preferable, because various kinds of materials are not fractured by heat or shear force, due to dispersion, and reaggregation is decreased.

Viscosity ($\eta$b) of the coating solution of the negative electrode is preferably equal to or higher than 1,000 mPa·s and equal to or lower than 20,000 MPa·s, more preferably equal to or higher than 1,500 mPa·s and equal to or lower than 10,000 MPa·s, and further preferably equal to or higher than 1,700 mPa·s and equal to or lower than 5,000 mPa·s. When viscosity ($\eta$b) of the coating solution of the negative electrode is equal to or higher than 1,000 MPa·s, drip is suppressed in formation of the coated film, and width and thickness of the coated film can be controlled well. When viscosity of the coating solution of the negative electrode is equal to or lower than 20,000 MPa·s, stable coating is possible, because of low pressure loss at a flow passage of the coating solution, in using a coating machine, or the coated film thickness can be controlled to equal to or less than desired thickness.

TI value (thixotropy index value) of the coating solution of the negative electrode is preferably equal to or higher than 1.1, more preferably equal to or higher than 1.2, and further preferably equal to or higher than 1.5. When TI value of the coating solution of the negative electrode is equal to or higher than 1.1, width and thickness of the coated film can be controlled well.

A method for forming the coated film of the negative electrode precursor includes, but is not limited to, a coating machine, such as a die coater or a comma coater, a knife coater, a gravure coating machine, etc. The coated film may be formed by single-layer coating, or may be formed by multi-layer coating. Coating speed is preferably equal to or faster than 0.1 m/min and equal to or slower than 100 m/min, more preferably equal to or faster than 0.5 m/min and equal to or slower than 70 m/min, and further preferably equal to or faster than 1 m/min and equal to or slower than 50 m/min. When coating speed is equal to or faster than 0.1 m/min, stable coating is possible, and when coating speed is equal to or slower than 100 m/min, coating precision can be secured sufficiently.

A method for drying the coated film of the negative electrode includes, but is not limited to, a drying method, such as hot air drying or infrared ray (IR) drying, etc. Drying of the coated film may be carried out by drying at single temperature, or by drying by changing temperature in multi-stages. It may be dried by a combination of a plurality of drying methods. Drying temperature is preferably equal to or higher than 25° C. and equal to or lower than 200° C., more preferably equal to or higher than 40° C. and equal to or lower than 180° C., and further preferably equal to or higher than 50° C. and equal to or lower than 160° C. When drying temperature is equal to or higher than 25° C., a solvent in the coated film can be volatilized sufficiently. When drying temperature is equal to or lower than 200° C., cracking of the coated film caused by abrupt volatilization of the solvent, localization of the binder caused by migration, oxidation of the negative electrode power collector or the negative electrode active material layer can be suppressed.

A method for pressing the negative electrode includes, but is not limited to, a press machine, such as a hydraulic machine, a vacuum press machine, etc. Film thickness, and bulk density of the negative electrode active material layer, and electrode strength can be adjusted by press pressure, clearance, and surface temperature of the press part. Press pressure is preferably equal to or higher than 0.5 kN/cm and equal to or lower than 20 kN/cm, more preferably equal to or higher than 1 kN/cm and equal to or lower than 10 kN/cm, and further preferably equal to or higher than 2 kN/cm and equal to or lower than 7 kN/cm. When press pressure is equal to or higher than 0.5 kN/cm, electrode strength can be increased sufficiently. When press pressure is equal to or lower than 20 kN/cm, film thickness or bulk density of the negative electrode active material layer is easily adjusted to a desired level, without generation of warpage or wrinkle in the negative electrode. Clearance between the press rolls can be set to an arbitrary value in response to film thickness of the negative electrode after drying, so as to attain desired film thickness or bulk density of the negative electrode active material layer. Press speed may be set to arbitrary level so as to decrease warpage or wrinkle in the negative electrode. Surface temperature of the press part may be room temperature, or heating may be carried out, as needed. The lower limit of surface temperature of the press part in the case of heating is preferably equal to or higher than melting point of the binder to be used minus 60° C., more preferably equal to or higher than melting point of the binder minus 45° C., and further preferably equal to or higher than melting point of the binder minus 30° C. The upper limit of surface temperature of the press part in the case of heating is preferably equal to or lower than melting point of the binder to be used plus 50° C., more preferably equal to or lower than melting point of the binder plus 30° C., and further preferably equal to or lower than melting point of the binder plus 20° C. For example, when PVdF (polyvinylidene fluoride: melting point 150° C.) is used as the binder, it is preferably heated to equal to or higher than 90° C. and equal to or lower than 200° C., more preferably heated to equal to or higher than 105° C. and equal to or lower than 180° C., and further preferably equal to or higher than 120° C. and equal to or lower than 170° C. When a styrene-butadiene copolymer (melting point 100° C.) is used as the binder, it is preferably heated to equal to or higher than 40° C. and equal to or lower than 150° C., more preferably heated to equal to or higher than 55° C. and equal to or lower than 130° C., and further preferably equal to or higher than 70° C. and equal to or lower than 120° C.

Melting point of the binder can be determined by an endothermic peak position of DSC (Differential Scanning calorimetry). For example, using a Differential Scanning calorimeter "DSC7", manufactured by Perkin Elmer Co., Ltd., setting 10 mg of a sample resin into a measurement cell, and increasing temperature from 30° C. to 250° C. in a temperature increasing rate of 10° C./min., under nitrogen gas atmosphere, endothermic peak temperature in temperature increasing step provides melting point.

Press may be carried out plural times by changing conditions of press pressure, clearance, speed, surface temperature of the press part.

Thickness of the negative electrode active material layer is preferably equal to or more than 5 μm and equal to or less than 100 μm, per one surface of the negative electrode power collector. The lower limit of thickness of the negative electrode active material layer is more preferably equal to or more than 7 μm and further preferably equal to or more than 10 μm. The upper limit of thickness of the negative electrode active material layer is more preferably equal to or less than 80 μm, and further preferably equal to or less than 60 μm. When thickness of the negative electrode active material layer is equal to or more than 5 μm, coating property is superior, because stripes, etc., are difficult to occur in coating the negative electrode active material layer. When thickness of the negative electrode active material layer is equal to or less than 100 μm, high energy density can be expressed, by shrinkage of cell volume. Thickness of the negative electrode active material layer, in the case where the negative electrode power collector has the through halls or the ruggedness, means average value of thickness of the negative electrode active material layer, per one surface of a part not having the through halls or the ruggedness of the negative electrode power collector.

Bulk density of the negative electrode active material layer is preferably equal to or higher than 0.30 g/cm$^3$, and equal to or lower than 1.8 g/cm$^3$, more preferably equal to or higher than 0.40 g/cm$^3$, and equal to or lower than 1.5 g/cm$^3$, and further preferably equal to or higher than 0.45 g/cm$^3$, and equal to or lower than 1.3 g/cm$^3$. When bulk density of the negative electrode active material layer is equal to or higher than 0.30 g/cm$^3$, good strength can be held, as well as good conductivity between negative electrode active materials can be expressed. When bulk density of the negative electrode active material layer is equal to or lower than 1.8 g/cm$^3$, voids can be secured where ions are capable of diffusing sufficiently inside the negative electrode active material layer.

BET specific surface area, mesopore volume, and micropore volume, in the present embodiment, are values each determined by the following methods. Measurement of an adsorption isotherm and a desorption isotherm is carried out by vacuum drying of a sample at 200° C. overnight, and using nitrogen as an adsorbate. BET specific surface area, mesopore volume, and micropore volume are calculated by the BET multi-point method or BET one-point method, the BJH method, and the MP method, respectively, using the resulting adsorption isotherm.

The BJH method is a calculation method generally used in analysis of the mesopore, and is the one proposed by Barrett, Joyner, Halenda. Et. al., (E. P. Barrett, L. G. Joyner and P. Halenda, J. Am. Chem. Soc., 73, 373(1951)).

The MP method means a method for determining micropore volume, micropore area and distribution of the micropore, by utilization of "a t-plot method" (B. C. Lippens, J. H. de Boer, J. Catalysis, 4319(1965)), and is a method contrived by R. S. Mikhail, Brunauer, Bodor (R. S. Mikhail, S. Brunauer, E. E. Bodor, J. Colloid Interface Sci., 26, 45 (1968)).

Average particle diameter in the present specification indicates, in measurement of particle size distribution using a particle size distribution measurement apparatus, and determining a cumulative curve, where total volume is 100%, particle diameter giving a point showing 50% of the cumulative curve thereof (i.e. 50% diameter (Median diameter). This average particle diameter can be measured using a commercially available laser diffraction-type particle size distribution measurement apparatus.

Primary particle diameter in the present specification can be obtained by a method for photographing powder in several view fields using an electron microscope, measuring particle diameter of about 2,000 to 3,000 pieces in the view fields, using a full automatic image processing apparatus, etc., and defining a mathematically averaged value thereof as primary particle diameter.

In the present specification, dispersity is determined by a dispersity evaluation test with a particle gauge defined in JIS K5600. In this test, a sufficient amount of a sample is poured in the deeper tip of a groove, relative to the particle gauge having the groove of desired depth in response to particle size, then it is overflown a little from the groove. Blade tip is placed so as to contact to the deeper tip of the groove of the particle gauge, where longer side of a scraper is placed in parallel to width direction of the gauge, and the scraper is drawn at the surface of the gauge, in right angle to the longer side direction of the groove in uniform speed, taking 1 to 2 seconds to a depth of 0 of the groove, while maintaining the scraper to touch the surface of the gauge, to carry out observation by irradiation of light in an angle of equal to or larger than 20 degree and equal to or smaller than 30 degree, within 3 seconds after completion of drawing, and depth is read, where particles appear in the groove of the particle gauge.

Viscosity ($\eta b$) and TI value in the present specification are values determined by each of the following methods. Firstly, stable viscosity ($\eta a$) is acquired, after measuring for equal to or longer than 2 minutes under condition of a temperature of 25° C. and a shear rate of 2 s$^{-1}$, using an E-type viscometer. Viscosity ($\eta b$) is acquired, which is measured under the same conditions as above, except for changing shear rate to 20 s$^{-1}$. TI value is calculated by equation TI=$\eta a/\eta b$ using viscosity values obtained above. In increasing shear rate from 2 5$^{-1}$ to 20 s$^{-1}$, it may be increased by one step, or it may be increased in multi-stages within the range, while acquiring viscosity at each shear rate, as appropriate.

[Na, K in Negative Electrode Active Material Layer]

The negative electrode active material layer contains sodium (Na) and/or potassium (K) elements. Concentration $C_1$ of the Na and/or K elements is preferably equal to or higher than 2 ppm and equal to or lower than 300 ppm. Concentration $C_1$ is more preferably equal to or higher than 2.5 ppm and equal to or lower than 250 ppm, and further preferably equal to or higher than 3 ppm and equal to or lower than 200 ppm. When concentration $C_1$ is equal to or higher than 2 ppm, energy loss caused by voltage reduction under high temperature and high voltage can be suppressed. When concentration $C_1$ is equal to or lower than 300 ppm, capacitance decrease after charging and discharging cycles under high load can be suppressed. The negative electrode active material is enough to contain either one of Na and K elements, and may contain both. When the negative electrode active material contains both of Na and K, total concentration $C_1$ of Na and K may be equal to or higher than 2 ppm and equal to or lower than 300 ppm.

A method for adding Na and/or K to a negative electrode active material layer includes, but is not limited to, for example, a method for mixing and pulverizing the compound containing Na and/or K, with the lithium compound to make it supported on to the positive electrode precursor, and depositing electrochemically to the negative electrode active material layer, by decomposition by voltage application; a method for coating the compound containing Na and/or K on the negative electrode active material by sputtering or vacuum deposition; a method for preparing the negative electrode after treatment of the negative electrode active material with a solution containing Na and/or K; a method for making deposited on to the negative electrode, by dissolving a salt containing Na and/or K in the electrolytic solution, and by reductive decomposition on the negative electrode; etc. Among them, it is preferable the method for mixing and pulverizing the compound containing Na and/or K, with the lithium compound to make it supported on to the positive electrode precursor, and depositing electrochemically to the negative electrode active material layer, by decomposition by voltage application.

<Separator>

The positive electrode precursor and the negative electrode are laminated or rolled via the separator to form an electrode laminated body or an electrode roll having the positive electrode precursor, the negative electrode and the separator.

A microporous film made of polyethylene, or a microporous film made of polypropylene, which is used in the lithium ion secondary battery, or nonwoven paper made of cellulose, which is used in the electric double layer capacitor, etc., can be used as the separator. A film composed of organic or inorganic fine particles may be laminated on one surface or both surfaces of these separators. The organic or inorganic fine particles may be contained inside the separator.

Thickness of the separator is preferably equal to or more than 5 µm, and equal to or less than 35 µm. When thickness of the separator is equal to or more than 5 µm, self-discharging caused by micro-short of the inside tends to decrease. When thickness of the separator is equal to or less than 35 µm, it is preferable, because output characteristics of the storage element tends to be enhanced.

It is preferable that thickness of a film composed of the organic or inorganic fine particles is equal to or more than 1 µm, and equal to or less than 10 µm. It is preferable that thickness of the film composed of the organic or inorganic fine particles is equal to or more than 1 µm, because self-discharging caused by micro-short of the inside tends to decrease. It is preferable that thickness of the film composed of the organic or inorganic fine particles is equal to or less than 10 µm, because output characteristics of the storage element tends to be enhanced.

<Casing>

As the casing, a metal can, a laminated film, etc., can be used. As the metal can, the one made of aluminum is preferable. As the laminated film, a film laminated with a metal foil and a resin film is preferable, and there is exemplified, for example, the laminated film having a three-layer constitution composed of an outer layer resin film/ the metal foil/an inner resin film.

The outer layer resin film is the one for preventing the metal foil from receiving damage by contact, etc., and a resin, such as nylon or polyester, etc., can be used suitably. The metal foil is the one for preventing permeation of moisture and gas, and a foil of, such as copper, aluminum, stainless-steel, etc., can be used suitably. The inner resin film is used for protecting the metal foil from the electrolytic solution to be contained in the casing, and melt sealing the casing when it is heat sealed, and a polyolefin, an acid-modified polyolefin, etc., can be used suitably.

[Nonaqueous Electrolytic Solution]

The electrolytic solution in the present embodiment is the nonaqueous electrolytic solution containing lithium ions. The nonaqueous electrolytic solution contains a nonaqueous solvent to be described later. It is preferable that the nonaqueous electrolytic solution contains equal to or more than 0.5 mol /L of a lithium salt, based on total volume of the nonaqueous electrolytic solution.

The lithium salt includes, for example, (LiN(SO$_2$F)$_2$), LiN(SO$_2$CF$_3$)$_2$, LiN(SO$_2$C$_2$F$_5$)$_2$, LiN(SO$_2$CF$_3$)(SO$_2$C$_2$F$_5$), LiN(SO$_2$CF$_3$)(SO$_2$C$_2$F$_4$H), LiC(SO$_2$F)$_3$, LiC(SO$_2$CF$_3$)$_3$, LiC(SO$_2$C$_2$F$_5$)$_3$, LiCF$_3$SO$_3$, LiC$_4$F$_9$SO$_3$, LiPF$_6$, LiBF$_4$, etc., and they may be used alone, or in a combination of two or more different types. It is preferable that the lithium salt contains LiPF$_6$ and/or LiN(SO$_2$F)$_2$, because high conductivity can be expressed.

It is preferable that concentration of the lithium salt in the nonaqueous electrolytic solution is equal to or higher than 0.5 mol/L, and more preferably in a range of 0.5 to 2.0 mol/L. When concentration of the lithium salt is equal to or higher than 0.5 mol/L, capacitance of the storage element can be increased sufficiently, because anions are present sufficiently. It is preferable for concentration of the lithium salt to be equal to or lower than 2.0 mol/L, because an undissolved lithium salt deposits in the nonaqueous electrolytic solution, and excessive increase in viscosity of the electrolytic solution can be prevented, conductivity is difficult to decrease, and also output characteristics is difficult to decrease.

In the nonaqueous electrolytic solution of the present embodiment, it is preferable that the lithium salt contains the following:

(A) at least one kind out of $LiPF_6$ and $LiBF_4$; as well as
(B) at least one kind out of $LiN(SO_2F)_2$, $LiN(SO_2CF_3)_2$, and $LiN(SO_2C_2F_5)_2$,
and it is particularly preferable to contain $LiPF_6$ and $LiN(SO_2F)_2$, from the view point of satisfying both of high conductivity and suppression of aluminum corrosion.

It is preferable that molar concentration ratio, $M_A/(M_A+M_B)$, is in a range of equal to or larger than 1/10 and equal to or smaller than 9/10, and more preferably in a range of equal to or higher than 2/10 and equal to or lower than 6/10, where $M_A$ (mol/L) is total molar concentration of the (A), and $M_B$ (mol/L) is total molar concentration of the (B), based on volume of the nonaqeous electrolytic solution. When $M_A/(M_A+M_B)$ is equal to or higher than 1/10, increase in aluminum concentration, in the nonaqueous electrolytic solution during use, up to more than a preferable range can be prevented, and cycle durability is enhanced, because corrosion of an aluminum foil of the positive electrode power collector, caused by the compound (B), can be suppressed by the compound (A). When $M_A/(M_A+M_B)$ is equal to or lower than 9/10, the nonaqueous lithium-type storage element is capable of expressing high I/O characteristics, and durability at high temperature.

$M_B$ (mol/L) is preferably equal to or higher than 0.1 mol/L and equal to or lower than 1.5 mol/L, more preferably equal to or higher than 0.2 mol/L and equal to or lower than 1.0 mol/L, and further preferably equal to or higher than 0.3 mol/L and equal to or lower than 0.8 mol/L. When $M_B$ (mol/L) is equal to or higher than 0.1 mol/L, ion conductivity of the electrolytic solution is increased, as well as an electrolyte coated film is moderately deposited at the interface of the negative electrode, by which gas generated by decomposition of the electrolytic solution can be decreased. When $M_B$ (mol/L) is equal to or lower than 1.5 mol/L, deposition of an undissolved lithium salt in the nonaqueous electrolytic solution, and excessive increase in viscosity of the electrolytic solution can be prevented, conductivity is difficult to decrease, and output characteristics is difficult to decrease. It prevents deposition of an electrolyte salt in charging and discharging, as well as never induces increase in viscosity of the electrolytic solution, even after elapsing a long period of time.

It is preferable that the nonaqueous electrolytic solution of the present embodiment contains $LiN(SO_2CF_3)_2$ in a concentration of equal to or higher than 0.1 mol/L and equal to or lower than 1.5 mol/L, and more preferably equal to or higher than 0.3 mol/L and equal to or lower than 1.2 mol/L, based on total amount of the nonaqueous electrolytic solution. When $LiN(SO_2CF_3)_2$ is equal to or higher than 0.1 mol/L, ion conductivity of the electrolytic solution is increased, as well as an electrolyte coated film is moderately deposited at the interface of the negative electrode, by which gas generated by decomposition of the electrolytic solution can be decreased. When this value is equal to or lower than 1.5 mol/L, deposition of an electrolyte salt in charging and discharging is not generated, as well as viscosity of the electrolytic solution is difficult to increase, even after elapsing a long period of time.

The nonaqueous electrolytic solution in the present embodiment contains preferably a cyclic carbonate and a linear carbonate, as a nonaqueous solvent. It is advantageous that the nonaqueous electrolytic solution contains the cyclic carbonate and the linear carbonate, from the view point of making dissolved a lithium salt of desired concentration, and expressing high lithium ion conductivity. The cyclic carbonate includes, for example, an alkylene carbonate compound represented by ethylene carbonate, propylene carbonate, butylene carbonate, etc. The alkylene carbonate compound is typically an unsubstituted one. The linear carbonate compound includes, for example, a dialkyl carbonate compound represented by dimethyl carbonate, diethyl carbonate, ethyl methyl carbonate, dipropyl carbonate, dibutyl carbonate, etc. The dialkyl carbonate compound is typically an unsubstituted one.

The nonaqueous electrolytic solution preferably contains the cyclic carbonate, as a nonaqueous solvent. It is advantageous for the nonaqueous electrolytic solution to contain the cyclic carbonate, from the view point of making dissolved the lithium salt of desired concentration, and making deposited the lithium compound on to the positive electrode active material layer in suitable amount. The cyclic carbonate includes, for example, ethylene carbonate, propylene carbonate, butylene carbonate, vinylene carbonate, fluoroethylene carbonate, etc.

Total content of the cyclic carbonate is preferably equal to or more than 15% by weight, and more preferably equal to or more than 20% by weight, based on total amount of the nonaqueous electrolytic solution. When the total amount is equal to or more than 15% by weight, high conductivity of lithium ions can be expressed, because making dissolved the lithium salt of desired concentration is possible. Further, Oxidative decomposition of the electrolytic solution can be suppressed, because making deposited the lithium compound on to the positive electrode active material layer in suitable amount is possible.

The nonaqueous electrolytic solution preferably contains the linear carbonate, as a nonaqueous solvent. It is advantageous for the nonaqueous electrolytic solution to contain the linear carbonate, from the view point of expressing high lithium ion conductivity. The linear carbonate includes the dialkyl carbonate compound represented by dimethyl carbonate, diethyl carbonate, methyl ethyl carbonate, dipropyl carbonate, dibutyl carbonate, etc. The dialkyl carbonate compound is typically an unsubstituted one.

Total content of the linear carbonate is preferably equal to or more than 30% by weight, and more preferably equal to or more than 35% by weight, and preferably equal to or less than 95% by weight, and more preferably equal to or less than 90% by weight, based on total amount of the nonaqueous electrolytic solution. When content of the linear carbonate is equal to or more than 30% by weight, lower viscosity of the electrolytic solution can be attained, and high lithium ion conductivity can be expressed. When the total concentration is equal to or less than 95% by weight, the electrolytic solution is capable of further containing additives to be described later.

Total content of the cyclic carbonate and the linear carbonate is preferably equal to or more than 50% by weight, and more preferably equal to or more than 65% by weight, and preferably equal to or less than 95% by weight, and more preferably equal to or less than 90% by weight, based on total amount of the nonaqueous electrolytic solution. When total content of the cyclic carbonate and the linear carbonate is equal to or more than 50% by weight, desired concentration of the lithium salt can be dissolved, and high lithium ion conductivity can be expressed. When total content of the cyclic carbonate and the linear carbonate is equal to or less than 95% by weight, the electrolytic solution is capable of further containing additives to be described later.

The nonaqueous electrolytic solution in the present embodiment may further contain additives. The additives include, but are not limited to, for example, a sultone compound, cyclic phosphazene, an acyclic fluorine-containing ether, a fluorine-containing cyclic carbonate, a cyclic carbonate ester, a cyclic carboxylate ester and a cyclic acid anhydride, etc., and they may be used alone, or in a combination of two or more different types.

[Sultone Compound]

The sultone compound includes, for example, sultone compounds represented by the following general formulae (1) to (3). These sultone compounds may be used alone or in a combination of two or more different types.

[Formula 1]

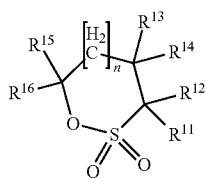

(1)

{wherein $R^{11}$ to $R^{16}$ represent hydrogen atom, a halogen atom, an alkyl group having 1 to 12 carbon atoms, or a halogenated alkyl group having 1 to 12 carbon atoms, and they may be the same, or different each other; and n represents an integer of 0 to 3.}

[Formula 2]

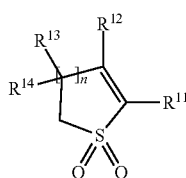

(2)

{wherein $R^{11}$ to $R^{14}$ represent hydrogen atom, a halogen atom, an alkyl group having 1 to 12 carbon atoms, or a halogenated alkyl group having 1 to 12 carbon atoms, and they may be the same, or different each other; and n represents an integer of 0 to 3.}

[Formula 3]

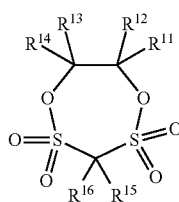

(3)

{wherein $R^{11}$ to $R^{16}$ represent hydrogen atom, a halogen atom, an alkyl group having 1 to 12 carbon atoms, or a halogenated alkyl group having 1 to 12 carbon atoms, and they may be the same, or different each other.}

In the present embodiment, from the viewpoint of having low adverse influence on resistance, and suppressing decomposition of the nonaqueous electrolytic solution at high temperature and thus suppressing gas generation, the saturated cyclic sultone compound preferably includes 1,3-propane sultone, 2,4-butane sultone, 1,4-butane sultone, 1,3-butane sultone, and 2,4-pentane sultone; the unsaturated cyclic sultone compound preferably includes 1,3-propene sultone, and 1,4-butenesultone; and other sultone compound includes, for example, methylenebis(benzenesulfonic acid), methylenebis(phenylmethane sulfonic acid), methylenebis (ethanesulfonic acid), methylenebis(2,4,6-trimethylbenzenesulfonic acid), and methylenebis(2-trifluoromethylbenzene sulfonic acid), and at least one compound selected therefrom is preferable.

It is preferable that total content of the sultone compound, contained in nonaqueous electrolytic solution of the nonaqueous lithium-type storage element in the present embodiment, is 0.1% by weight to 15% by weight, based on total weight of the nonaqueous electrolytic solution. When the total content of the sultone compound is equal to or more than 0.1% by weight, decomposition of the electrolytic solution at high temperature can be suppressed, and thus gas generation can be suppressed. When the total content of the sultone compound is equal to or less than 15% by weight, decrease in ion conductivity of the electrolytic solution can be suppressed, and high I/O characteristics can be held. As for the total content of the sultone compound, the lower limit value is preferably equal to or more than 0.5% by weight, more preferably equal to or more than 1% by weight, and further preferably equal to or more than 3% by weight, and the upper limit value is preferably equal to or less than 10% by weight, more preferably equal to or less than 8% by weight, and further preferably equal to or less than 5% by weight, from the view point of satisfying both of high I/O characteristics and durability.

The cyclic phosphazene includes, for example, ethoxypentafluorocyclotriphosphazene, diethoxytetrafluorocyclotriphosphazene, and phenoxypentafluorocyclotriphosphazene, etc., and at least one compound selected therefrom is preferable.

It is preferable that content ratio of the cyclic phosphazene in the nonaqueous electrolytic solution is 0.5% by weight to 20% by weight, based on total weight of the nonaqueous electrolytic solution. When content ratio of the cyclic phosphazene is equal to or more than 0.5% by weight, decomposition of the electrolytic solution at high temperature can be suppressed, and thus gas generation can be suppressed. When content ratio of the cyclic phosphazene is equal to or less than 20% by weight, high I/O characteristics can be held, because decrease in ion conductivity of the electrolytic solution can be suppressed. From the above reason, content ratio of the cyclic phosphazene is preferably equal to or more than 2% by weight and equal to or less than 15% by weight, and further preferably equal to or more than 4% by weight and equal to or less than 12% by weight.

These cyclic phosphazenes may be used alone, or in a combination of two or more different types.

The acyclic fluorine-containing ether includes, for example, $HCF_2CF_2OCH_2CF_2CF_2H$, $CF_3CFHCF_2OCH_2CF_2CF_2H$, $HCF_2CF_2CH_2OCH_2CF_2CF_2H$, and $CF_3CFHCF_2OCH_2CF_2CFHCF_3$, etc., and among them $HCF_2CF_2OCH_2CF_2CF_2H$ is preferable, from the view point of electrochemical stability.

It is preferable that content ratio of the acyclic fluorine-containing ether is equal to or more than 0.5% by weight and equal to or less than to 15% by weight, and further preferably equal to or more than 1% by weight and equal to or less than to 10% by weight, based on total weight of the nonaqueous electrolytic solution. When content ratio of the acyclic fluorine-containing ether is equal to or more than 0.5% by weight, the storage element having high durability at high temperature can be obtained, because stability against oxidative decomposition of the nonaqueous electrolytic solution increases. When content ratio of the acyclic fluorine-containing ether is equal to or less than 15% by weight, high I/O characteristics can be expressed, because solubility of an electrolyte salt can be held well, as well as ion conductivity of the nonaqueous electrolytic solution can be maintained high.

The acyclic fluorine-containing ether may be used alone, or in a combination of two or more different types.

As the fluorine-containing cyclic carbonate, it is preferable to use at least one kind selected from the group consisting of fluoroehtylene carbonate (FEC) and difluoroehtylene carbonate (dFEC), from the viewpoint of compatibility with other nonaqueous solvents.

It is preferable that content ratio of the fluorine-containing cyclic carbonate is equal to or more than 0.5% by weight and equal to or less than to 10% by weight, and further preferably equal to or more than 1% by weight and equal to or less than to 5% by weight, based on total weight of the nonaqueous electrolytic solution. When content ratio of the fluorine-containing cyclic carbonate is equal to or more than 0.5% by weight, the storage element having high durability at high temperature can be obtained, because a good quality coated film can be formed on the negative electrode, and reductive deposition of the electrolytic solution on the negative electrode can be suppressed. When content ratio of the fluorine-containing cyclic carbonate is equal to or less than 10% by weight, high I/O characteristics can be expressed, because solubility of the electrolyte salt can be held well, as well as ion conductivity of the nonaqueous electrolytic solution can be maintained high.

The fluorine-containing cyclic carbonate may be used alone, or in a combination of two or more different types.

As the cyclic carbonate ester, vinylene carbonized product is preferable. It is preferable that content ratio of the cyclic carbonate ester is equal to or more than 0.5% by weight and equal to or less than to 10% by weight, and further preferably equal to or more than 1% by weight and equal to or less than to 5% by weight, based on total weight of the nonaqueous electrolytic solution. When content ratio of the cyclic carbonate ester is equal to or more than 0.5% by weight, the storage element having high durability at high temperature can be obtained, because a good quality coated film can be formed on the negative electrode, and reductive deposition of the electrolytic solution on the negative electrode can be suppressed. When content ratio of the cyclic carbonate ester is equal to or less than 10% by weight, high I/O characteristics can be expressed, because solubility of the electrolyte salt can be held well, as well as ion conductivity of the nonaqueous electrolytic solution can be maintained high.

The cyclic carboxylate ester includes, for example, γ-butyrolactone, γ-valerolactone, γ-caprolactone, and ε-caprolactone, etc., and at least one compound selected therefrom is preferable. Among them, γ-butyrolactone is particularly preferable, from the viewpoint of enhancing cell characteristics derived from enhancement of dissociation degree of lithium ions.

It is preferable that content ratio of the cyclic carboxylate ester is equal to or more than 0.5% by weight and equal to or less than to 15% by weight, and further preferably equal to or more than 1% by weight and equal to or less than to 5% by weight, based on total weight of the nonaqueous electrolytic solution. When content ratio of the cyclic carboxylate ester is equal to or more than 0.5% by weight, the storage element having high durability at high temperature can be obtained, because a good quality coated film can be formed on the negative electrode, and reductive deposition of the electrolytic solution on the negative electrode can be suppressed. When content ratio of the cyclic carboxylate ester is equal to or less than 5% by weight, high I/O characteristics can be expressed, because solubility of the electrolyte salt can be held well, as well as ion conductivity of the nonaqueous electrolytic solution can be maintained high.

The cyclic carboxylate ester may be used alone, or in a combination of two or more different types.

As the cyclic acid anhydride, at least one kind selected from the group consisting of succinic anhydride, maleic anhydride, citraconic anhydride, and itaconic anhydride is preferable. Among them, it is preferable to select from succinic anhydride and maleic anhydride, from the viewpoints of reducing production cost of the electrolytic solution due to easiness of industrial availability, and being easy to dissolve in the nonaqueous electrolytic solution, etc.

It is preferable that content ratio of the cyclic acid anhydride is equal to or more than 0.5% by weight and equal to or less than to 15% by weight, and further preferably equal to or more than 1% by weight and equal to or less than to 10% by weight, based on total weight of the nonaqueous electrolytic solution. When content ratio of the cyclic acid anhydride is equal to or more than 0.5% by weight, the storage element having high durability at high temperature can be obtained, because a good quality coated film can be formed on the negative electrode, and reductive deposition of the electrolytic solution on the negative electrode can be suppressed. When content ratio of the cyclic acid anhydride is equal to or less than 10% by weight, high I/O characteristics can be expressed, because solubility of the electrolyte salt can be held well, as well as ion conductivity of the nonaqueous electrolytic solution can be maintained high.

The cyclic acid anhydride may be used alone, or in a combination of two or more different types.

[Na, K in Electrolytic Solution]

The nonaqueous electrolytic solution in the present embodiment contains sodium (Na) and/or potassium (K) elements. Concentration $C_2$ of the Na and/or K elements is preferably equal to or higher than 0.5 ppm and equal to or lower than 100 ppm. Concentration $C_2$ is more preferably equal to or higher than 1.5 ppm and equal to or lower than 90 ppm, and further preferably equal to or higher than 3 ppm and equal to or lower than 80 ppm. When concentration $C_2$ is equal to or higher than 0.5 ppm, energy loss caused by voltage reduction under high temperature and high voltage can be suppressed. When concentration $C_2$ is equal to or lower than 100 ppm, capacitance decrease after charging and discharging cycles under high load can be suppressed. The electrolytic solution is enough to contain either one of Na and K elements, and may also contain both. When the electrolytic solution contains both of Na and K, total concentration $C_2$ of Na and K may be equal to or higher than 0.5 ppm and equal to or lower than 100 ppm.

When the nonaqueous lithium-type storage element is stored, for example, under a high temperature of 60° C. by charging to a high voltage of 4.0 V, voltage reduction generates gradually, resulting in loss of charged energy. In particular, in the nonaqueous lithium-type storage element containing the lithium compound in the positive electrode, reaction active species generate by ionization of lithium from the lithium compound in the positive electrode, and by releasing thereof in to the electrolytic solution, and by reaction with the electrolytic solution or electrolytes, energy charged in the negative electrode is consumed, resulting in voltage reduction.

The present inventors have discovered that the voltage reduction can be suppressed by the addition, in the negative electrode active material layer and the electrolytic solution, of a compound containing at least one kind of element selected from Na and K, in the nonaqueous lithium-type storage element containing the lithium compound in the positive electrode, and by making ratio thereof within a certain constant range. Reason for that is not clear, but it is considered, without being limited to theory, that the compound containing cations of, such as Na and/or K, etc., having larger ion radius as compared with lithium (Li) ions, is more easily ionized, because it is able to delocalize positive charges on the cations more as compared with Li ions. Accordingly, ion balance of the whole system of the storage element can be held, and release of Li ions from the lithium compound in the positive electrode can be suppressed, by containing cations of, such as Na and/or K, etc., in the negative electrode active material layer and the electrolytic solution, and holding ratio thereof in a certain constant range.

A method for adding Na and/or K to an electrolytic solution includes, but is not limited to, for example, mixing and pulverizing a compound containing Na and/or K, with a lithium compound to support it on to a positive electrode precursor, and decomposing and eluting it by applying a voltage ; dissolving a salt containing Na and/or K in a electrolytic solution; etc. Among them, a preferable method is mixing and pulverizing the compound containing Na and/or K, with the lithium compound to support it on to a positive electrode precursor, and decomposing and eluting it by applying a voltage.

Ratio of $C_1/C_2$, where $C_1$(ppm) is concentration of Na and/or K elements contained in the negative electrode active material layer, and $C_2$(ppm) is concentration of Na and/or K elements contained in the electrolytic solution, relevant to the present embodiment, is preferably equal to or higher than 1.00 and equal to or lower than 15.00, more preferably equal to or higher than 1.50 and equal to or lower than 12.00, and further preferably equal to or higher than 2.00 and equal to or lower than 9.00. When $C_1/C_2$ is equal to or higher than 1.00 and equal to or lower than 15.00, release of Li ions from the lithium compound in the positive electrode can be suppressed, because Na and/or K in the negative electrode ionize, when the storage element is exposed to a high temperature and high voltage state. As a result, generation of reaction active species is suppressed, and voltage reduction in a high temperature and high voltage state can be suppressed. Superior charging and discharging cycle characteristics under high load of the storage element can be held, because decrease in ion conductivity of the electrolytic solution, caused by excessive elution of Na and/or K ions from the negative electrode can be suppressed, by relatively lower content of Na and/or K ions in the electrolytic solution.

[Aluminum]

The nonaqueous electrolytic solution contains aluminum in an amount of preferably equal to or more than 1 ppm and equal to or less than 300 ppm, more preferably equal to or more than 5 ppm and equal to or less than 200 ppm, and further preferably equal to or more than 10 ppm and equal to or less than 150 ppm, based on weight of the nonaqueous electrolytic solution. When aluminum concentration is equal to or more than 1 ppm, superior durability at high temperature is shown. Detailed mechanism thereof is not clear, but it is estimated, without being limited to theory, that a reductive deposition reaction of the nonaqueous solvent on the negative electrode can be suppressed and thus durability at high temperature is enhanced, because a reaction product of the lithium compound, which is eluted in to the electrolytic solution by oxidative decomposition of the lithium compound in the positive electrode, on the positive electrode, and aluminum present in the electrolytic solution are reduced on the negative electrode, and generates a firm and stable coated film.

It is preferable for aluminum concentration to be equal to or less than 300 ppm, because charging and discharging cycle durability under high load can be held well, because reductive deposition of aluminum on the negative electrode can be suppressed. Combination of the upper limit and the lower limit can be the arbitrary one.

[A method for Adding Aluminum]

A method for adding aluminum to a nonaqueous electrolytic solution in the present embodiment includes, but is not limited to, for example, adding and dissolving an aluminum-containing compound in a nonaqueous electrolytic solution before liquid injection; oxidatively decomposing aluminum of a positive electrode power collector, by applying a high voltage to a nonaqueous lithium-type storage element, and then eluting it in the nonaqueous electrolytic solution; etc.

[A method for Quantitative Determination of Aluminum]

A method for quantitative determination of aluminum in a nonaqueous electrolytic solution in the present embodiment includes, but is not limited to, for example, measuring a nonaqueous electrolytic solution, which was taken from a completed storage element, by using ICP-AES, atomic absorption spectrometry, a fluorescent X-ray analysis, a neutron activation analysis, IPS-MS, etc.

[Nonaqueous Lithium-Type Storage Element]

It is preferable that the nonaqueous lithium-type storage element of the present embodiment is composed by accommodation of an electrode laminated body or an electrode roll, to be described later, together with the nonaqueous electrolytic solution, in the casing.

[Production Method for Nonaqueous Lithium-Type Storage Element]

[Assembling]

In cell assembling, the electrode laminated body can be obtained by lamination of the positive electrode precursor, which is cut in a sheet shape, and the negative electrode, via the separator to obtain a laminated body, and by connecting a positive electrode terminal and a negative electrode terminal to the resulting laminated body. The electrode roll can be obtained by rolling the positive electrode precursor and the negative electrode, via the separator to obtain a rolled body, and by connecting the positive electrode terminal and the negative electrode terminal to the resulting rolled body. Shape of the electrode roll may be a cylinder-type or a flat-type.

A method for connecting a positive electrode terminal and a negative electrode terminal includes, but is not limited to, for example, resistance welding or ultrasonic welding, etc.

It is preferable that the electrode laminated body or the electrode roll, connected with the terminals, is dried to remove a residual solvent. A drying method includes, but is not limited to, vacuum drying, etc. The residual solvent is preferably equal to or less than 1.5% per weight per total weight of the positive electrode active material layer or the negative electrode active material layer. When the residual solvent is equal to or less than 1.5%, it is preferable, because the solvent remaining inside a system is less, by which self-discharging characteristics is improved.

It is preferable that the dried electrode laminated body or the electrode roll is contained in a casing, represented by a metal can or a laminated film, under a dry environment of equal to or lower than dew point −40° C., and the casing is sealed at three sides, while only one side of the opening parts is left open for injecting a nonaqueous electrolytic solution. Temperature equal to or lower than dew point −40° C. is preferable, because moisture is difficult to adhere to the electrode laminated body or the electrode roll, and water remaining inside the system is less, by which self-discharging characteristics is improved. A method for encapsulating a casing includes, but is not limited to, for example, heat seal or impulse seal, etc.

[Liquid Injection, Impregnation, Encapsulation]

It is preferable that the nonaqueous electrolytic solution is injected into an electrode laminated body or an electrode roll contained in a casing, after assembling. It is desirable that the positive electrode, the negative electrode and the separator are sufficiently immersed with the nonaqueous electrolytic solution by further carrying out impregnation, after liquid injection. In a state where at least a part of the positive electrode, the negative electrode and the separator is not immersed with the nonaqueous electrolytic solution, resistance of the resulting nonaqueous lithium-type storage element may increase, or durability thereof may decrease, because doping proceeds irregularly in a lithium doping operation, to be described later. A method for impregnation includes, but is not limited to, for example, placing an electrode laminated body or an electrode roll after liquid injection in a pressure decreasing chamber, in a state where the casing is opened, creating reduced pressure inside the chamber using a vacuum pump, and returning again to atmospheric pressure, etc. After impregnation, the electrode laminated body or the electrode roll can be sealed by encapsulation while reducing pressure, in a state where the casing is opened.

[Lithium Doping]

In lithium doping, it is preferable that lithium ions are pre-doped to the negative electrode active material layer, by decomposition of the lithium compound in the positive electrode precursor by applying voltage between the positive electrode precursor and the negative electrode, releasing lithium ions, and reducing lithium ions at the negative electrode.

In lithium doping, gas, such as $CO_2$, is generated accompanying with oxidative decomposition of the lithium compound in the positive electrode precursor. Accordingly, it is preferable to take means to release the generated gas outside the casing, in applying voltage. As this means, there are included, for example, a method for applying voltage in a state where a part of the casing is opened; a method for applying voltage in a state where a suitable gas releasing means, such as a gas venting valve, a gas permeation film, etc., is formed, in advance, at a part of the casing; etc.

[Aging]

It is preferable that aging is carried out to the electrode laminated body or the electrode roll, after lithium doping. In aging, a solvent in the nonaqueous electrolytic solution is decomposed at the negative electrode in aging, and a sold polymer coated film, having permeability of lithium ions, is formed at the surface of the negative electrode.

A method for aging includes, but is not limited to, for example, reacting a solvent in an electrolytic solution, under a high temperature, etc.

[Gas Venting]

It is preferable that remaining gas in the nonaqueous electrolytic solution, the positive electrode, and the negative electrode is surely removed by further carrying out gas venting, after aging. A state where gas is remained at least in a part of the nonaqueous electrolytic solution, the positive electrode, and the negative electrode results in increasing resistance of the resulting nonaqueous lithium-type storage element, because ion conductivity is hindered.

A method for gas venting includes, but is not limited to, for example, placing an electrode laminated body or an electrode roll in a pressure decreasing chamber, in a state where a casing is opened, and reducing a pressure in the chamber with a vacuum pump, etc. The nonaqueous lithium-type storage element can be prepared by sealing the casing after gas venting.

[Characteristic Evaluation of Nonaqueous Lithium-Type Storage Element]

[Static Capacitance]

In the present specification, static capacitance Fa (F) is a value obtained by the following method.

Firstly, charging under constant current is carried out till attaining 3.8 V, under a current value of 2 C, and subsequently charging under constant voltage is carried out by applying a constant voltage of 3.8 V, for 30 minutes in total, in a thermostat chamber set at 25° C., for a cell corresponding to the nonaqueous lithium-type storage element. Discharging under constant current, at a current value of 2 C, till attaining 2.2 V, is carried out, and capacitance here is defined as Q(C). Static capacitance Fa (F) is a value calculated by $Fa=Q/\Delta Vx=Q/(3.8-2.2)$, using Q obtained here and voltage. change $\Delta Vx$ (V).

Here, as for discharge rare (it may also be called "C rate") of current is relative ratio of current in discharging to discharge capacitance, and, 1 C means, generally, a current value for completion of discharging within 1 hour, in carrying out discharging under constant current from the upper limit voltage to the lower limit voltage. In the present specification, 1 C is defined as a current value for completion of discharging within 1 hour, in carrying out discharging under constant current from the upper limit voltage of 3.8 V to the lower limit voltage of 2.2 V.

[Electric Energy]

In the present specification, electric energy E(Wh) is a value obtained by the following method:

It is a value calculated by $F\times(3.8^2-2.2^2)/2/3600$, using static capacitance F (F) calculated by the method described above.

[Volume]

Volume of the nonaqueous lithium-type storage element is not especially specified, but indicates volume of a portion, where laminated area of the positive electrode active material layer and the negative electrode active material layer, in the electrode laminated body or the electrode roll, is contained by the casing.

For example, in the case of the electrode laminated body or the electrode roll contained in a laminated film, area where the positive electrode active material layer and the negative electrode active material layer are present, out of the electrode laminated body or the electrode roll, is contained in the laminated film formed in a cap shape. Volume ($V_1$) of this nonaqueous lithium-type storage element is calculated by $V_1=l_1\times w_1\times t_1$, using external size length ($l_1$), and external size width (w1) of this cap formed portion, and thickness ($t_1$) of the nonaqueous lithium-type storage element including the laminated film.

In the case of the electrode laminated body or the electrode roll contained in a square shape metal can, volume determined simply by external sizes of the metal can is used as volume of the nonaqueous lithium-type storage element.

Accordingly, Volume ($V_2$) of this nonaqueous lithium-type storage element is calculated by $V_2=l_2 \times w_2 \times t_2$, using external size length ($l_2$), external size width ($w_2$) and external size thickness ($t_2$) of the square shape metal can.

In the case of the electrode laminated body or the electrode roll contained in a cylindrical shape metal can, volume determined by external sizes of the metal can is used as volume of the nonaqueous lithium-type storage element. Accordingly, Volume ($V_3$) of this nonaqueous lithium-type storage element is calculated by $V_3=3.14 \times r \times r \times l_3$, using external size radius (r) of the bottom surface or top surface of the cylindrical shape metal can, and external size length ($l_3$).

[Energy Density]

In the present specification, energy density is a value obtained by the equation of E/V, (Wh/L), using electric energy E and volume $V_i$ (i=1, 2, 3).

[Inner Resistance at Normal Temperature]

In the present specification, inner resistance at normal temperature Ra ($\Omega$) is a value obtained by the following method:

Firstly, charging under constant current is carried out till attaining 3.8 V, under a current value of 20 C, and subsequently charging under constant voltage is carried out by applying a constant voltage of 3.8 V, for 30 minutes in total, in a thermostat chamber set at 25° C., for a cell corresponding to the nonaqueous lithium-type storage element. Subsequently, a discharging curve (time-voltage) is obtained by carrying out discharging under constant current till attaining 2.2 V, under a current value of 20 C. It is a value calculated by reduced voltage $\Delta E=3.8-E_o$, and Ra=$\Delta E$/(20 C(current value A)), where $E_0$ is voltage at discharging time=0 second, obtained by extrapolation by collinear approximation, from voltage value at discharging time of 2 second and 4 second in this discharging curve.

[Storage Test Under High Temperature and High Voltage]

In the present specification, gas generation amount in the storage test under high temperature, and increasing ratio of inner resistance at normal temperature after the storage test under high temperature are measured by the following method:

Firstly, charging under constant current is carried out till attaining 4.0 V, under a current value of 100 C, and subsequently charging under constant voltage is carried out by applying a constant voltage of 4.0 V for 10 minutes, in a thermostat chamber set at 25° C., for a cell corresponding to the nonaqueous lithium-type storage element. After that, the cell is stored under an environment of 60° C., taken out from the environment of 60° C. every two weeks, charging to a cell voltage of 4.0 V by the charging operation, and then stored again under the environment of 60° C. The storage test under high temperature is continued for two months, by repeatedly carrying out this operation. Increasing ratio of inner resistance at normal temperature, after the storage test under high temperature, to inner resistance at normal temperature Ra before the storage test under high temperature, is calculated by Rd/Ra, where Rd is inner resistance at normal temperature after the storage test under high temperature, as resistance value obtained using a similar measurement method as in the inner resistance at normal temperature, for the cell after the storage test under high temperature.

[Increasing Ratio Of Inner Resistance in Normal Temperature Discharging After Charging and Discharging Cycle Test Under High Load]

In the present specification, increasing ratio of inner resistance after the charging and discharging cycle test under high load is measured by the following method:

Firstly, charging under constant current is carried out till attaining 3.8 V, under a current value of 300 C, and subsequently discharging under constant current is carried out till attaining 2.2 V under a current value of 300 C. Increasing ratio of inner resistance in normal temperature discharging, after charging and discharging cycle test under high load, relative to that before starting of the test, is calculated by Re/Ra, by repeating the charging and discharging operation 60000 times, and carrying out measurement of inner resistance in normal temperature discharging, before starting of the test, and after completion of the test, where Ra ($\Omega$) is inner resistance in normal temperature discharging before starting of the test, and Re ($\Omega$) is inner resistance in normal temperature discharging after completion of the test.

[Capacity Retention Rate After Charging and Discharging Cycle Test Under High Load]

In the present specification, capacity retention rate after the charging and discharging cycle test under high load is measured by the following method.

Firstly, charging under constant current is carried out till attaining 3.8 V, under a current value of 200 C, and subsequently discharging under constant current is carried out till attaining 2.2 V, under a current value of 200 C, in a thermostat chamber set at 25° C., for a cell corresponding to the nonaqueous lithium-type storage element. This charging and discharging under high load is repeated 60000 times, then charging is carried out under constant voltage for 1 hour, after attainment of a voltage of 4.5 V under a current value of 20 C. Static capacity retention ratio (Fe/F) after the test, relative to before starting of the test is determined, by carrying out static capacity measurement by the above method to determine static capacitance Fe (F), and comparing this with static capacitance F (F) before starting of the test.

It is preferable that the nonaqueous lithium-type storage element of the present embodiment is the one satisfying the following (a) or/and (b):
(a) Ra·F, that is product of Ra and F, is equal to or larger than 0.3 and equal to or smaller than 3.0,
(b) E/V is equal to or larger than 15 and equal to or smaller than 50,
where Ra($\Omega$) is initial inner resistance at normal temperature, F(F) is static capacitance, E(Wh) is electric energy, and V(L) is volume of the storage element.

As for (a), Ra·F is preferably equal to or smaller than 3.0, more preferably equal to or smaller than 2.6, and further preferably equal to or smaller than 2.4, from the view point of making expressed sufficient charging capacitance and discharge capacitance to large current. When Ra·F is equal to or smaller than the upper limit value, the nonaqueous lithium-type storage element having superior I/O characteristics can be obtained. Accordingly, it is preferable, because it is capable of enduring sufficiently even against high load applied to the nonaqueous lithium-type storage element, by combination of a power storage system using the nonaqueous lithium-type storage element and, for example, a highly efficient engine, etc.

As for (b), E/V is preferably equal to or larger than 15, more preferably equal to or larger than 18, and further preferably equal to or larger than 20, from the view point of making expressed sufficient charging capacitance and discharge capacitance. When E/V is equal to or larger than the lower limit value, the storage element having superior volume energy density can be obtained. Accordingly, it is preferable, because the power storage system can be placed in a limited narrow space inside an automobile, when the power storage system using the storage element and, for example, an automotive engine are used in combination.

It is preferable that the nonaqueous lithium-type storage element of the present embodiment satisfies the following (e) or/and (f):

(e) Rd/Ra is equal to or larger than 0.3 and equal to or smaller than 3.0, and preferably equal to or larger than 0.9 and equal to or smaller than 3.0, (f) gas amount generating during storage for 2 months, under a cell voltage of 4 V, and an environmental temperature of 60° C., is equal to or less than $30 \times 10^{-3}$ cc/F, at 25° C., where Ra ($\Omega$) is initial inner resistance in normal temperature discharging, F(F) is static capacitance, and Rd ($\Omega$) is inner resistance in normal temperature discharging, after storage for two months, under a cell voltage of from 4 V, and an environmental temperature of 60° C.

As for the condition (e), Rd/Ra is preferably equal to or smaller than 3.0, more preferably equal to or smaller than 2.0, and further preferably equal to or smaller than 1.5, from the view point of making expressed sufficient charging capacitance and discharge capacitance to large current, when exposed under high temperature environment for a long period of time. When Rd/Ra is equal to or smaller than the upper limit value, it leads to long-life of a device, because superior output characteristics can be obtained stably for a long period of time.

As for the condition (f), gas amount, which generates in storage for 2 months at a cell voltage of 4.0 V, and an environmental temperature of 60° C., as a value measured at 25° C., is preferably equal to or smaller than $30 \times 10^{-3}$ cc/F, more preferably equal to or smaller than $20 \times 10^{-3}$ cc/F, and further preferably equal to or smaller than $15 \times 10^{-3}$ cc/F, from the view point of suppressing decrease in characteristics of the element, caused by generated gas. When gas amount generated under the condition is equal to or smaller than the upper limit value, there is little risk of swelling of the cell, caused by gas generation, even when the device is exposed to high temperature for a long period of time. Accordingly, the storage element having sufficient safety and durability can be obtained.

It is preferable that the nonaqueous lithium-type storage element of the present embodiment satisfies the following (g) or/and (h):

(g) Re/Ra is equal to or larger than 0.9 and equal to or smaller than 2.0, (h) Fe/F is equal to or larger than 1.01, where Ra ($\Omega$) is initial inner resistance in normal temperature discharging, F (F) is static capacitance, Re ($\Omega$) is inner resistance in normal temperature discharging after carrying out charging and discharging cycle 60,000 times under an environmental temperature of 25° C., a cell voltage of from 2.2 V to 3.8 V, and a rate of 300 C, and Fe (F) is static capacitance after carrying out charging under constant voltage of 4.5 V for 1 hour for the storage element after the cycle test.

As for the condition (g), increasing ratio of inner resistance in normal temperature discharging after the charging and discharging cycle test under high load, Re/Ra, is preferably equal to or smaller than 2.0, more preferably equal to or smaller than 1.5, and further preferably equal to or smaller than 1.2. When increasing ratio of inner resistance after the charging and discharging cycle test under high load is equal to or smaller than the upper limit value, characteristics of the device can be maintained, even when charging and discharging are repeated. Accordingly, it leads to long-life of the device, because superior output characteristics can be obtained stably for a long period of time.

As for the condition (h), it is preferable for Fe/F to be equal to or larger than 1.01, because an exchange cycle of the storage element can be extended, because energy of sufficient capacitance can be taken out, even for the storage element after carrying out charging and discharging for a long period of time.

[A Method for Identifying a Lithium Compound in a Positive Electrode Active Material]

A method for identifying a lithium compound contained in a positive electrode active material includes, but is not limited to, for example, the following method. It is preferable that a lithium compound is identified by using a combination of two or more analysis means described below.

In measurement of SEM-EDX, Raman spectrometry and XPS, to be described later, it is preferable that measurement is carried by disassembling of the nonaqueous lithium-type storage element in the argon box to take it out the positive electrode, and after washing the electrolyte adhered to the surface of the positive electrode. As a solvent for washing the positive electrode, there can be suitably used a carbonate solvent, for example, dimethyl carbonate, ethyl methyl carbonate, and diethyl carbonate, etc. As for the washing method, for example, the positive electrode is immersed in a diethyl carbonate solvent in an amount of 50 to 100 times of weight of the positive electrode, for equal to or longer than 10 minutes, and then the positive electrode is immersed again by changing the solvent. After that the positive electrode is taken out from diethyl carbonate and subjected to vacuum drying and then analysis of SEM-EDX, Raman spectrometry and XPS is carried out. Condition of vacuum drying is such that remaining amount of diethyl carbonate in the positive electrode is equal to or less than 1% by weight, in a range of temperature: 0 to 200° C., pressure: 0 to 20 kPa, time: 1 to 40 hours. Remaining amount of diethyl carbonate can be quantitatively determined, by measuring GC/MS of water after washing with distilled water, to be described later, and after adjustment liquid amount, based on a calibration curve prepared in advance.

As for ion chromatography, to described later, anions can be identified by analysis of water after washing the positive electrode with distilled water.

When identification of the lithium compound was not possible by an analysis means, the lithium compound can also be identified, using $^7$Li-solid state NMR, XRD (X-ray diffraction), TOF-SIMS (Time of Flight-Secondary Ion Weight Spectrometry), AES (Auger Electron Spectroscopy), TPD/MS (Thermally Programmed Desorption/Weight Spectrometry), DSC (Differential Scanning calorimetry), etc., as other analysis means.

[Energy Dispersion-Type X-Ray Analysis]

The lithium compound containing oxygen, and the positive electrode active material can be discriminated by oxygen mapping using the SEM-EDX image of the surface of the positive electrode, measured by an observation magnification of 1000 times to 4000 times. As a measurement example of the SEM-EDX image, it can be measured under conditions of an acceleration voltage of 10 kV, an emission current of 1 µA, a measurement pixel number of 256×256 pixels, and an integration number of 50 times. Surface treatment can also be carried out by a method, such as vacuum deposition or sputtering, etc., of, such as gold, platinum, osmium, etc., to prevent electrification of a sample. As for a measurement method for the SEM-EDX image, it is preferable that luminance and contrast are adjusted so that there are no pixels attaining to the maximum luminance, and average value of brightness value falls within a range of 40% to 60% of luminance. Such a particle that has a bright part, binarized based on average value of brightness for the resulting oxygen mapping, in an area of equal to or more than 50%, can be discriminated as the lithium compound.

[Raman Spectrometry]

The lithium compound containing carbonate ions and the positive electrode active material can be discriminated by Raman imaging of the surface of the positive electrode, measured by an observation magnification of 1000 times to 4000 times. As an example of measurement conditions, they can be measured under an excitation light of 532 nm, an excitation light intensity of 1%, a long operation of an objective lens of 50 times, a diffraction lattice of 1800 gr/mm, a mapping system of point scanning (a slit of 65 mm, a binning of 5 pix), a step of 1 mm, an exposure time per one point of 3 seconds, an integration number of 1 time, and a noise filter present. As for the Raman spectrum measured, frequency is integrated by setting a straight base line in a range of 1071 to 1104 $cm^{-1}$, and calculating area, assuming positive value from the base line as a carbonate ion peak. Frequency to area of carbonate ion peak, where noise components in this time are approximated by a Gaussian-type function, is subtracted from frequency distribution of the carbonate ion.

[X-Ray Photoelectron Spectroscopy (XPS)]

A bonding state of lithium can be discriminated by analysis of an electron state of lithium using XPS. As an example of measurement conditions, it can be measured under an X-ray source of monochromatic AlKα, an X-ray beam diameter of 100 μm φ (25 W, 15 kV), path energy of narrow scan: 58.70 eV, electrification neutralization present, sweep number of narrow scan: 10 times (carbon, oxygen), 20 times (fluorine), 30 times (phosphorous), 40 times (alkali metal), 50 times (silicon), and an energy step of narrow scan: 0.25 eV. It is preferable that surface of the positive electrode is cleaned by sputtering before XPS measurement. As condition of sputtering, for example, surface of the positive electrode can be cleaned under conditions of an acceleration voltage of 1.0 kV, and for 1 minute in a range of 2 mm×2 mm (1.25 nm/min as converted to $SiO_2$). As for the resulting XPS spectrum, assignment is carried out as follows: a peak having a bonding energy of Li1s of 50 to 54 eV as $LiO_2$ or Li—C bonding, a peak of 55 to 60 eV as LiF, $Li_2CO_3$, $Li_xPO_yF_z$ (x, y, z are integers of 1 to 6), a peak having a bonding energy of C1s of 285 eV as C—C bonding, a peak of 286 eV as C—O bonding, a peak of 288 eV as COO, a peak of 290 to 292 eV as $CO_3^{2-}$, a peak having a bonding energy of C—F bonding and O1s of 527 to 530 eV as $O^{2-}$($Li_2O$), a peak of 531 to 532 eV as CO, $CO_3$, OH, $PO_x$ (x is an integer of 1 to 4), and $SiO_x$ (x is an integer of 1 to 4), a peak of 533 eV as C—O, and $SiO_x$ (x is an integer of 1 to 4), a peak having a bonding energy of F1s of 685 eV as LiF, a peak of 687 eV as C-F boning, $Li_xPO_yF_z$ (x, y, z are integers of 1 to 6) , $PF_6^-$, as for bonding energy of P2p, a peak of 133 eV as $PO_x$ (x is an integer of 1 to 4), a peak of 134 to 136 eV as $PF_x$ (x is an integer of 1 to 6), a peak having a bonding energy Si2p of 99 eV as Si, silicide, and a peak of 101 to 107 eV as $Si_xO_y$ (x, y are arbitrary integers). When peaks overlap in the resulting spectrum, it is preferable to assign the spectrum by separation of the peaks, by assuming the Gaussian function or the Lorentz function. The lithium compound present can be identified from the measurement result of the electron state obtained above, and ratio of elements present.

[Ion Chromatography]

Anion species eluted in water can be identified by analysis of water, after washing the positive electrode with distilled water, using ion chromatography. As a column to be used, an ion exchange-type, an ion exclusion-type, a reversed phase ion pair-type can be used. An electric conductivity detector, a UV/visible ray absorbance detector, an electrochemical detector, etc., can be used as a detector, and a suppressor system comprising a suppressor in front of the detector, or a non-suppressor system using a solution having low electric conductivity as an eluent, without a suppressor, can be used. It is preferable that a suitable column and detector are combined, based on the lithium compound identified from analysis result of SEM-EDX, Raman spectrometry, XPS, because measurement can also be carried out by combination of a weight spectrometer and the detector for detecting charged particles.

Holding time of the sample is constant for each of the ion species, once condition, such as the column or the eluent to be used, etc., is determined, and largeness of response of the peaks differs by each of the ion species, but proportional to concentration. Qualitative determination and quantitative determination of the ion species components are possible by measuring, in advance, a standard solution having known concentration, where traceability is secured.

<Quantitative Determination Method of Lithium Compound>

Description will be given below on a quantitative determination method for the lithium compound contained in the positive electrode active material layer in the positive electrode. The lithium compound can be quantitatively determined by washing the positive electrode with an organic solvent and then washing with distilled water, and from weight change of the positive electrode before and after washing with distilled water. Area S ($cm^2$) of the positive electrode to be measured is not limited, preferably 5 $cm^2$ to 200 $cm^2$, and further preferably 25 $cm^2$ to 150 $cm^2$, for decreasing measurement deviation. When area is 5 $cm^2$ or larger, reproducibility of measurement is secured. When area is 200 $cm^2$ or smaller, handling property of the sample is superior. The organic solvent is not especially limited, as long as decomposed materials of the electrolytic solution, which were deposited at the surface of the positive electrode, can be removed, and use of an organic solvent having a solubility of the lithium compound of 2% or less is preferable, because elution of the lithium compound is suppressed. As such an organic solvent, a polar solvent, for example, methanol, acetone, and ethyl acetate, etc., is used suitably.

As for the washing method for the positive electrode, the positive electrode is immersed sufficiently in a methanol solvent in an amount of 50 to 100 times of weight of the positive electrode, for equal to or longer than 3 days. It is preferable that during the immersion, for example, a container is covered with a lid, so that methanol does not volatilize. After the immersion for equal to or longer than 3 days, the positive electrode is taken out from methanol and subjected to vacuum drying, and weight of the positive electrode after vacuum drying is defined $M_0$ (g). Condition of vacuum drying is such that remaining amount of methanol in the positive electrode is equal to or less than 1% by weight, in a range of temperature: 100 to 200° C., pressure: 0 to 20 kPa, time: 5 to 20 hours. Remaining amount of methanol can be quantitatively determined, by measuring GC/MS of water after washing with distilled water, to be described later, based on a calibration curve prepared in advance. Subsequently, the positive electrode is sufficiently immersed in distilled water in 100 times of weight of the positive electrode (100 $M_0$ (g)), for equal to or longer than 3 days. In measurement of ion chromatography, liquid amount is adjusted so that amount of distilled water attains 100 $M_0$ (g). It is preferable, during immersion, for example, to cover a container so that distilled water does not volatilize. The positive electrode is taken out from distilled water, after immersing for equal to or longer than 3 days, and it is subjected to vacuum drying, similarly as in the washing with methanol. Weight of the positive electrode after vacuum drying is defined as $M_1$ (g), and subsequently, the positive electrode active material layer on the positive electrode power collector is removed using a spatula, a brush, etc., to measure weight of the resulting positive electrode power collector. When weight of the resulting positive electrode power collector is defined as $M_2$ (g), D (g/m$^2$), basis weight of the lithium compound contained in the positive electrode active material layer, per one surface of the positive electrode, E (g/m$^2$), basis weight of the positive electrode active material contained in the positive electrode active material layer, per one surface of the positive electrode, and weight % Z of the lithium compound contained in the positive electrode can be calculated by equation (4), equation (5), and equation (6), respectively.

$$D = 0.5 \times 10000 \times (M_0 - M_1)/S \qquad \text{equation (4)}$$

$$E = 0.5 \times 10000 \times (M_1 - M_2)/S \qquad \text{equation (5)}$$

$$Z = 100 \times [1 - (M_1 - M_2)/(M_0 - M_2)] \qquad \text{equation (6)}$$

<Quantitative Determination Method for Na and K Elements: (Inductively Coupled Plasma Weight Spectrometry) (ICP-MS)>

The positive electrode after washing with methanol is decomposed by an acid using a strong acid, such as concentrated nitric acid, concentrated hydrochloric acid, nitrohydrochloric acid, etc., and the resulting solution is diluted with pure water so as to attain an acid concentration of 2% to 3%. In the acid decomposition, heating and pressurization can also be carried out as appropriate. The resulting diluted solution is analyzed using ICP-MS. It is preferable that an element of known amount is added, in advance, as an internal standard in analysis. As for the resulting measurement result, each element can be quantitatively determined, based on a calibration curve, prepared in advance, using a standard solution for chemical analysis.

EXAMPLES

The embodiments of the present invention are described below, with reference to Examples and Comparative Examples. However, the present invention should not be restricted to the following Examples and Comparative Examples.

Example 1-1

<Preparation of Positive Electrode Active Material>
[Preparation of Activated Carbon 1]

A pulverized coconut shell carbonized product was placed in a compact-type carbonization furnace and carbonized at 500° C. for 3 hours under nitrogen atmosphere, to obtain a carbonized product. The resulting carbonized product was placed in an activation furnace, and steam heated in a preheating furnace was introduced in the activation furnace at 1 kg/h, and activated the carbonized product by increasing temperature up to 900° C. taking 8 hours. After the activation, the carbonized product was cooled under nitrogen atmosphere, to obtain an activated carbonized product. The resulting activated carbonized product was washed with passing water for 10 hours, drained, and dried for 10 hours inside an electric drying machine held at 115° C., and then pulverized with a ball mill for 1 hour, to obtain activated carbon 1.

Average particle diameter of activated carbon 1 was measured, using a laser diffraction-type particle size distribution measurement apparatus (SALD-2000), manufactured by Shimadzu Corp., and found it to be 4.2 μm. Fine pore distribution of activated carbon 1 was measured using a fine pore distribution measurement apparatus (AUTOSORB-1, AS-1-MP, manufactured by Yuasa Ionics Co. Ltd. As a result, BET specific area was 2360 m$^2$/g, mesopore volume ($V_1$) was 0.52 cc/g, micropore volume ($V_2$) was 0.88 cc/g, and $V_1/V_2=0.59$.

[Preparation of Activated Carbon 2]

A carbonized product having an average particle diameter of 7 μm was obtained by putting a phenol resin in a furnace and carrying out carbonization treatment at 600° C. for 2 hours under nitrogen atmosphere, and then pulverizing it using a ball mill, and carrying out classification. Activation was carried out by mixing the resulting carbonized product and KOH in a weight ratio of 1:5, and heating it at 800° C. for 1 hour in the furnace, under nitrogen atmosphere. Activated carbon 2 was obtained by taking out the carbonized product after activation, and carrying out washing under stirring for 1 hour, in diluted hydrochloric acid adjusted to a concentration of 2 mol/L, then washing with distilled water under boiling till stabilization in a range of pH 5 to 6, and then carrying out drying.

Average particle diameter of activated carbon 2 was measured, using a laser diffraction-type particle size distribution measurement apparatus (SALD-2000), manufactured by Shimadzu Corp., and found it to be 7.0 μm. Fine pore distribution of activated carbon 2 was measured using a fine pore distribution measurement apparatus (AUTOSORB-1, AS-1-MP, manufactured by Yuasa Ionics Co. Ltd. As a result, BET specific area was 3627 m$^2$/g, mesopore volume ($V_1$) was 1.50 cc/g, micropore volume ($V_2$) was 2.28 cc/g, and $V_1/V_2=0.66$.

<Preparation of Lithium Carbonate 1>

A mixture was obtained by dry blending 200 g of lithium carbonate having an average particle diameter of 53 μm, and 0.010 g of sodium oxide. Lithium carbonate 1 was obtained, after cooling down the resulting mixture to −196° C. with liquid nitrogen, by pulverizing using a pulverizing machine (liquid nitrogen beads mill LNM), manufactured by IMEX Co., Ltd., and using zirconia beads having a diameter of 1.0 mm, at a peripheral speed of 10.0 m/s for 20 minutes. Brittle fracture of lithium carbonate can be attained, while preventing thermal denaturation, by cooling it to −196° C. Average particle diameter of the resulting lithium carbonate 1 was measured and found to be 2.5 μm.

[Production of Positive Electrode Precursor]

A positive electrode precursor was produced using activated carbon 2 as a positive electrode active material, and lithium carbonate 1 as a lithium compound.

A coating solution was obtained by mixing 55.5 parts by weight of activated carbon 2, 32.0 parts by weight of lithium carbonate 1, 3.0 parts by weight of Ketjen black, 1.5 parts by weight of PVP (polyvinyl pyrrolidone), and 8.0 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 17 m/s. Viscosity (ηb) and TI value of the resulting coating solution were measured using an E-type viscometer, TVE-35H, manufactured by Touki Sangyo Co., Ltd. As a result, viscosity (ηb) was 2,730 MPa·s, and TI value was 4.3. Dispersity of the resulting coating solution was measured using a particle gauge, manufactured by YOSHIMITSU SEIKI Co., Ltd. As a result, particle size was 32 μm. A positive electrode precursor 1 (single-sided) and a positive electrode precursor 1 (double-sided) were obtained by coating the coating solution on one surface or both surfaces of an aluminum foil having a thickness of 15 μm, under condition of a coating speed of 1 m/min., using a die coater, manufactured by TORAY ENGINEERING Co., Ltd., and dying at a drying temperature of 120° C. The positive electrode precursor 1 (single-sided) and the positive electrode precursor 1 (double-sided) were pressed using a roll press machine, under condition of a pressure of 6 kN/cm, and a surface temperature of the press part of 25° C. Total thickness of the pressed positive electrode precursor 1 (single-sided) and the positive electrode precursor 1 (double-sided) was determined by measurement at arbitrary 10 points of the positive electrode precursor 1 (single-sided) and the positive electrode precursor 1 (double-sided), using a film thickness meter, Linear Gauge Sensor, GS-551, manufactured by ONO SOKKI Co., Ltd. Film thickness of the positive electrode active material layer of the positive electrode precursor 1 (single-sided) and the positive electrode precursor 1 (double-sided) was determined by subtracting thickness of the aluminum foil, from average value of total thicknesses measured. As a result, film thickness of the positive electrode active material layer was 52 μm, per one surface.

<Preparation of Negative Electrode Active Material>

BET specific area and fine pore distribution of commercially available artificial graphite were measured by the above method, using a fine pore distribution measurement apparatus (AUTOSORB-1, AS-1-MP, manufactured by Yuasa Ionics Co. Ltd. As a result, BET specific area was 3.1 $m^2/g$, and average particle diameter was 4.8 μm.

300 g of this artificial graphite was placed into a cage made of a stainless-steel mesh, and the cage was placed on a stainless-steel tray containing 30 g of coal-based pitch (softening point: 50° C.), and the both of them were placed in an electric furnace (effective dimension of inside the furnace: 300 mm×300 mm×300 mm). A composite porous material 1a was obtained, by subjecting this to a thermal reaction under nitrogen atmosphere, by increasing temperature up to 1000° C. taking 12 hours, and holding at the same temperature for 5 hours. The resulting composite porous carbon material 1a was taken out from the electric furnace, after cooling down to 60° C. by natural cooling.

As for the resulting composite porous carbon material 1a, BET specific area and fine pore distribution were measured by a similar method as above. Results were as follows: BET specific area was 6.1 $m^2/g$, and average particle diameter was 4.9 μm. Weight ratio to activated carbon of the carbonaceous material derived from coal-based pitch was 2.0%.

[Production of Negative Electrode]

A negative electrode was produced using the composite porous carbon material 1a as the negative electrode active material.

A coating solution was obtained by mixing 84 parts by weight of the composite porous carbon material 1a, 10 parts by weight of acetylene black, 6 parts by weight of PVdF (polyvinylidene fluoride), as well as NMP (N-methylpyrrolidone), and dispersing them using a thin film spin-type high speed mixer, Filmix, manufactured by PRIMIX Co., Ltd., under condition of a peripheral speed of 17 m/s.

Viscosity (ηb) and TI value of the resulting coating solution were measured using an E-type viscometer, TVE-35H, manufactured by Touki Sangyo Co., Ltd. As a result, viscosity (ηb) was 2,326 MPa·s, and TI value was 2.7.

A negative electrode 1 was obtained by coating the coating solution on both surfaces of an electrolytic copper foil having a thickness of 10 μm, under condition of a coating speed of 2 m/min., using a die coater, manufactured by TORAY ENGINEERING Co., Ltd., and dying at a drying temperature of 120° C. The resulting negative electrode 1 was pressed using a roll press machine, under condition of a pressure of 5 kN/cm, and a surface temperature of the press part of 25° C. Total thickness of the pressed negative electrode 1 was determined by measurement at arbitrary 10 points of the negative electrode 1, using a film thickness meter, Linear Gauge Sensor, GS-551, manufactured by ONO SOKKI Co., Ltd. Film thickness of the negative electrode active material layer of the negative electrode 1 was determined by subtracting thickness of the copper foil, from average value of total thicknesses measured. As a result, film thickness of the negative electrode active material layer was 30 μm, per one surface.

[Measurement of Capacitance Per Unit Weight of Negative Electrode]

An operating electrode was prepared by cutting out one piece to a size of 1.4 cm×2.0 cm (2.8 $cm^2$) from the resulting negative electrode 1, and removing one layer of the negative electrode active material layer coated on both surfaces of the copper foil, using a spatula, a brush, etc. An electrochemical cell was prepared in an argon box, using each metal lithium as the operating electrode and a reference electrode, and using a nonaqueous solution, where $LiPF_6$ was dissolved in a mixed solvent of pethylene carbonate (EC) and ethyl methyl carbonate (EMC) in a volume ratio of 1:1, so as to attain a concentration of 1.0 mol/L, as an electrolytic solution.

As for the resulting electrochemical cell, initial charging capacitance was measured by the following procedure, using a charging and discharging apparatus (TOSCAT-3100U), manufactured by Toyosystem Corp.

As for the electrochemical cell, charging under constant current was carried out till attaining a voltage value of 0.01 V, under a current value of 0.5 mA/$cm^2$, at a temperature of 25° C., and then further, charging under constant voltage was carried out till attaining a current value of 0.01 mA/$cm^2$. Charging capacitance in this charging under constant current and charging under constant voltage was evaluated as initial charging capacitance, and it was 0.74 mAh, and capacitance (doping amount of lithium ions) per unit weight of the negative electrode 1 was 54.5 mAh/g.

[Preparation of Electrolytic Solution]

A nonaquous electrolytic solution 1 was obtained by using a mixed solvent of ethylene carbonate (EC) and methyl ethyl carbonate (EMC) (volume ratio=33:67), and, dissolving therein $LiN(SO_2F)_2$ and $LiPF_6$, so as to attain a concentration ratio of 75:25 (molar ratio), and a concentration sum of $LiN(SO_2F)_2$ and $LiPF_6$ of 1.2 mol/L, relative to total electrolytic solution. Concentration of $LiN(SO_2F)_2$ and $LiPF_6$ in the nonaquous electrolytic solution 1 was 0.3 mol/L and 0.9 mol/L, respectively.

[Preparation of Nonaqueous Lithium-Type Storage Element]

Two sheets of the positive electrode precursor 1 (single-sided) and 19 sheets of the positive electrode precursor 1 (double-sided) were cut out to a size of 10.0 cm×10.0 cm (100 $cm^2$) from the resulting positive electrode precursor 1. Subsequently, the negative electrode 1 was cut out to 20 pieces, so that the negative electrode active material layer attains a size 10.1 cm×10.1 cm (102 cm²). Separators having a size of 10.3 cm×10.3 cm (106 cm²), made of polyethylene, (manufactured by ASAHI KASEI Corp., thickness 20 μm) were prepared 40 pieces. An electrode laminated body was obtained by lamination of these in the order of the positive electrode precursor 1, the separator, and the negative electrode 1, so that the positive electrode active material layer and the negative electrode active material layer are opposing by sandwiching the separator, and that outermost layer is the positive electrode precursor 1 (single-sided). A positive electrode terminal and a negative electrode terminal were ultrasonic welded to the resulting electrode laminated body, which body was put into a container formed with an aluminum laminate packaging material, and three sides including the electrode terminals were sealed by heat seal.

About 80 g of a nonaqueous electrolytic solution was injected into an electrode laminated body contained in an aluminum laminate packaging material, under atmospheric pressure, a temperature of 25° C., and a dry air environment of equal to or lower than dew point −60° C. Subsequently, this was put in a reduced pressure chamber to reduce pressure from atmospheric pressure to −87 kPa, then restored to atmospheric pressure, and stood still for 5 minutes. Then, an operation of restoring to atmospheric pressure, after reducing pressure from atmospheric pressure to −87 kPa, was repeated four times, followed by standing still for 15 minutes. Furthermore, after reducing pressure from atmospheric pressure to −91 kPa, atmospheric pressure was restored. An operation procedure for similarly reducing pressure and restoring to atmospheric pressure was repeated seven times in total (pressure was reduced from atmospheric pressure each to −95, −96, −97, −81, −97, −97, −97 kPa). The nonaqueous electrolytic solution 1 was impregnated to the electrode laminated body, by the above steps.

After that, the electrode laminated body impregnated with the nonaqueous electrolytic solution 1 was put in a reduced pressure sealing machine, and the aluminum laminate packaging material was encapsulated, by sealing in a state of a reduced pressure of −95 kPa, at 180° C. for 10 seconds, and a pressure of 0.1 MPa.

[Lithium Doping]

The resulting electrode laminated body was put into an argon box having a temperature of 25° C., dew point −60° C., and an oxygen concentration of 1 ppm. Doping of lithium to the negative electrode was carried by cutting surplus portions of the aluminum laminate packaging material, for unsealing, and by carrying out initial charging by a method for carrying out charging under constant current till attaining a voltage of 4.5 V, under a current value of 100 mA/cm², and subsequently continuing charging under constant voltage at 4.5 V for 72 hours, using a power source (P4LT18-0.2), manufactured by Matsusada Precision Inc. After completion of lithium doping, the aluminum laminate was encapsulated, using a heat seal machine (FA-300), manufactured by FUJIIMPULSE Co., Ltd.

[Aging]

The electrode laminated body, after lithium doping, was taken out from the argon box, then by carrying out discharging under constant current at 3.8 V for 1 hour, after carrying out discharging under constant current till attaining a voltage of 3.8 V, at 100 mA/cm², under an environment of 25° C., voltage was adjusted to 3.8 V. Subsequently, the electrode laminated body was stored in a thermostat chamber set at 60° C. for 48 hours.

[Gas Venting]

As for the electrode laminated body after aging, a part of the aluminum laminate packaging material was unsealed at a temperature of 25° C., and under a dry air environment of dew point −40° C. Subsequently, the electrode laminated body was put in a reduced pressure chamber to reduce pressure from atmospheric pressure to −80 kPa, taking 3 minutes, using a diaphragm pump (manufactured by KNF Co., Ltd., N816. 3KT. 45. 18), then restored to atmospheric pressure, taking 3 minutes, which operation was repeated 3 times in total. Then, a nonaqueous lithium-type storage element was prepared by encapsulation of the aluminum laminate packaging material by sealing under a pressure of 0.1 MPa at 200° C. for 10 seconds, after putting the electrode laminated body in the reduced pressure sealing machine to reduce pressure to −90 kPa. By the above procedure, 3 pieces of the nonaqueous lithium-type storage elements were prepared.

[Evaluation of Nonaqueous Lithium-Type Storage Element]
[Measurement of Static Capacitance Fa]

As for one piece out of the resulting nonaqueous lithium-type storage elements, charging under constant current was carried out till attaining 3.8 V, under a current value (1.6 A) of 2 C, and subsequently charging under constant voltage was carried out by applying a constant voltage of 3.8 V, for 30 minutes in total, using a charging and discharging apparatus (5V, 360 A), manufactured by FUJITSU TELECOM NETWORKS Ltd., in a thermostat chamber set at 25° C. After that, discharging under constant current was carried out under a current value (1.6 mA) of 2 C, till attaining 2.2 V, and capacitance here is defined as Q(C), and static capacitance Fa calculated by F=Q/(3.8-2.2) was 1797 F.

[Charging and Discharging Cycle Test Under High Load]

As for the same nonaqueous lithium-type storage element, charging and discharging procedure was repeated 60000 times without stopping, where charging under constant current was carried out till attaining 3.8 V, under a current value (160 mA) of 200 C, and subsequently discharging under constant current was carried out till attaining 2.2 V, under a current value of 200 C, using a charging and discharging apparatus (5V, 360 A), manufactured by FUJITSU TELECOM NETWORKS Ltd., in a thermostat chamber set at 25° C. The nonaqueous lithium-type storage element was charged till attaining 4.5 V, under a current value (16 mA) of 20 C, under an environment of 25° C., after completion of the cycles, and then charging under constant voltage was continued for 1 hour. After that static capacitance Fb was measured and found to be 1921 F, and Fb/Fa=1.07.

[Storage Test Under High Temperature And High Voltage]

As for one piece out of the resulting remaining nonaqueous lithium-type storage elements, charging under constant current was carried out till attaining a voltage of 3.800 V, under a current value (1.6 A) of 2 C, and subsequently charging under constant voltage was carried out by applying a constant voltage of 3.800 V for 30 minutes in total, using a charging and discharging apparatus (5 V, 10 A), manufactured by Asca Densi Co., Ltd. After that, the nonaqueous lithium-type storage element was stored in a thermostat chamber set at 70° C. for 30 days. After storage for 30 days, voltage of the nonaqueous lithium-type storage element was reduced to 3,714 V, and thus voltage change amount ΔV was 0.086 V.

<Analysis and Quantitative Determination of Lithium Compound>
<Preparation of Positive Electrode Sample>

The resulting remained nonaqueous lithium-type storage element was disassembled in an argon box at dew point temperature −72° C., and the positive electrode coated with the positive electrode active material layer at both surfaces was cut out to a size of 10 cm×10 cm, immersed in 30 g of a diethyl carbonate solvent, and washed for 10 minutes by moving it occasionally with a pair of tweezers. Subsequently, the positive electrode was taken out, air dried for 5 minutes in the argon box, immersed in newly prepared 30 g of a diethyl carbonate solvent, and washed for 10 minutes by a similar method as above. A positive electrode sample 1 was obtained by taking out the positive electrode after washing, from the argon box, and drying for 20 hours under condition of a temperature of 25° C. and a pressure of 1 kPa, using a vacuum drying machine (manufactured by Yamato Scientific Co., Ltd.).

<Quantitative Determination of Lithium Compound and Na>

The resulting positive electrode sample 1 was cut out to a size of 5 cm×5 cm (positive electrode sample 1-1, weight 0.265 g), and to a size of 5 cm×4 cm (positive electrode sample 1-2, weight 0.212 g) and each one was immersed in 20 g of methanol, and after covering a container with a lid, they were stood still for 3 days under an environment of 25° C. After that, the positive electrode sample 1-1 and the positive electrode sample 1-2 were taken out and vacuum dried for 10 hours under conditions of 120° C. and 5 kPa. Weight $M_0$ of the positive electrode sample 1-1 after vacuum drying was 0.252 g, and weight of the positive electrode sample 1-2 after vacuum drying was 0.202 g. As for the methanol solution after washing, GC/MS was measured under condition in preparation of a calibration curve, in advance, and it has been confirmed that amount of diethyl carbonate present was less than 1%. Subsequently, the positive electrode sample 1-1 was impregnated in 25.20 g of distiller water, and by covering the container with the lid, stood still for 3 days under an environment of 45° C. After that, the positive electrode sample 1-1 was taken out and vacuum dried for 12 hours under conditions of 150° C. and 3 kPa. Weigh $M_1$ after vacuum drying was 0.239 g, and as for distiller water after washing, GC/MS was measured under condition in preparation of a calibration curve, in advance, and it has been confirmed that amount of methanol present was less than 1%. After that, an active material layer on a positive electrode power collector was removed using a spatula, a brush, etc., and weight $M_2$ of the positive electrode power collector was measured, and found to be 0.099 g. According to equation (4) and equation (5), it was found that D=2.6 g/m$^2$ and E=28.0.

As for the positive electrode sample 1-2, the positive electrode active material layer on the positive electrode power collector was removed using a spatula, made of Teflon (registered trade name), and the resulting positive electrode active material layer was subjected to acid decomposition using concentrated nitric acid. The resulting solution was diluted with pure water, so as to attain an acid concentration of 2%, and then analysis of Na was carried out using ICP-MS, and found that C=3.1 ppm.

From the above, it was found that C/D is 1.2, C/E is 0.1, and D/E is 0.09.

<Calculation of $A_1$ and $A_2$>

[Measurement of SEM and EDX of Surface of Positive Electrode]

A small piece, having a size of 1 cm×1 cm, was cut out from the remaining positive electrode sample 1, and the surface thereof was coated with gold by sputtering under a vacuum of 10 Pa. Subsequently SEM and EDX of the surface of the positive electrode were measured, under atmospheric exposure.

(Measurement conditions of SEM-EDX)
Measurement apparatus: Field emission-type SEM, FE-SEM, S-4700, manufactured by Hitachi High-Technologies Corp., and energy dispersion-type X-ray analysis apparatus, EMAX, manufactured by Horiba, Co. Ltd.
Acceleration voltage: 10 kV
Emission current: 1 μA
Measurement magnification: 2000 times
Electron beam incident angle: 90°
X-ray take out angle: 30°
Dead time: 15%
Mapping elements: C, O, F
Measurement pixel number: 256×256 pixels
Measurement time: 60 sec
Integration number: 50 times
Luminance and contrast were adjusted so that there were no pixels attaining to the maximum luminance, and average value of brightness fell within a range of 40% to 60% of the luminance.

(Analysis of SEM-EDX)

As for the resulting oxygen mapping and fluorine mapping, binarization was carried out based on average value of brightness using image analysis software (ImageJ). Area of the oxygen mapping this time was 15.4%, relative to total image, and area of the fluorine mapping was 32.2%. Overlapped area of the oxygen mapping and fluorine mapping, obtained by binarization, to total image was 13.9%, and $A_1$ (%) was 90.3% calculated by $A_1$=100×13.8/15.2, where $A_1$ (%) is area overlap ratio of fluorine mapping to oxygen mapping.

[Measurement of SEM and EDX of Cross-Section of Positive Electrode]

A cross section perpendicular to surface direction of the positive electrode sample 1 was prepared, by cutting out a small piece of a size of 1 cm×1 cm, from the positive electrode sample 1, using SM-09020CP, manufactured by JEOL, and using argon gas, under conditions of an acceleration voltage of 4 kV and a beam diameter of 500 μm. After that, SEM and EDX of cross-section of the positive electrode were measured by the method described above.

As for SEM and EDX of the resulting cross-section of the positive electrode, oxygen mapping and fluorine mapping were binarized similarly as above, and area overlap ratio $A_2$ of fluorine mapping to oxygen mapping was calculated, and found to be 40.1%.

Example 1-2

A nonaqueous lithium-type storage element was prepared by a similar method as in Example 1-1, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-3

A nonaqueous lithium-type storage element was prepared by a similar method as in Example 1-1, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-4

A nonaqueous lithium-type storage element was prepared by a similar method as in Example 1-1, except for dry blending 200 g of lithium carbonate and 0.02 g of sodium oxide, and then cooling to −196° C. with liquid nitrogen and pulverizing using zirconia beads having a diameter of 1.0 mm, at a peripheral speed of 10.0 m/s for 20 minutes.

Example 1-5

A nonaqueous lithium-type storage element was prepared by a similar method as in Example 1-4, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-6

A nonaqueous lithium-type storage element was prepared by a similar method as in Example 1-4, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-7

A nonaqueous lithium-type storage element was prepared by a similar method as in Example 1-1, except for dry blending 200 g of lithium carbonate and 0.20 g of sodium oxide, and then cooling to −196° C. with liquid nitrogen and pulverizing using zirconia beads having a diameter of 1.0 mm, at a peripheral speed of 10.0 m/s for 20 minutes.

Example 1-8

A nonaqueous lithium-type storage element was prepared by a similar method as in Example 1-7, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-9

A nonaqueous lithium-type storage element was prepared by a similar method as in Example 1-7, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-10

A nonaqueous lithium-type storage element was prepared by a similar method as in Example 1-1, except for dry blending 200 g of lithium carbonate and 0.50 g of sodium oxide, and then cooling to −196° C. with liquid nitrogen and pulverizing using zirconia beads having a diameter of 1.0 mm, at a peripheral speed of 10.0 m/s for 20 minutes.

Example 1-11

A nonaqueous lithium-type storage element was prepared by a similar method as in Example 1-10 except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-12

A nonaqueous lithium-type storage element was prepared by a similar method as in Example 1-10, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-13

A nonaqueous lithium-type storage element was prepared by a similar method as in Example 1-1, except for dry blending 200 g of lithium carbonate and 0.20 g of potassium oxide, and then cooling to −196° C. with liquid nitrogen and pulverizing using zirconia beads having a diameter of 1.0 mm, at a peripheral speed of 10.0 m/s for 20 minutes.

Example 1-14

A nonaqueous lithium-type storage element was prepared by a similar method as in Example 1-13, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-15

A nonaqueous lithium-type storage element was prepared by a similar method as in Example 1-13, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-16

A nonaqueous lithium-type storage element was prepared by a similar method as in Example 1-1, except for dry blending 200 g of lithium carbonate, 0.10 g of sodium oxide and 0.10 g of potassium oxide, and then cooling to −196° C. with liquid nitrogen and pulverizing using zirconia beads having a diameter of 1.0 mm, at a peripheral speed of 10.0 m/s for 20 minutes.

Example 1-17

A nonaqueous lithium-type storage element was prepared by a similar method as in Example 1-16, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-18

A nonaqueous lithium-type storage element was prepared by a similar method as in Example 1-16, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-1

A nonaqueous lithium-type storage element was prepared by a similar method as in Example 1-1, except for dry blending 200 g of lithium carbonate and 1.00 g of sodium oxide, and then cooling to −196° C. with liquid nitrogen and pulverizing using zirconia beads having a diameter of 1.0 mm, at a peripheral speed of 10.0 m/s for 20 minutes.

Comparative Example 1-2

A nonaqueous lithium-type storage element was prepared by a similar method as in Comparative Example 1-1, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-3

A nonaqueous lithium-type storage element was prepared by a similar method as in Comparative Example 1-1, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-4

A nonaqueous lithium-type storage element was prepared by a similar method as in Example 1-1, except for dry blending 200 g of lithium carbonate and 1.50 g of sodium oxide, and then cooling to −196° C. with liquid nitrogen and pulverizing using zirconia beads having a diameter of 1.0 mm, at a peripheral speed of 10.0 m/s for 20 minutes.

Comparative Example 1-5

A nonaqueous lithium-type storage element was prepared by a similar method as in Comparative Example 1-4 except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-6

A nonaqueous lithium-type storage element was prepared by a similar method as in Comparative Example 1-4 except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-7

A nonaqueous lithium-type storage element was prepared by a similar method as in Example 1-1, except for dry blending 200 g of lithium carbonate and 2.00 g of sodium oxide, and then cooling to −196° C. with liquid nitrogen and pulverizing using zirconia beads having a diameter of 1.0 mm, at a peripheral speed of 10.0 m/s for 20 minutes.

Comparative Example 1-8

A nonaqueous lithium-type storage element was prepared by a similar method as in Comparative Example 1-7 except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-9

A nonaqueous lithium-type storage element was prepared by a similar method as in Comparative Example 1-7 except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-10

A nonaqueous lithium-type storage element was prepared by a similar method as in Example 1-1, except for dry blending 200 g of lithium carbonate and 1.00 g of potassium oxide, and then cooling to −196° C. with liquid nitrogen and pulverizing using zirconia beads having a diameter of 1.0 mm, at a peripheral speed of 10.0 m/s for 20 minutes.

Comparative Example 1-11

A nonaqueous lithium-type storage element was prepared by a similar method as in Comparative Example 1-10, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-12

A nonaqueous lithium-type storage element was prepared by a similar method as in Comparative Example 1-10, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-13

A nonaqueous lithium-type storage element was prepared by a similar method as in Example 1-1, except for dry blending 200 g of lithium carbonate, 0.50 g of sodium oxide and 0.50 g of potassium oxide, and then cooling to −196° C. with liquid nitrogen and pulverizing using zirconia beads having a diameter of 1.0 mm, at a peripheral speed of 10.0 m/s for 20 minutes.

Comparative Example 1-14

A nonaqueous lithium-type storage element was prepared by a similar method as in Comparative Example 1-13, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-15

A nonaqueous lithium-type storage element was prepared by a similar method as in Comparative Example 1-13, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-16

A nonaqueous lithium-type storage element was prepared by a similar method as in Example 1-1, except for dry blending 200 g of lithium carbonate, and then cooling to −196° C. with liquid nitrogen and pulverizing using zirconia beads having a diameter of 1.0 mm, at a peripheral speed of 10.0 m/s for 20 minutes.

The evaluation results of nonaqueous lithium-type storage elements in Examples 1-1 to 1-18 and Comparative Examples 1-1 to 1-16 are shown in Table 1.

TABLE 1

|  | C [ppm] | D [g/m²] | E [g/m²] | C/D | C/E | D/E | Fa [F] | Fd [F] | Fd/Fa | ΔV [V] | $A_1$ [%] | $A_2$ [%] |
|---|---|---|---|---|---|---|---|---|---|---|---|---|
| Example 1-1 | 3.1 | 2.6 | 28.0 | 1.2 | 0.1 | 0.09 | 1797 | 1921 | 1.07 | 0.086 | 90.3 | 40.1 |
| Example 1-2 | 5.6 | 6.5 | 28.1 | 0.9 | 0.2 | 0.23 | 1761 | 1902 | 1.08 | 0.088 | 89.4 | 38.9 |
| Example 1-3 | 7.2 | 12.4 | 28.2 | 0.6 | 0.3 | 0.44 | 1870 | 1998 | 1.07 | 0.087 | 93.0 | 40.9 |
| Example 1-4 | 6.8 | 2.3 | 27.9 | 3.0 | 0.2 | 0.08 | 1815 | 1932 | 1.06 | 0.077 | 89.4 | 40.9 |
| Example 1-5 | 10.3 | 6.2 | 28.2 | 1.7 | 0.4 | 0.22 | 1761 | 1903 | 1.08 | 0.079 | 90.3 | 39.7 |
| Example 1-6 | 14.2 | 13.6 | 27.9 | 1.0 | 0.5 | 0.49 | 1833 | 1928 | 1.05 | 0.078 | 93.0 | 40.5 |
| Example 1-7 | 52.2 | 3.9 | 28.2 | 13.4 | 1.9 | 0.14 | 1851 | 1932 | 1.04 | 0.071 | 93.0 | 40.5 |
| Example 1-8 | 74.3 | 7.1 | 28.3 | 10.5 | 2.6 | 0.25 | 1761 | 1851 | 1.05 | 0.079 | 87.6 | 40.1 |
| Example 1-9 | 91.1 | 14.2 | 28.5 | 6.4 | 3.2 | 0.50 | 1778 | 1841 | 1.04 | 0.069 | 87.6 | 40.1 |
| Example 1-10 | 125 | 3.3 | 28.1 | 37.9 | 4.4 | 0.12 | 1833 | 1851 | 1.01 | 0.061 | 91.2 | 40.9 |
| Example 1-11 | 143 | 6.4 | 28.3 | 22.3 | 5.1 | 0.23 | 1779 | 1832 | 1.03 | 0.058 | 90.3 | 39.3 |
| Example 1-12 | 197 | 14.1 | 28.2 | 14.0 | 7.0 | 0.50 | 1814 | 1835 | 1.01 | 0.054 | 90.3 | 39.7 |
| Example 1-13 | 62.1 | 4.1 | 27.9 | 15.1 | 2.2 | 0.15 | 1815 | 1886 | 1.04 | 0.069 | 92.1 | 40.1 |
| Example 1-14 | 77.1 | 7.3 | 27.8 | 10.6 | 2.8 | 0.26 | 1778 | 1857 | 1.04 | 0.071 | 91.2 | 40.1 |
| Example 1-15 | 93.5 | 14.1 | 28.3 | 6.6 | 3.3 | 0.50 | 1815 | 1896 | 1.04 | 0.065 | 90.3 | 40.1 |
| Example 1-16 | 51.2 | 2.9 | 27.9 | 17.7 | 1.8 | 0.10 | 1761 | 1846 | 1.05 | 0.066 | 88.5 | 39.7 |
| Example 1-17 | 72.5 | 6.8 | 28.1 | 10.7 | 2.6 | 0.24 | 1743 | 1821 | 1.04 | 0.064 | 86.7 | 39.7 |
| Example 1-18 | 92.5 | 13.9 | 28.0 | 6.7 | 3.3 | 0.50 | 1870 | 1922 | 1.03 | 0.062 | 92.1 | 41.3 |
| Comparative Example 1-1 | 310 | 3.1 | 28.1 | 100 | 11.0 | 0.11 | 1815 | 1737 | 0.96 | 0.058 | 90.3 | 40.5 |
| Comparative Example 1-2 | 351 | 6.8 | 28.0 | 51.6 | 12.5 | 0.24 | 1815 | 1776 | 0.98 | 0.057 | 92.1 | 40.1 |
| Comparative Example 1-3 | 379 | 13.9 | 27.9 | 27.3 | 13.6 | 0.50 | 1832 | 1799 | 0.98 | 0.053 | 93.9 | 40.1 |
| Comparative Example 1-4 | 451 | 3.1 | 28.3 | 145 | 15.9 | 0.11 | 1851 | 1802 | 0.97 | 0.055 | 92.1 | 40.9 |
| Comparative Example 1-5 | 481 | 7.2 | 28.0 | 66.8 | 17.2 | 0.26 | 1744 | 1697 | 0.97 | 0.052 | 88.5 | 39.3 |
| Comparative Example 1-6 | 523 | 14.1 | 27.8 | 37.1 | 18.8 | 0.51 | 1691 | 1641 | 0.97 | 0.056 | 86.7 | 38.5 |
| Comparative Example 1-7 | 613 | 2.9 | 28.0 | 211 | 21.9 | 0.10 | 1851 | 1772 | 0.96 | 0.051 | 92.1 | 40.9 |
| Comparative Example 1-8 | 652 | 7.5 | 27.9 | 86.9 | 23.4 | 0.27 | 1796 | 1715 | 0.95 | 0.053 | 88.5 | 40.5 |
| Comparative Example 1-9 | 703 | 14.8 | 28.0 | 47.5 | 25.1 | 0.53 | 1709 | 1633 | 0.96 | 0.056 | 86.7 | 38.9 |
| Comparative Example 1-10 | 324 | 3.2 | 28.0 | 101 | 11.6 | 0.11 | 1779 | 1711 | 0.96 | 0.052 | 89.4 | 39.3 |
| Comparative Example 1-11 | 347 | 6.8 | 28.1 | 51.0 | 12.3 | 0.24 | 1870 | 1799 | 0.96 | 0.054 | 93.0 | 40.9 |
| Comparative Example 1-12 | 386 | 14.6 | 28.1 | 26.4 | 13.7 | 0.52 | 1833 | 1767 | 0.96 | 0.057 | 91.2 | 41.3 |
| Comparative Example 1-13 | 308 | 3.1 | 27.8 | 99.4 | 11.1 | 0.11 | 1815 | 1754 | 0.97 | 0.053 | 89.4 | 40.5 |
| Comparative Example 1-14 | 351 | 7.3 | 28.2 | 48.1 | 12.4 | 0.26 | 1797 | 1732 | 0.96 | 0.054 | 91.2 | 39.7 |
| Comparative Example 1-15 | 391 | 13.8 | 28.1 | 28.3 | 13.9 | 0.49 | 1814 | 1755 | 0.97 | 0.056 | 93.0 | 40.1 |
| Comparative Example 1-16 | 0.4 | 0.0 | 28.0 | — | 0.0 | 0.00 | 1833 | 1893 | 1.03 | 0.152 | 91.2 | 40.1 |

Example 1-19

A positive electrode precursor 2 (one sided) and a positive electrode precursor 2 (double sided), having a film thickness of a positive electrode active material layer after drying of 26 µm, per one surface, were prepared by adjusting die clearance, in coating a coating solution. A nonaqueous lithium-type storage element was prepared by a similar method as in Example 1-1, except for using the positive electrode precursor 2 (one sided) and the positive electrode precursor 2 (double sided).

Example 1-20

A nonaqueous lithium-type storage element was prepared by a similar method as in Example 1-19, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-21

A nonaqueous lithium-type storage element was prepared by a similar method as in Example 1-19, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-22

A positive electrode precursor 3 (one sided) and a positive electrode precursor 3 (double sided), having a film thickness of a positive electrode active material layer after drying of 77 µm, per one surface, were prepared by adjusting die clearance, in coating a coating solution. A nonaqueous lithium-type storage element was prepared by a similar method as in Example 1-1, except for using the positive electrode precursor 3 (one sided) and the positive electrode precursor 3 (double sided).

Example 1-23

A nonaqueous lithium-type storage element was prepared by a similar method as in Example 1-22, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-24

A nonaqueous lithium-type storage element was prepared by a similar method as in Example 1-22, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-25

A positive electrode precursor 4 (single sided) and a positive electrode precursor 4 (double sided) having a film thickness of the positive electrode active material layer after drying of 105 µm, per one surface, were prepared, by adjusting clearance of a die, in coating a coating solution. A nonaqueous lithium-type storage element was prepared by a similar method as in Example 1-1, except for using the positive electrode precursor 4 (single sided) and the positive electrode precursor 4 (double sided).

Example 1-26

A nonaqueous lithium-type storage element was prepared by a similar method as in Example 1-25, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-27

A nonaqueous lithium-type storage element was prepared by a similar method as in Example 1-25, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-28

A positive electrode precursor 5 (single sided) and a positive electrode precursor 5 (double sided) having a film thickness of the positive electrode active material layer after drying of 158 µm, per one surface, were prepared, by adjusting clearance of a die, in coating a coating solution. A nonaqueous lithium-type storage element was prepared by a similar method as in Example 1-1, except for using the positive electrode precursor 5 (single sided) and the positive electrode precursor 5 (double sided).

Example 1-29

A nonaqueous lithium-type storage element was prepared by a similar method as in Example 1-28, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Example 1-30

A nonaqueous lithium-type storage element was prepared by a similar method as in Example 1-28, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Example 1-31

A nonaqueous lithium-type storage element was prepared by a similar method as in Example 1-19, except for carrying out, in initial charging of the nonaqueous lithium-type storage element in the lithium doping operation, lithium doping to a negative electrode, by carrying out charging under constant current at a current value of 100 mA till attaining a voltage of 4.3 V, subsequently continuing charging under constant voltage at 4.3 V, for 24 hours.

Example 1-32

A nonaqueous lithium-type storage element was prepared by a similar method as in Example 1-19, except for carrying out, in initial charging of the nonaqueous lithium-type storage element in the lithium doping operation, lithium doping to a negative electrode, by carrying out charging under constant current at a current value of 100 mA till attaining a voltage of 4.2 V, subsequently continuing charging under constant voltage at 4.2 V, for 24 hours.

Example 1-33

A nonaqueous lithium-type storage element was prepared by a similar method as in Example 1-19, except for carrying out, in initial charging of the nonaqueous lithium-type storage element in the lithium doping operation, lithium doping to a negative electrode, by carrying out charging under constant current at a current value of 100 mA till attaining a voltage of 4.1 V, subsequently continuing charging under constant voltage at 4.1 V, for 24 hours.

Comparative Example 1-17

A nonaqueous lithium-type storage element was prepared by a similar method as in Example 1-19, except for dry blending 200 g of lithium carbonate and 1.00 g of sodium oxide, and then cooling to −196° C. with liquid nitrogen and pulverizing using zirconia beads having a diameter of 1.0 mm, at a peripheral speed of 10.0 m/s for 20 minutes.

Comparative Example 1-18

A nonaqueous lithium-type storage element was prepared by a similar method as in Comparative Example 1-17, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-19

A nonaqueous lithium-type storage element was prepared by a similar method as in Comparative Example 1-17, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-20

A nonaqueous lithium-type storage element was prepared by a similar method as in Example 1-28, except for dry blending 200 g of lithium carbonate and 1.50 g of sodium oxide, and then cooling to −196° C. with liquid nitrogen and pulverizing using zirconia beads having a diameter of 1.0 mm, at a peripheral speed of 10.0 m/s for 20 minutes.

Comparative Example 1-21

A nonaqueous lithium-type storage element was prepared by a similar method as in Comparative Example 1-20, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-22

A nonaqueous lithium-type storage element was prepared by a similar method as in Comparative Example 1-20 except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-23

A nonaqueous lithium-type storage element was prepared by a similar method as in Comparative Example 1-17, except for dry blending 200 g of lithium carbonate and 1.00 g of sodium oxide, and then cooling to −196° C. with liquid nitrogen and pulverizing using zirconia beads having a diameter of 1.0 mm, at a peripheral speed of 10.0 m/s for 5 minutes.

Comparative Example 1-24

A nonaqueous lithium-type storage element was prepared by a similar method as in Comparative Example 1-23, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 36 hours.

Comparative Example 1-25

A nonaqueous lithium-type storage element was prepared by a similar method as in Comparative Example 1-23, except for carrying out, in initial charging of the nonaqueous lithium-type storage element in the lithium doping operation, lithium doping to a negative electrode, by carrying out charging under constant current at a current value of 100 mA till attaining a voltage of 4.5 V, subsequently continuing charging under constant voltage at 4.5 V, for 12 hours.

Comparative Example 1-26

A nonaqueous lithium-type storage element was prepared by a similar method as in Comparative Example 1-23, except for carrying out, in initial charging of the nonaqueous lithium-type storage element in the lithium doping operation, lithium doping to a negative electrode, by carrying out charging under constant current at a current value of 100 mA till attaining a voltage of 4.3 V, subsequently continuing charging under constant voltage at 4.3 V, for 24 hours.

Comparative Example 1-27

A nonaqueous lithium-type storage element was prepared by a similar method as in Comparative Example 1-24, except for carrying out, in initial charging of the nonaqueous lithium-type storage element in the lithium doping operation, lithium doping to a negative electrode, by carrying out charging under constant current at a current value of 100 mA till attaining a voltage of 4.2 V, subsequently continuing charging under constant voltage at 4.2 V, for 24 hours.

Comparative Example 1-28

A nonaqueous lithium-type storage element was prepared by a similar method as in Comparative Example 1-24, except for carrying out, in initial charging of the nonaqueous lithium-type storage element in the lithium doping operation, lithium doping to a negative electrode, by carrying out charging under constant current at a current value of 100 mA till attaining a voltage of 4.1 V, subsequently continuing charging under constant voltage at 4.1 V, for 24 hours.

The evaluation results of nonaqueous lithium-type storage elements of Examples 1-19 to 1-33 and Comparative Examples 1-17 to 1-28 are shown in Table 2.

also when C is 300 ppm, however, charging and discharging cycle characteristics under high load results in deteriorated.

It has been considered, without limiting to theory, that defect generation at the surface of lithium carbonate particles was able to be suppressed, because of not receiving influence of temperature increase in pulverizing, by pulverizing lithium carbonate under condition of a very low temperature of $-196°$ C. It has been considered, as a result, that reaggregation of lithium carbonate particles can be suppressed, and $LiPF_6$, which is an electrolyte, was able to be decomposed efficiently at the surface of lithium carbonate particles, by which a generating fluorine compound deposited everywhere, and charging and discharging cycle characteristics under high load was able to be improved.

Example 2-1

A mixture was obtained by dry blending 200 g of lithium carbonate having an average particle diameter of 50 μm, and 0.010 g of sodium oxalate. Lithium carbonate 2 was obtained, after cooling down the resulting mixture to $-196°$ C. with liquid nitrogen, using a pulverizing machine (liquid nitrogen beads mill LNM), manufactured by IMEX Co., Ltd., by pulverizing using zirconia beads having a diameter of 1.0 mm, at a peripheral speed of 15.0 m/s for 20 minutes. Brittle fracture of lithium carbonate can be attained, while preventing thermal denaturation, by cooling it to $-196°$ C. Average particle diameter of the resulting lithium carbonate 2 was measured and found to be 1.5 μm.

TABLE 2

|  | C [ppm] | D [g/m$^2$] | E [g/m$^2$] | C/D | C/E | D/E | Fa [F] | Fd [F] | Fd/Fa | ΔV [V] | A$_1$ [%] | A$_2$ [%] |
|---|---|---|---|---|---|---|---|---|---|---|---|---|
| Example 1-19 | 3.3 | 1.4 | 14.1 | 2.4 | 0.2 | 0.10 | 940 | 1011 | 1.08 | 0.085 | 88.5 | 40.5 |
| Example 1-20 | 5.1 | 1.8 | 14.1 | 2.8 | 0.4 | 0.13 | 925 | 988 | 1.07 | 0.084 | 93.2 | 37.7 |
| Example 1-21 | 6.9 | 2.1 | 14 | 3.3 | 0.5 | 0.15 | 978 | 1048 | 1.07 | 0.086 | 89.4 | 41.7 |
| Example 1-22 | 6.2 | 3.2 | 42.1 | 1.9 | 0.1 | 0.08 | 2621 | 2751 | 1.05 | 0.081 | 88.5 | 41.7 |
| Example 1-23 | 7.9 | 4.2 | 42.2 | 1.9 | 0.2 | 0.10 | 2568 | 2664 | 1.04 | 0.083 | 94.2 | 39.3 |
| Example 1-24 | 9.3 | 5.4 | 42 | 1.7 | 0.2 | 0.13 | 2673 | 2771 | 1.04 | 0.084 | 92.2 | 40.9 |
| Example 1-25 | 6.4 | 5.2 | 56.1 | 1.2 | 0.1 | 0.09 | 3137 | 3285 | 1.05 | 0.080 | 90.3 | 40.9 |
| Example 1-26 | 8.2 | 6.6 | 55.6 | 1.2 | 0.1 | 0.12 | 3020 | 3130 | 1.04 | 0.079 | 89.4 | 40.1 |
| Example 1-27 | 10.3 | 7.8 | 56.1 | 1.3 | 0.2 | 0.14 | 3079 | 3156 | 1.03 | 0.078 | 88.5 | 40.1 |
| Example 1-28 | 9.5 | 7.9 | 85.1 | 1.2 | 0.1 | 0.09 | 4635 | 4723 | 1.02 | 0.081 | 89.4 | 41.7 |
| Example 1-29 | 11.1 | 9.2 | 85.4 | 1.2 | 0.1 | 0.11 | 4503 | 4635 | 1.03 | 0.077 | 91.2 | 38.5 |
| Example 1-30 | 13.2 | 12.4 | 85.8 | 1.1 | 0.2 | 0.14 | 4579 | 4676 | 1.02 | 0.079 | 89.4 | 39.3 |
| Example 1-31 | 10.1 | 3.2 | 13.9 | 3.2 | 0.7 | 0.23 | 953 | 1003 | 1.05 | 0.077 | 64.2 | 27.5 |
| Example 1-32 | 13.4 | 5.1 | 14 | 2.6 | 1.0 | 0.36 | 915 | 944 | 1.03 | 0.076 | 53.2 | 19.7 |
| Example 1-33 | 17.2 | 7.2 | 14 | 2.4 | 1.2 | 0.51 | 953 | 963 | 1.01 | 0.075 | 41.3 | 12.3 |
| Comparative Example 1-17 | 312 | 1.4 | 13.9 | 22.4 | 0.2 | 0.10 | 897 | 868 | 0.97 | 0.077 | 90.3 | 39.3 |
| Comparative Example 1-18 | 342 | 1.7 | 14.1 | 201 | 24.3 | 0.12 | 879 | 845 | 0.96 | 0.078 | 89.4 | 39.3 |
| Comparative Example 1-19 | 371 | 2.3 | 14.1 | 161 | 26.3 | 0.16 | 956 | 912 | 0.95 | 0.075 | 88.5 | 42.5 |
| Comparative Example 1-20 | 451 | 2.9 | 85.2 | 156 | 5.3 | 0.03 | 4583 | 4287 | 0.94 | 0.074 | 89.4 | 40.9 |
| Comparative Example 1-21 | 481 | 6.8 | 85 | 70.7 | 5.7 | 0.08 | 4582 | 4372 | 0.95 | 0.078 | 91.2 | 40.1 |
| Comparative Example 1-22 | 523 | 13.6 | 85.5 | 38.5 | 6.1 | 0.16 | 4620 | 4387 | 0.95 | 0.075 | 92.1 | 40.1 |
| Comparative Example 1-23 | 308 | 1.3 | 14 | 237 | 22.0 | 0.09 | 972 | 853 | 0.88 | 0.077 | 37.0 | 9.5 |
| Comparative Example 1-24 | 332 | 1.9 | 14 | 175 | 23.7 | 0.14 | 980 | 818 | 0.83 | 0.082 | 36.7 | 9.1 |
| Comparative Example 1-25 | 356 | 2.4 | 14.1 | 148 | 25.2 | 0.17 | 948 | 753 | 0.79 | 0.082 | 35.4 | 8.8 |
| Comparative Example 1-26 | 385 | 2.9 | 13.9 | 133 | 27.7 | 0.21 | 992 | 697 | 0.70 | 0.081 | 31.2 | 7.2 |
| Comparative Example 1-27 | 453 | 6.4 | 14 | 70.8 | 32.4 | 0.46 | 934 | 646 | 0.69 | 0.089 | 27.3 | 5.8 |
| Comparative Example 1-28 | 521 | 9.6 | 14 | 54.3 | 37.2 | 0.69 | 945 | 621 | 0.66 | 0.091 | 23.2 | 2.2 |

From Table 1 and Table 2, it has been understood that charging and discharging cycle characteristics under high load is good, and voltage reduction under high temperature and high voltage can be suppressed, when $2 \leq C \leq 300$, $0.2 \leq C/D \leq 38$, and $0.1 \leq C/E \leq 7.2$ are all satisfied. Voltage reduction under high temperature and high voltage can be suppressed, <Preparation of Positive Electrode Active Material>
[Preparation of Activated Carbon 1]

A carbonized product was obtained by carbonization treatment of a pulverized coconut shell carbonized product in a compact-type carbonization furnace at 500° C. for 3 hours under nitrogen. The resulting carbonized product was put inside an activation furnace, and steam was introduced inside the activation furnace in 1 kg/h, in a warmed state in a preheating furnace, and activated by increasing temperature up to 900° C. taking 8 hours. The carbonized product thus activated was obtained by taking out the carbonized product after activation, and cooling it under nitrogen atmosphere. Draining was carried out after the resulting activated carbon was washed with passing water for 10 hours. After that, activated carbon 1 was obtained by drying for 10 hours inside an electric drying machine held at 115° C., and then by carrying out pulverizing for 1 hour, using a ball mill.

As for this activated carbon 1, average particle diameter was measured, using a laser diffraction-type particle size distribution measurement apparatus (SALD-2000), manufactured by Shimadzu Corp., and found it to be 4.2 µm. Fine pore distribution thereof was measured using a fine pore distribution measurement apparatus (AUTOSORB-1, AS-1-MP, manufactured by Yuasa Ionics Co. Ltd. As a result, BET specific area was 2360 m$^2$/g, mesopore volume ($V_1$) was 0.52 cc/g, micropore volume ($V_2$) was 0.88 cc/g, and $V_1/V_2$=0.59.

[Preparation of Activated Carbon 2]

A carbonized product having an average particle diameter of 7.0 µm was obtained by carrying out carbonization treatment of a phenol resin in a furnace at 600° C. for 2 hours under nitrogen atmosphere, and then pulverizing it using a ball mill, and carrying out classification. Activation was carried out by mixing this carbonized product and KOH in a weight ratio of 1:5, and heating it at 800° C. for 1 hour in the furnace, under nitrogen atmosphere. Then, activated carbon 2 was obtained by carrying out washing under stirring for 1 hour, in diluted hydrochloric acid adjusted to a concentration of 2 mol/L, then washing with distilled water under boiling till stabilization in a range of pH 5 to 6, and then carrying out drying.

As for this activated carbon 2, average particle diameter was measured, using a laser diffraction-type particle size distribution measurement apparatus (SALD-2000), manufactured by Shimadzu Corp., and found it to be 7.0 µm. Fine pore distribution thereof was measured using a fine pore distribution measurement apparatus (AUTOSORB-1, AS-1-MP, manufactured by Yuasa Ionics Co. Ltd. As a result, BET specific area was 3627 m$^2$/g, mesopore volume ($V_1$) was 1.50 cc/g, micropore volume ($V_2$) was 2.28 cc/g, and $V_1/V_2$=0.66.

[Preparation of Positive Electrode Coating Solution]

A positive electrode coating solution was produced using the resulting activated carbon 1 or 2 as a positive electrode active material, and the resulting lithium carbonate 1 as a lithium compound to be charged.

The coating solution was obtained by mixing 57.5 parts by weight of activated carbon 1 or 2, 30.0 parts by weight of lithium carbonate 1, 3.0 parts by weight of Ketjen black, 1.5 parts by weight of PVP (polyvinyl pyrrolidone), and 8.0 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 17 m/s.

Viscosity (ηb) and TI value of the resulting coating solution were measured using an E-type viscometer, TVE-35H, manufactured by Touki Sangyo Co., Ltd. As a result, viscosity (ηb) was 2,700 MPa·s, and TI value was 3.5. Dispersity of the resulting coating solution was measured using a particle gauge, manufactured by YOSHIMITSU SEIKI Co., Ltd. As a result, particle size was 35 µm.

A positive electrode precursor was obtained by coating the coating solution on one surface or both surfaces of an aluminum foil having a thickness of 15 µm, under condition of a coating speed of 1 m/min., using a die coater, manufactured by TORAY ENGINEERING Co., Ltd., and dying at a drying temperature of 100° C. The resulting positive electrode precursor was pressed using a roll press machine, under condition of a pressure of 4 kN/cm, and a surface temperature of the press part of 25° C. Thickness of the positive electrode active material layer of the resulting positive electrode precursor was determined by measurement at arbitrary 10 points of the positive electrode precursor, using a film thickness meter, Linear Gauge Sensor, GS-551, manufactured by ONO SOKKI Co., Ltd, and by subtracting thickness of the aluminum foil, from average value of thicknesses thus measured. As a result, film thickness of the positive electrode active material layer was 60 µm, per one surface.

<Preparation of Negative Electrode Active Material>

[Preparation of Composite Carbon Material A]

A composite carbon material A was obtained by carrying out a thermal reaction by putting 150 g of commercial coconut shell activated carbon, which has an average particle diameter of 3.0 µm and a BET specific area of 1780 m$^2$/g, in a cage made of a stainless-steel mesh, putting the cage on a stainless-steel tray containing 270 g of coal-based pitch (softening point: 50° C.), and placing the both of them in an electric furnace (effective dimension of inside the furnace: 300 mm×300 mm×300 mm). This heat treatment was carried out under nitrogen atmosphere, by increasing temperature up to 600° C. taking 8 hours, and holding at the same temperature for 4 hours. After sequential cooling down to 60° C. by natural cooling, the composite carbon material A was taken out from the electric furnace.

As for the resulting composite carbon material A, average particle diameter and BET specific area were measured similarly as above. Results were as follows: average particle diameter was 3.2 µm, BET specific area was 262 m$^2$/g. Weight ratio of a carbonaceous material derived from coal-based pitch to activated carbon was 78%.

<Production of Negative Electrode A>

Next, a negative electrode was produced using the composite carbon material A as a negative electrode active material.

A coating solution was obtained by mixing 85 parts by weight of the composite carbon material A, 10.0 parts by weight of acetylene black, and 5 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 15 m/s. Viscosity (ηb) and TI value of the resulting coating solution were measured using an E-type viscometer, TVE-35H, manufactured by Touki Sangyo Co., Ltd. As a result, viscosity (ηb) was 2,789 MPa·s, and TI value was 4.3. A negative electrode A was obtained by coating the coating solution on both surfaces of an electrolytic copper foil not having through holes and having a thickness of 10 µm, under condition of a coating speed of 1 m/min., using a die coater, manufactured by TORAY ENGINEERING Co., Ltd., and drying at a drying temperature of 85° C. The resulting negative electrode was pressed using a roll press machine, under condition of a pressure of 4 kN/cm, and a surface temperature of the press part of 25° C. Film thickness of the negative electrode active material layer of the resulting negative electrode A was determined by measurement at arbitrary 10 points of the negative electrode A, using a film thickness meter, Linear Gauge Sensor, GS-551, manufactured by ONO SOKKI Co., Ltd., and by subtracting thickness of the copper foil, from average value of thicknesses thus measured. As a result, film thickness of the negative electrode active material layer of the negative electrode A was 40 μm per one surface.

[Preparation of Composite Carbon Material B]

A composite carbon material B was produced similarly as in preparation of the composite carbon material A, except for using artificial graphite having an average particle diameter of 4.9 μm, as a substrate, instead of the composite carbon material A, and changing use amount of coal-based pitch to 50 g, and further heat treatment temperature to 1000° C., and then carried out evaluation thereof. As a result, BET specific surface area of the composite carbon material B was 6.1 m²/g. Weight ratio of a carbonaceous material derived from coal-based pitch to artificial graphite was 2%.

[Preparation of Negative Electrode B]

A negative electrode B was produced using the resulting composite carbon material B as a negative electrode active material.

A coating solution was obtained by mixing 80 parts by weight of the composite carbon material B, 8 parts by weight of acetylene black, and 12 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 15 m/s. Viscosity (rib) and TI value of the resulting coating solution were measured using an E-type viscometer, TVE-35H, manufactured by Touki Sangyo Co., Ltd. As a result, viscosity (rib) was 2,798 MPa·s, and TI value was 2.7. A negative electrode was obtained by coating the coating solution on both surfaces of an electrolytic copper foil not having through holes and having a thickness of 10 μm, under condition of a coating speed of 1 m/min., using a die coater, manufactured by TORAY ENGINEERING Co., Ltd., and drying at a drying temperature of 85° C. The resulting negative electrode was pressed using a roll press machine, under condition of a pressure of 4 kN/cm, and a surface temperature of the press part of 25° C. Film thickness of the negative electrode active material layer of the resulting negative electrode was determined by measurement at arbitrary 10 points of the negative electrode, using a film thickness meter, Linear Gauge Sensor, GS-551, manufactured by ONO SOKKI Co., Ltd., and by subtracting thickness of the copper foil, from average value of thicknesses thus measured. As a result, film thickness of the negative electrode active material layer was 25 μm, per one surface.

[Preparation of Electrolytic Solution]

A solution obtained by using a mixed solvent of ethylene carbonate (EC): methyl ethyl carbonate (EMC)=33:67 (volume ratio), as an organic solvent, and dissolving each electrolyte salt, so as to attain a concentration ratio of $LiN(SO_2F)_2$ and $LiPF_6$ of 50:50 (molar ratio), and sum of concentration of $LiN(SO_2F)_2$ and $LiPF_6$ of 1.2 mol/L, relative to total electrolytic solution, was used as a nonaqueous electrolytic solution.

Concentration of $LiN(SO_2F)_2$ and $LiPF_6$ in the electrolytic solution prepared here was 0.6 mol/L and 0.6 mol/L, respectively.

<Assembling of Storage Element>

The resulting double sided negative electrode A and double sided positive electrode precursor A were cut to 10 cm×10 cm (100 cm²). The one-sided positive electrode precursor was used at the uppermost surface and lowermost surface, and further, 21 pieces of double sided negative electrodes and 20 pieces of double sided positive electrode precursors were used to laminate by sandwiching a microporous film separator having a thickness of 15 μm, between the negative electrode and the positive electrode precursor. After that, an electrode laminated body was prepared, by ultrasonic welding a negative electrode terminal and positive electrode terminal to the negative electrode, and the positive electrode precursor, respectively. This electrode laminated body was inserted inside a casing composed of a laminate packaging material, under a dry environment of dew point −45° C., and three sides of the casing of electrode terminal parts and the bottom part were heat sealed under conditions of 180° C., 20 second, and 1.0 MPa. The nonaqueous electrolytic solution was injected in the casing and the casing was sealed to produce a nonaqueous lithium-type storage element.

<Liquid Injection, Impregnation, and Encapsulation of Storage Element>

About 80 g of a nonaqueous electrolytic solution was injected into an electrode laminated body contained in an aluminum laminate packaging material, under atmospheric pressure, a temperature of 25° C., and a dry air environment of equal to or lower than dew point −40° C. Subsequently, the nonaqueous lithium-type storage element was put in a reduced pressure chamber to reduce pressure from atmospheric pressure to −87 kPa, then restored to atmospheric pressure, and stood still for 5 minutes. Then, an operation of restoring to atmospheric pressure, after reducing pressure from atmospheric pressure to −87 kPa, was repeated four times, followed by standing still for 15 minutes. Furthermore, after reducing pressure from atmospheric pressure to −91 kPa, atmospheric pressure was restored. An operation procedure for similarly reducing pressure and restoring to atmospheric pressure was repeated seven times in total (pressure was reduced from atmospheric pressure each to −95, −96, −97, −81, −97, −97, −97 kPa). The nonaqueous electrolytic solution was impregnated to the electrode laminated body, by the above procedure.

After that, the nonaqueous lithium-type storage element was put in a reduced pressure sealing machine, and the aluminum laminate packaging material was encapsulated, by sealing in a state of a reduced pressure of -95 kPa, at 180° C. for 10 seconds, and a pressure of 0.1 MPa.

<Lithium Doping>

As for the resulting nonaqueous lithium-type storage element, lithium doping to the negative electrode was carried out by carrying out initial charging by a method for carrying out charging under constant current till attaining a voltage of 4.7 V, under a current value of 0.6Å, and subsequently continuing charging under constant voltage at 4.5 V for 8 hours, at an environment of 35° C., using a charging and discharging apparatus (TOSCAT-3100U), manufactured by Toyosystem Corp.

[Aging]

As for the nonaqueous lithium-type storage element, after lithium doping, charging under constant current at 4.0 V was carried out for 1 hour, after carrying out discharging under constant current till attaining a voltage of 2.0 V, under 0.7Å, and an environment of 25° C., and voltage was adjusted to 4.0 V. Subsequently, the nonaqueous lithium-type storage element was stored for 30 hours in a thermostat chamber set at 40° C. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

[Gas Venting]

As for the nonaqueous lithium-type storage element after aging, a part of the aluminum laminate packaging material was unsealed at a temperature of 25° C., and under a dry air environment of dew point −40° C. Subsequently, the nonaqueous lithium-type storage element was put in a reduced pressure chamber to reduce pressure from atmospheric pressure to −80 kPa, taking 3 minutes, using a diaphragm pump, manufactured by KNF Co., Ltd., (N816. 3KT. 45. 18), then restored to atmospheric pressure, taking 3 minutes, which operation was repeated 3 times in total. Then, an aluminum laminate packaging material was encapsulated by sealing under a pressure of 0.1 MPa at 200° C. for 10 seconds, after putting the nonaqueous lithium-type storage element in the reduced pressure sealing machine to reduce pressure to −90 kPa.

<Evaluation of Nonaqueous Lithium-Type Storage Element>

[Calculation of Energy Density]

As for the resulting storage element, charging under constant current was carried out till attaining 3.8 V, under a current value of 2 C, and subsequently charging under constant voltage was carried out by applying a constant voltage of 3.8 V, for 30 minutes in total, using a charging and discharging apparatus (5V, 360 A), manufactured by FUJITSU TELECOM NETWORKS Ltd., in a thermostat chamber set at 25° C. After that, energy density was calculated by $E/V=F\times(3.8^2-2.2^2)/2/3600/V$, using static capacitance F (F) calculated by $F=Q/(3.8-2.2)$, where Q is capacitance in carrying out discharging under constant current till attaining 2.2 V, under a current value of 2 C, and found to be 23.4 Wh/L.

[Calculation of Ra·F]

As for the resulting storage element, discharging curve (time-voltage) was obtained, by carrying out charging under constant current till attaining 3.8 V, under a current value of 20 C, subsequently carrying out charging under constant voltage by applying a constant voltage of 3.8 V, for 30 minutes in total, and subsequently carrying out discharging under constant current till attaining 2.2 V, under a current value of 20 C, using a charging and discharging apparatus (5V, 360 A), manufactured by FUJITSU TELECOM NETWORKS Ltd. Inner resistance Ra at normal temperature was calculated by reduced voltage $\Delta E=3.8-E_o$, and $R=\Delta E/(20\,C$ (current value A)), where $E_o$ is voltage corresponding to discharge time=0 second obtained by extrapolation using collinear approximation, from voltage value during 2 seconds to 4 seconds of discharging time, in this discharging curve.

Product of static capacitance F and inner resistance Ra at 25° C., i.e., Ra·F, was 1.10 ΩF.

[Evaluation of Self-Discharging Characteristics]

As for the resulting storage element, charging under constant current was carried out till attaining a voltage of 3.800 V, under a current value (1.6 A) of 2 C, and subsequently charging under constant voltage was carried out by applying a constant voltage of 3.800 V for 30 minutes in total, using a charging and discharging apparatus (5 V, 10 A), manufactured by Asca Densi Co., Ltd. After that, the nonaqueous lithium-type storage element was stored in a thermostat chamber set at 70° C. for 30 days. After storage for 30 days, voltage of the nonaqueous lithium-type storage element was reduced to 3,708 V, and thus voltage change amount ΔV was 0.092 V.

[Charging and Discharging Cycle Test Under High Load]

As for the resulting storage element, charging under constant current was carried out till attaining 3.8 V, under a current value of 300 C, and subsequently discharging under constant current was carried out under a current value of 300 C, till attaining 2.2 V. Increasing ratio of inner resistance, after charging and discharging cycle test under high load, relative to that before starting of the test, is calculated as Re/Ra, by repeating the charging and discharging operation 60000 times, and carrying out measurement of inner resistance in normal temperature discharging, before starting of the test, and after completion of the test, where Ra (Ω) is inner resistance in normal temperature discharging before starting of the test, and Re (Ω) is inner resistance in normal temperature discharging after completion of the test, and found to be 1.68.

[Storage Test Under High Temperature and High Voltage]

As for the resulting storage element, charging under constant current was carried out till attaining 4.0 V, under a current value of 100 C, and subsequently charging under constant voltage was carried out by applying a constant voltage of 4.0 V for 10 minutes in total, using a charging and discharging apparatus (5V, 360 A), manufactured by FUJITSU TELECOM NETWORKS Ltd., in a thermostat chamber set at 25° C. After that, the cell was stored under an environment of 60° C., and by taking out the cell from the environment of 60° C. every two weeks, charging to a cell voltage of 4.0 V was carried out by similar charging operation, and then stored the cell again under an environment of 60° C. This operation was repeated two months, and inner resistance at normal temperature Rd, after the storage test under high temperature, was calculated, similarly as in the [calculation of Ra·F], for the storage element after the storage test under high temperature.

Ratio Rd/Ra was 1.65, which was calculated by dividing this Rd (Ω) with inner resistance Ra (Ω) before the storage test under high temperature, determined in the [calculation of Ra·F].

<Quantitative Determination of Lithium Compound in Positive Electrode>

<Preparation of Sample>

The nonaqueous lithium-type storage element was disassembled in an argon box at dew point temperature −72° C., to take out each of the electrolytic solution, the negative electrode, and the positive electrode. The positive electrode coated with the positive electrode active material layer at both surfaces was cut out to a size of 10 cm×10 cm, immersed in 30 g of a diethyl carbonate solvent, and washed for 10 minutes by moving it occasionally with a pair of tweezers. Subsequently, the positive electrode was taken out, air dried for 5 minutes in the argon box, immersed in newly prepared 30 g of a diethyl carbonate solvent, and washed for 10 minutes by a similar method as above. A positive electrode sample was obtained by taking out the positive electrode after washing, from the argon box, and drying for 20 hours under condition of a temperature of 25° C. and a pressure of 1 kPa, using a vacuum drying machine (manufactured by Yamato Scientific Co., Ltd.).

The resulting positive electrode sample was cut out to a size of 5 cm×5 cm and immersed in 20 g of methanol, and after covering a container with a lid, it was stood still for 3 days. After that, the positive electrode sample was taken out and vacuum dried for 10 hours under condition of 120° C. and 5 kPa. As for the methanol solution after washing, GC/MS was measured under condition in preparation of a calibration curve, in advance, and it has been confirmed that amount of diethyl carbonate present was less than 1%.

Subsequently, the positive electrode sample was impregnated in 25.20 g of distiller water, and by covering the container with the lid, stood still for 3 days under an environment of 45° C.

After that, the positive electrode sample was taken out and vacuum dried for 12 hours under conditions of 150° C. and 3 kPa. Weigh $M_1$ after vacuum drying was 0.239 g, and as for distiller water after washing, GC/MS was measured under condition in preparation of a calibration curve, in advance, and it has been confirmed that amount of methanol present was less than 1%. According to equation (4) and equation (5), D ($g/m^2$), which is basis weight of the positive electrode, and E ($g/m^2$), which is basis weight of the lithium compound contained in the positive electrode active material layer, per one surface of the positive electrode, were determined to calculate amount of lithium compound contained in the positive electrode, and found to be 15% by weight.

<Quantitative Determination of Na in Negative Electrode Active Material Layer>

[Preparation of Negative Electrode Sample]

The negative electrode obtained by disassembling of the storage element, where negative electrode active material layer was coated at both surfaces, was cut out to a size of 10 cm×10 cm, immersed in 30 g of a diethyl carbonate solvent, and washed for 10 minutes by moving it occasionally with a pair of tweezers. Subsequently, the negative electrode was taken out, air dried for 5 minutes in the argon box, immersed in newly prepared 30 g of a diethyl carbonate solvent, and washed for 10 minutes by a similar method as above. A negative electrode sample was obtained by taking out the negative electrode after washing, from the argon box, and drying for 20 hours under condition of a temperature of 25° C. and a pressure of 1 kPa, using a vacuum drying machine (DP33, manufactured by Yamato Scientific Co., Ltd.).

The resulting negative electrode sample 1 was cut out to a size of 5 cm×5 cm and immersed in 20 g of methanol, and after covering a container with a lid, it was stood still for 3 days under an environment of 25° C. After that, the negative electrode sample was taken out and vacuum dried for 10 hours under condition of 120° C. and 5 kPa. As for the methanol solution after washing, GC/MS was measured under condition in preparation of a calibration curve, in advance, and it has been confirmed that amount of diethyl carbonate present was less than 1%.

As for the resulting negative electrode sample, the negative electrode active material layer on the negative electrode power collector was all removed using a spatula, made of Teflon (registered trade name), and the resulting negative electrode active material layer was subjected to acid decomposition using concentrated nitric acid. The resulting solution was diluted with pure water, so as to attain an acid concentration of 2%, and then amount of Na present (ppm) was determined using ICP-MS (X series 2, manufactured by Thermo Fischer Scientific Inc.), and found that C1=4.6 ppm.

<Quantitative Determination of Na in Electrolytic Solution>

From the resulting electrolytic solution obtained by disassembling of the storage element, 0.2 g thereof was put in a Teflon (registered trade name) container, and 4 cc of 60% nitric acid was added. The resulting sample was decomposed using a microwave decomposition apparatus (ETHOS PLUS, manufactured by Milestone General K. K.), and this was diluted in a measuring cylinder to 50 ml using pure water. Measurement of this nonaqeous electrolytic solution was carried out using ICP-MS (X series 2, manufactured by Thermo Fischer Scientific Inc.) to determine amount of Na present (ppm), per unit weight of the nonaqeous electrolytic solution, and found that C2=1.6 ppm.

[Solid $^7$Li-NMR Measurement]

As for the positive electrode of the resulting nonaqueous lithium-type storage element, solid $^7$Li-NMR measurement of the positive electrode active material layer was carried out.

Firstly, for the resulting nonaqueous lithium-type storage element prepared above, charging under constant current was carried out till attaining 2.9 V, under a current of 2 C, and then charging under constant current and constant voltage was carried out by applying a constant voltage of 2.9 V for 2 hours, at an environment temperature of 25° C., using a charging and discharging apparatus (ACD-10), manufactured by Asca Densi Co., Ltd.

Next, the positive electrode active material layer was sampled under argon atmosphere. The nonaqueous lithium-type storage element was disassembled under argon atmosphere to take out the positive electrode. Subsequently, the resulting positive electrode was immersed in diethyl carbonate for equal to or longer than 2 minutes to remove the lithium salt, etc. Immersing in diethyl carbonate was carried out once more under the same condition, and then it was air dried. After that, the positive electrode active material layer was sampled from the positive electrode, and weighed.

Using the resulting positive electrode active material layer as a sample, solid $^7$Li-NMR measurement was carried out. Measurement was carried out using ECA700(resonance frequency of $^7$Li-NMR is 272.1 MHz), manufactured by JEOL RESONANCE Co., Ltd., as a measurement instrument, under room temperature environment by a single-pulse method under conditions of a rotation number of magic angle spinning of 14.5 Hz, an irradiation pulse width of 45° pulse. As a shift standard, an aqueous solution of 1 mol/L lithium chloride was used, and shift position thereof, measured separately as an external standard, is used as 0 ppm. The aqueous solution of lithium chloride is measured by the single-pulse method under an irradiation pulse width of 45° pulse, without rotation of the sample. In the measurement, it was set so that repeated waiting time between measurements was taken sufficiently, and repeated waiting time was set at 3000 seconds.

Amount of lithium of the positive electrode active material layer was calculated by the above method using the solid $^7$Li-NMR spectrum of the resulting positive electrode active material layer obtained by the above method, and found to be $181.7 \times 10^{-4}$ mol/g.

Examples 2-2 to 2-33, and Comparative Examples 2-1 to 2-11

Nonaqueous lithium-type storage elements were prepared similarly as in Example 2-1, except for setting each of the negative electrode, the positive electrode precursor active material, average particle diameter of the positive electrode precursor active material, the lithium compound, averageparticle diameter of the lithium compound, the Na/K compound, and composition ratio of the positive electrodeprecursor, in the Example 2-1, as described in Table 3, and various kinds of evaluations were carried out.

Evaluation results are shown in Table 4.

TABLE 3

| | | | Positive electrode | | | |
| --- | --- | --- | --- | --- | --- | --- |
| | | Active material | | Lithium compound | | |
| | Negative electrode | Activated carbon | Active material particle diameter [μm] | Lithium compound type | Lithium compound particle diameter [μm] | Na/K compound type |
| Example 2-1 | A | 1 | 4.2 | Lithium carbonate 2 | 1.5 | Sodium oxalate |
| Example 2-2 | A | 1 | 4.2 | Lithium carbonate 2 | 1.5 | Sodium oxalate |
| Example 2-3 | A | 1 | 4.2 | Lithium carbonate 2 | 1.5 | Sodium oxalate |
| Example 2-4 | A | 1 | 4.2 | Lithium carbonate 2 | 1.5 | Sodium oxalate |
| Example 2-5 | A | 1 | 4.2 | Lithium carbonate 2 | 1.5 | Sodium oxalate |
| Example 2-6 | A | 1 | 4.2 | Lithium carbonate 2 | 1.5 | Sodium oxalate |
| Example 2-7 | B | 1 | 4.2 | Lithium carbonate 2 | 1.5 | Sodium oxalate |
| Example 2-8 | B | 1 | 4.2 | Lithium carbonate 2 | 1.5 | Sodium oxalate |
| Example 2-9 | B | 1 | 4.2 | Lithium carbonate 2 | 1.5 | Sodium oxalate |
| Example 2-10 | B | 1 | 4.2 | Lithium carbonate 2 | 1.5 | Sodium oxalate |
| Example 2-11 | B | 1 | 4.2 | Lithium carbonate 2 | 1.5 | Sodium oxalate |
| Example 2-12 | B | 1 | 4.2 | Lithium carbonate 2 | 1.5 | Sodium oxalate |
| Example 2-13 | A | 2 | 7 | Lithium carbonate 2 | 1.5 | Sodium oxalate |
| Example 2-14 | A | 2 | 7 | Lithium carbonate 2 | 1.5 | Sodium oxalate |
| Example 2-15 | A | 2 | 7 | Lithium carbonate 2 | 1.5 | Sodium oxalate |
| Example 2-16 | A | 2 | 7 | Lithium carbonate 2 | 1.5 | Sodium oxalate |
| Example 2-17 | A | 2 | 7 | Lithium carbonate 2 | 1.5 | Sodium oxalate |
| Example 2-18 | A | 2 | 7 | Lithium carbonate 2 | 3 | Sodium oxalate |
| Example 2-19 | B | 2 | 7 | Lithium oxide | 3 | Sodium oxalate |
| Example 2-20 | B | 2 | 7 | Lithium carbonate 2 | 1.5 | Sodium oxalate |
| Example 2-21 | B | 2 | 7 | Lithium carbonate 2 | 1.5 | Sodium oxalate |
| Example 2-22 | B | 2 | 7 | Lithium carbonate 2 | 1.5 | Sodium oxalate |
| Example 2-23 | B | 2 | 7 | Lithium carbonate 2 | 1.5 | Sodium oxalate |
| Example 2-24 | B | 2 | 7 | Lithium carbonate 2 | 1.5 | Sodium oxalate |
| Example 2-25 | A | 1 | 4.2 | Lithium carbonate 2 | 1.5 | Potassium oxalate |
| Example 2-26 | A | 1 | 4.2 | Lithium carbonate 2 | 1.5 | Potassium oxalate |
| Example 2-27 | A | 1 | 4.2 | Lithium carbonate 2 | 1.5 | Potassium oxalate |
| Example 2-28 | A | 1 | 4.2 | Lithium carbonate 2 | 1.5 | Sodium oxalate |
| Example 2-29 | A | 1 | 4.2 | Lithium carbonate 2 | 1.5 | Sodium oxalate |
| Example 2-30 | A | 1 | 4.2 | Lithium carbonate 2 | 1.5 | Sodium oxalate |
| Example 2-31 | A | 1 | 4.2 | Lithium carbonate 2 | 1.5 | Sodium oxalate |
| Example 2-32 | A | 1 | 4.2 | Lithium carbonate 2 | 3 | Sodium oxalate |
| Example 2-33 | A | 1 | 4.2 | Lithium oxide | 3 | Sodium oxalate |
| Comparative Example 2-1 | A | 1 | 4.2 | Lithium carbonate 2 | 1.5 | Sodium oxalate |
| Comparative Example 2-2 | A | 1 | 4.2 | Lithium carbonate 2 | 1.5 | Sodium oxalate |
| Comparative Example 2-3 | B | 1 | 4.2 | Lithium carbonate 2 | 1.5 | Sodium oxalate |
| Comparative Example 2-4 | B | 1 | 4.2 | Lithium carbonate 2 | 1.5 | Sodium oxalate |
| Comparative Example 2-5 | A | 2 | 7 | Lithium carbonate 2 | 1.5 | Sodium oxalate |
| Comparative Example 2-6 | A | 2 | 7 | Lithium carbonate 2 | 1.5 | Sodium oxalate |
| Comparative Example 2-7 | B | 2 | 7 | Lithium carbonate 2 | 1.5 | Sodium oxalate |
| Comparative Example 2-8 | B | 2 | 7 | Lithium carbonate 2 | 1.5 | Sodium oxalate |
| Comparative Example 2-9 | A | 1 | 4.2 | Lithium carbonate 2 | 1.5 | Sodium oxalate |
| Comparative Example 2-10 | A | 1 | 4.2 | Lithium carbonate 2 | 1.5 | Sodium oxalate |
| Comparative Example 2-11 | A | 1 | 4.2 | Lithium carbonate 2 | 6 | Sodium oxalate |

| | Positive electrode | | | | | |
| --- | --- | --- | --- | --- | --- | --- |
| | Composition ratio of positive electrode precursor | | | | | |
| | Active material [% by weight] | Lithium compound [% by weight] | Na/K compound [% by weight] | KB [% by weight] | PVP [% by weight] | PVDF [% by weight] |
| Example 2-1 | 57.5 | 30.0 | 0.01 | 3.0 | 1.5 | 8.0 |
| Example 2-2 | 57.5 | 30.0 | 0.05 | 3.0 | 1.5 | 8.0 |
| Example 2-3 | 57.4 | 30.0 | 0.10 | 3.0 | 1.5 | 8.0 |
| Example 2-4 | 57.3 | 30.0 | 0.20 | 3.0 | 1.5 | 8.0 |
| Example 2-5 | 57.0 | 30.0 | 0.50 | 3.0 | 1.5 | 8.0 |
| Example 2-6 | 56.5 | 30.0 | 1.00 | 3.0 | 1.5 | 8.0 |
| Example 2-7 | 57.5 | 30.0 | 0.01 | 3.0 | 1.5 | 8.0 |
| Example 2-8 | 57.5 | 30.0 | 0.05 | 3.0 | 1.5 | 8.0 |
| Example 2-9 | 57.4 | 30.0 | 0.10 | 3.0 | 1.5 | 8.0 |
| Example 2-10 | 57.3 | 30.0 | 0.20 | 3.0 | 1.5 | 8.0 |
| Example 2-11 | 57.0 | 30.0 | 0.50 | 3.0 | 1.5 | 8.0 |
| Example 2-12 | 56.5 | 30.0 | 1.00 | 3.0 | 1.5 | 8.0 |
| Example 2-13 | 55.5 | 30.0 | 0.01 | 3.0 | 1.5 | 10.0 |
| Example 2-14 | 55.5 | 30.0 | 0.05 | 3.0 | 1.5 | 10.0 |

TABLE 3-continued

|  | | | | | | |
|---|---|---|---|---|---|---|
| Example 2-15 | 57.4 | 30.0 | 0.10 | 3.0 | 1.5 | 8.0 |
| Example 2-16 | 55.3 | 30.0 | 0.20 | 3.0 | 1.5 | 10.0 |
| Example 2-17 | 57.0 | 30.0 | 0.50 | 3.0 | 1.5 | 8.0 |
| Example 2-18 | 56.5 | 30.0 | 1.00 | 3.0 | 1.5 | 8.0 |
| Example 2-19 | 57.5 | 30.0 | 0.01 | 3.0 | 1.5 | 8.0 |
| Example 2-20 | 55.5 | 30.0 | 0.05 | 3.0 | 1.5 | 10.0 |
| Example 2-21 | 57.4 | 30.0 | 0.10 | 3.0 | 1.5 | 8.0 |
| Example 2-22 | 57.3 | 30.0 | 0.20 | 3.0 | 1.5 | 8.0 |
| Example 2-23 | 57.0 | 30.0 | 0.50 | 3.0 | 1.5 | 8.0 |
| Example 2-24 | 56.5 | 30.0 | 1.00 | 3.0 | 1.5 | 8.0 |
| Example 2-25 | 57.5 | 30.0 | 0.05 | 3.0 | 1.5 | 8.0 |
| Example 2-26 | 57.4 | 30.0 | 0.10 | 3.0 | 1.5 | 8.0 |
| Example 2-27 | 57.3 | 30.0 | 0.20 | 3.0 | 1.5 | 8.0 |
| Example 2-28 | 42.4 | 45.1 | 0.05 | 3.0 | 1.5 | 8.0 |
| Example 2-29 | 72.5 | 15.0 | 0.05 | 3.0 | 1.5 | 8.0 |
| Example 2-30 | 79.5 | 8.0 | 0.05 | 3.0 | 1.5 | 8.0 |
| Example 2-31 | 85.5 | 2.0 | 0.05 | 3.0 | 1.5 | 8.0 |
| Example 2-32 | 57.5 | 30.0 | 0.05 | 3.0 | 1.5 | 8.0 |
| Example 2-33 | 57.5 | 30.0 | 0.05 | 3.0 | 1.5 | 8.0 |
| Comparative Example 2-1 | 57.5 | 30.0 | 0.001 | 3.0 | 1.5 | 8.0 |
| Comparative Example 2-2 | 52.5 | 30.0 | 5.000 | 3.0 | 1.5 | 8.0 |
| Comparative Example 2-3 | 57.5 | 30.0 | 0.001 | 3.0 | 1.5 | 8.0 |
| Comparative Example 2-4 | 52.5 | 30.0 | 5.000 | 3.0 | 1.5 | 8.0 |
| Comparative Example 2-5 | 57.5 | 30.0 | 0.001 | 3.0 | 1.5 | 8.0 |
| Comparative Example 2-6 | 52.5 | 30.0 | 5.000 | 3.0 | 1.5 | 8.0 |
| Comparative Example 2-7 | 57.5 | 30.0 | 0.001 | 3.0 | 1.5 | 8.0 |
| Comparative Example 2-8 | 52.5 | 30.0 | 5.000 | 3.0 | 1.5 | 8.0 |
| Comparative Example 2-9 | 34.5 | 53.0 | 0.050 | 3.0 | 1.5 | 8.0 |
| Comparative Example 2-10 | 87.0 | 0.5 | 0.050 | 3.0 | 1.5 | 8.0 |
| Comparative Example 2-11 | 57.5 | 30.0 | 0.050 | 3.0 | 1.5 | 8.0 |

TABLE 4

| | Na/K element concentration in negative electrode active material layer C1 [ppm] | Na/K element concentration in electrolytic solution C2 [ppm] | C1/C2 | Li amount in positive electrode active material layer [×10$^{-4}$ mol/g] | Evaluation result | | | | |
|---|---|---|---|---|---|---|---|---|---|
| | | | | | Initial characteristics | | Storage test at 60° C. Increasing ratio of resistance Rd/Ra | Charging and discharging test under high load Increasing ratio of resistance Re/Ra | Self-discharging characteristics ΔV [V] |
| | | | | | Electric energy per volume E/V [Wh/L] | Initial time constant Ra · F [ΩF] | | | |
| Example 2-1 | 4.6 | 1.6 | 2.88 | 181.7 | 23.4 | 1.10 | 1.65 | 1.68 | 0.092 |
| Example 2-2 | 28.5 | 3.0 | 9.50 | 178.4 | 30.1 | 1.28 | 1.78 | 1.76 | 0.083 |
| Example 2-3 | 56.7 | 8.5 | 6.67 | 175.8 | 46.7 | 1.34 | 1.90 | 1.22 | 0.052 |
| Example 2-4 | 82.3 | 21.8 | 3.78 | 172.9 | 41.6 | 1.67 | 2.10 | 1.34 | 0.056 |
| Example 2-5 | 163.8 | 45.8 | 3.58 | 170.1 | 35.2 | 1.89 | 2.34 | 1.39 | 0.061 |
| Example 2-6 | 270.0 | 78.5 | 3.44 | 165.3 | 29.0 | 2.26 | 2.70 | 1.46 | 0.070 |
| Example 2-7 | 2.8 | 1.3 | 2.15 | 175.6 | 24.6 | 1.21 | 1.62 | 1.76 | 0.074 |
| Example 2-8 | 19.5 | 2.3 | 8.48 | 174.2 | 31.6 | 1.41 | 1.74 | 1.85 | 0.066 |
| Example 2-9 | 38.4 | 5.8 | 6.62 | 172.8 | 49.0 | 1.47 | 1.86 | 1.28 | 0.042 |
| Example 2-10 | 60.4 | 17.0 | 3.55 | 170.9 | 43.7 | 1.84 | 2.06 | 1.41 | 0.045 |
| Example 2-11 | 140.4 | 35.6 | 3.94 | 168.3 | 37.0 | 2.08 | 2.29 | 1.46 | 0.049 |
| Example 2-12 | 241.4 | 70.4 | 3.43 | 164.6 | 30.5 | 2.49 | 2.65 | 1.53 | 0.056 |
| Example 2-13 | 3.8 | 0.7 | 5.43 | 170.8 | 22.9 | 1.01 | 1.77 | 1.53 | 0.083 |
| Example 2-14 | 15.4 | 3.8 | 4.05 | 168.9 | 29.5 | 1.18 | 1.90 | 1.60 | 0.075 |
| Example 2-15 | 36.1 | 8.9 | 4.06 | 167.3 | 45.8 | 1.23 | 2.03 | 1.11 | 0.047 |
| Example 2-16 | 70.5 | 12.5 | 5.64 | 164.1 | 40.8 | 1.54 | 2.25 | 1.22 | 0.050 |
| Example 2-17 | 155.3 | 24.1 | 6.44 | 160.3 | 34.5 | 1.74 | 2.50 | 1.26 | 0.055 |
| Example 2-18 | 256.3 | 51.3 | 5.00 | 157.1 | 28.4 | 2.08 | 2.89 | 1.33 | 0.063 |
| Example 2-19 | 2.1 | 0.6 | 3.57 | 166.0 | 24.1 | 1.09 | 1.67 | 1.69 | 0.069 |
| Example 2-20 | 11.2 | 1.9 | 5.89 | 165.1 | 31.0 | 1.27 | 1.80 | 1.77 | 0.062 |
| Example 2-21 | 24.8 | 4.3 | 5.77 | 163.8 | 48.1 | 1.33 | 1.92 | 1.23 | 0.039 |
| Example 2-22 | 51.2 | 9.5 | 5.39 | 161.2 | 42.8 | 1.65 | 2.12 | 1.35 | 0.042 |
| Example 2-23 | 129.0 | 18.9 | 6.83 | 158.6 | 36.2 | 1.87 | 2.36 | 1.40 | 0.046 |
| Example 2-24 | 210.7 | 48.6 | 4.34 | 155.3 | 29.8 | 2.24 | 2.73 | 1.47 | 0.053 |
| Example 2-25 | 26.3 | 4.1 | 6.41 | 181.1 | 30.7 | 1.27 | 1.83 | 1.72 | 0.066 |
| Example 2-26 | 47.8 | 10.3 | 4.64 | 177.9 | 47.6 | 1.33 | 1.96 | 1.20 | 0.042 |
| Example 2-27 | 71.0 | 19.1 | 3.72 | 175.2 | 42.4 | 1.65 | 2.16 | 1.31 | 0.045 |
| Example 2-28 | 38.5 | 2.7 | 14.26 | 230.1 | 34.2 | 1.56 | 1.89 | 1.93 | 0.094 |
| Example 2-29 | 21.6 | 3.8 | 5.68 | 70.5 | 27.4 | 1.39 | 1.77 | 1.78 | 0.051 |
| Example 2-30 | 11.8 | 5.2 | 2.27 | 20.7 | 21.4 | 1.21 | 1.59 | 1.52 | 0.065 |
| Example 2-31 | 6.9 | 6.1 | 1.13 | 11.9 | 17.5 | 1.08 | 1.38 | 1.31 | 0.082 |
| Example 2-32 | 25.4 | 4.1 | 6.20 | 93.4 | 26.5 | 1.34 | 1.89 | 1.88 | 0.073 |

TABLE 4-continued

|  | Na/K element concentration | | | Li amount in positive | Evaluation result | | | | |
|---|---|---|---|---|---|---|---|---|---|
|  | | | | | Initial characteristics | | Storage test | Charging and discharging test under | Self- |
|  | in negative electrode active material layer C1 [ppm] | Na/K element concentration in electrolytic solution C2 [ppm] | C1/C2 | electrode active material layer [×10$^{-4}$ mol/g] | Electric energy per volume E/V [Wh/L] | Initial time constant Ra · F [ΩF] | at 60° C. Increasing ratio of resistance Rd/Ra | high load Increasing ratio of resistance Re/Ra | discharging characteristics ΔV [V] |
| Example 2-33 | 22.8 | 5.5 | 4.15 | 83.9 | 24.1 | 1.45 | 1.81 | 1.92 | 0.085 |
| Comparative Example 2-1 | 1.5 | 1.9 | 0.79 | 9.8 | 13.8 | 1.19 | 1.68 | 2.24 | 0.156 |
| Comparative Example 2-2 | 1300 | 80.4 | 16.2 | 350.3 | 25.7 | 3.19 | 3.54 | 2.79 | 0.186 |
| Comparative Example 2-3 | 1.30 | 1.9 | 0.68 | 9.7 | 14.8 | 1.31 | 1.63 | 2.53 | 0.113 |
| Comparative Example 2-4 | 1210 | 73.5 | 16.5 | 319.8 | 27.5 | 3.51 | 3.43 | 3.15 | 0.147 |
| Comparative Example 2-5 | 1.40 | 2.1 | 0.67 | 8.2 | 13.2 | 1.22 | 1.68 | 2.43 | 0.143 |
| Comparative Example 2-6 | 1260 | 60.3 | 20.9 | 308.4 | 24.7 | 3.26 | 3.54 | 3.03 | 0.170 |
| Comparative Example 2-7 | 1.1 | 2.3 | 0.48 | 7.8 | 14.3 | 1.11 | 1.76 | 2.31 | 0.104 |
| Comparative Example 2-8 | 1150 | 52.9 | 21.7 | 301.1 | 26.7 | 3.05 | 3.71 | 2.88 | 0.135 |
| Comparative Example 2-9 | 59.40 | 3.6 | 16.5 | 370.3 | 38.9 | 3.11 | 3.02 | 2.87 | 0.210 |
| Comparative Example 2-10 | 3.0 | 3.3 | 0.91 | 3.8 | 13.5 | 0.99 | 3.45 | 1.74 | 0.163 |
| Comparative Example 2-11 | 8.30 | 8.8 | 0.94 | 348.9 | 14.0 | 1.83 | 2.88 | 2.53 | 0.198 |

Example 2-34

<Assembling of Storage Element>

The resulting double sided negative electrode A and double sided positive electrode precursor A were cut to 10 cm×10 cm (100 cm$^2$). The one-sided positive electrode precursor was used at the uppermost surface and lowermost surface, and further, 21 pieces of double sided negative electrodes and 20 pieces of double sided positive electrode precursors were used to laminate, by sandwiching a microporous film separator having a thickness of 15 μm, between the negative electrode and the positive electrode precursor. After that, a negative electrode terminal and a positive electrode terminal were ultrasonic welded to the negative electrode, and the positive electrode precursor, respectively, to prepare an electrode laminated body. This electrode laminated body was vacuum dried at 80° C., 50 Pa for 60 hours. This electrode laminated body was inserted inside a casing composed of a laminate packaging material, under a dry environment of dew point −45° C., and three sides of the casing of electrode terminal parts and the bottom part were heat sealed under conditions of 180° C., 20 second, and 1.0 MPa. The nonaqueous electrolytic solution was injected in the casing and the casing was sealed to produce a nonaqueous lithium-type storage element.

<Liquid Injection, Impregnation, and Encapsulation of Storage Element>

Into the electrode laminated body contained in the aluminum laminate packaging material, about 80 g of the nonaqueous electrolytic solution was injected, under atmospheric pressure, a temperature of 25° C., and a dry air environment of equal to or lower than dew point −40° C. Subsequently, the nonaqueous lithium-type storage element was put in a reduced pressure chamber to reduce pressure from atmospheric pressure to −87 kPa, then restored to atmospheric pressure, and stood still for 5 minutes. Then, an operation of restoring to atmospheric pressure, after reducing pressure from atmospheric pressure to −87 kPa, was repeated four times, followed by standing still for 15 minutes. Furthermore, after reducing pressure from atmospheric pressure to −91 kPa, atmospheric pressure was restored. An operation procedure for similarly reducing pressure and restoring to atmospheric pressure was repeated seven times in total (pressure was reduced from atmospheric pressure each to −95, −96, −97, −81, −97, −97, −97 kPa). The nonaqueous electrolytic solution was impregnated to the electrode laminated body, by the above procedure.

After that, the nonaqueous lithium-type storage element was put in a reduced pressure sealing machine, and the aluminum laminate packaging material was encapsulated, by sealing in a state of a reduced pressure of −95 kPa, at 180° C. for 10 seconds, and a pressure of 0.1 MPa.

<Lithium Doping>

As for the resulting nonaqueous lithium-type storage element, lithium doping to the negative electrode was carried out by initial charging by a method for carrying out charging under constant current till attaining a voltage of 4.6 V, under a current value of 0.6A, and subsequently continuing charging under constant voltage at 4.4 V for 30 hours, at an environment of 45° C., using a charging and discharging apparatus (TOSCAT-3100U), manufactured by Toyosystem Corp.

[Aging]

As for the nonaqueous lithium-type storage element, after lithium doping, charging under constant current at 4.0 V was carried out for 1 hour, after carrying out discharging under constant current till attaining a voltage of 2.0 V, under 0.7A, under an environment of 25° C., and voltage was adjusted to 4.0 V. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

The nonaqueous lithium-type storage element was prepared similarly as in Example 2-1, except for carrying out assembling of the storage element, lithium doping, and aging by the method described above, and various kinds of evaluations were carried out.

Evaluation results are shown in Table 6.

Example 2-35

<Lithium Doping>
As for the resulting nonaqueous lithium-type storage element, lithium doping to the negative electrode was carried out by initial charging by a method for carrying out charging under constant current till attaining a voltage of 4.5 V, under a current value of 0.6A, and subsequently continuing charging under constant voltage at 4.5 V for 30 hours, under an environment of 45° C., using a charging and discharging apparatus (TOSCAT-3100U), manufactured by Toyosystem Corp.
<Aging>
As for the nonaqueous lithium-type storage element after lithium doping, charging under constant current at 4.0 V was carried out for 1 hour, after carrying out discharging under constant current till attaining a voltage of 2.0 V, under 0.7A, under an environment of 25° C., and voltage was adjusted to 4.0 V. Subsequently, the nonaqueous lithium-type storage element was stored for 20 hours in a thermostat chamber set at 60° C. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

The nonaqueous lithium-type storage element was prepared similarly as in Example 34, except for carrying out lithium doping, and aging by the method described above, and various kinds of evaluations were carried out.

Evaluation results are shown in Table 6.

Example 2-36

<Lithium Doping>
As for the resulting nonaqueous lithium-type storage element, lithium doping to the negative electrode was carried out by initial charging by a method for carrying out charging under constant current till attaining a voltage of 4.4 V, under a current value of 0.6A, and subsequently continuing charging under constant voltage at 4.2 V for 30 hours, under an environment of 45° C., using a charging and discharging apparatus (TOSCAT-3100U), manufactured by Toyosystem Corp.
<Aging>
As for the nonaqueous lithium-type storage element after lithium doping, charging under constant current at 4.0 V was carried out for 1 hour, after carrying out discharging under constant current till attaining a voltage of 2.0 V, under 0.7A, under an environment of 25° C., and voltage was adjusted to 4.0 V. Subsequently, the nonaqueous lithium-type storage element was stored for 30 hours in a thermostat chamber set at 60° C. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

The nonaqueous lithium-type storage element was prepared similarly as in Example 2-34, except for carrying out lithium doping, and aging by the method described above, and various kinds of evaluations were carried out.

Evaluation results are shown in Table 6.

Example 2-37

<Lithium Doping>
As for the resulting nonaqueous lithium-type storage element, lithium doping to the negative electrode was carried out by initial charging by a method for carrying out charging under constant current till attaining a voltage of 4.3 V, under a current value of 0.6A, and subsequently continuing charging under constant voltage at 4.1 V for 30 hours, under an environment of 45° C., using a charging and discharging apparatus (TOSCAT-3100U), manufactured by Toyosystem Corp.
<Aging>
As for the nonaqueous lithium-type storage element after lithium doping, charging under constant current at 4.0 V was carried out for 1 hour, after carrying out discharging under constant current till attaining a voltage of 2.0 V, under 0.7A, under an environment of 25° C., and voltage was adjusted to 4.0 V. Subsequently, the nonaqueous lithium-type storage element was stored for 40 hours in a thermostat chamber set at 60° C. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

The nonaqueous lithium-type storage element was prepared similarly as in Example 2-34, except for carrying out lithium doping, and aging by the method described above, and various kinds of evaluations were carried out.

Evaluation results are shown in Table 6.

Comparative Example 2-12

<Lithium Doping>
As for the resulting nonaqueous lithium-type storage element, lithium doping to the negative electrode was carried out by initial charging by a method for carrying out charging under constant current till attaining a voltage of 5.0 V, under a current value of 0.6A, and subsequently continuing charging under constant voltage at 4.8 V for 30 hours, under an environment of 25° C., using a charging and discharging apparatus (TOSCAT-3100U), manufactured by Toyosystem Corp.
<Aging>
As for the nonaqueous lithium-type storage element after lithium doping, charging under constant current at 4.0 V was carried out for 1 hour, after carrying out discharging under constant current till attaining a voltage of 2.0 V, under 0.7A, under an environment of 25° C., and voltage was adjusted to 4.0 V. Subsequently, the nonaqueous lithium-type storage element was stored for 3 hours in a thermostat chamber set at 25° C. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

The nonaqueous lithium-type storage element was prepared similarly as in Example 2-34, except for carrying out lithium doping, and aging by the method described above, and various kinds of evaluations were carried out.

Evaluation results are shown in Table 6.

Comparative Example 2-13

<Lithium Doping>

As for the resulting nonaqueous lithium-type storage element, lithium doping to the negative electrode was carried out by initial charging by a method for carrying out charging under constant current till attaining a voltage of 3.0 V, under a current value of 0.6 A, and subsequently continuing charging under constant voltage at 3.8 V for 30 hours, under an environment of 25° C., using a charging and discharging apparatus (TOSCAT-3100U), manufactured by Toyosystem Corp.

<Aging>

As for the nonaqueous lithium-type storage element after lithium doping, charging under constant current at 4.0 V was carried out for 1 hour, after carrying out discharging under constant current till attaining a voltage of 2.0 V, under 0.7 A, under an environment of 25° C., and voltage was adjusted to 4.0 V. Subsequently, the nonaqueous lithium-type storage element was stored for 100 hours in a thermostat chamber set at 85° C. Subsequently, charging and discharging cycle by charging under constant current and discharging under constant current was repeated 2 cycles between the lower limit voltage of 2.0 V and the upper limit voltage of 4.0 V, by setting a charging current at 1 A and a discharging current at 1 A.

The nonaqueous lithium-type storage element was prepared similarly as in Example 2-34, except for carrying out lithium doping, and aging by the method described above, and various kinds of evaluations were carried out.

Evaluation results are shown in Table 6.

TABLE 5

| | | Positive electrode | | | | | | | | | |
|---|---|---|---|---|---|---|---|---|---|---|---|
| | | Active material | | Lithium compound | | Composition ratio of positive electrode precursor | | | | | |
| | Negative electrode | Activated carbon | Active material particle diameter [μm] | Lithium compound type | Lithium compound particle diameter [μm] | Na/K compound type | Active material [% by weight] | Lithium compound [% by weight] | Na/K compound [% by weight] | KB [% by weight] | PVP [% by weight] | PVDF [% by weight] |
| Example 2-34 | A | 1 | 4.2 | Lithium carbonate 2 | 1.5 | Sodium oxalate | 57.5 | 30.0 | 0.05 | 3.0 | 1.5 | 8.0 |
| Example 2-35 | A | 1 | 4.2 | Lithium carbonate 2 | 1.5 | Sodium oxalate | 57.5 | 30.0 | 0.05 | 3.0 | 1.5 | 8.0 |
| Example 2-36 | A | 1 | 4.2 | Lithium carbonate 2 | 1.5 | Sodium oxalate | 57.5 | 30.0 | 0.05 | 3.0 | 1.5 | 8.0 |
| Example 2-37 | A | 1 | 4.2 | Lithium carbonate 2 | 1.5 | Sodium oxalate | 57.5 | 30.0 | 0.05 | 3.0 | 1.5 | 8.0 |
| Comparative Example 2-12 | A | 1 | 4.2 | Lithium carbonate 2 | 1.5 | Sodium oxalate | 57.5 | 30.0 | 0.05 | 3.0 | 1.5 | 8.0 |
| Comparative Example 2-13 | A | 1 | 4.2 | Lithium carbonate 2 | 1.5 | Sodium oxalate | 57.5 | 30.0 | 0.05 | 3.0 | 1.5 | 8.0 |

TABLE 6

| | | | | | Evaluation result | | | | |
|---|---|---|---|---|---|---|---|---|---|
| | Na/K element concentration | | | Li amount in positive | Initial characteristics | | Storage test at 60° C. Increasing ratio of resistance Rd/Ra | Charging and discharging test under high load Increasing ratio of resistance Re/Ra | Self-discharging characteristics ΔV [V] |
| | in negative electrode active material layer C1 [ppm] | Na/K element concentration in electrolytic solution C2 [ppm] | C1/C2 | electrode active material layer [×10⁻⁴ mol/g] | Electric energy per volume E/V [Wh/L] | Initial time constant Ra·F [ΩF] | | | |
| Example 2-34 | 40.6 | 3.8 | 10.68 | 177.7 | 35.6 | 1.43 | 1.83 | 1.81 | 0.090 |
| Example 2-35 | 31.6 | 5.2 | 6.08 | 111.4 | 32.5 | 1.20 | 1.59 | 1.67 | 0.054 |
| Example 2-36 | 18.5 | 6.9 | 2.68 | 38.1 | 29.7 | 1.16 | 1.41 | 1.50 | 0.071 |
| Example 2-37 | 10.2 | 8.6 | 1.19 | 11.4 | 23.1 | 1.20 | 1.67 | 1.53 | 0.088 |
| Comparative Example 2-12 | 60.3 | 3.2 | 18.84 | 400.3 | 39.6 | 3.29 | 3.01 | 2.39 | 0.214 |
| Comparative Example 2-13 | 8.5 | 11.3 | 0.75 | 8.5 | 14.5 | 1.13 | 3.64 | 1.67 | 0.176 |

Example 3-1

<Preparation of Lithium Carbonate 3

Lithium carbonate (200 g), having an average particle diameter of 53 µm, was cooled down to −196° C. with liquid nitrogen, using a pulverizing machine (liquid nitrogen beads mill LNM), manufactured by IMEX Co., Ltd., and then pulverized using dry ice beads, at a peripheral speed of 10.0 m/s for 9 minutes. Brittle fracture of lithium carbonate can be attained, while preventing thermal denaturation, by cooling it to -196° C., and average particle diameter of the resulting lithium carbonate 3 was measured and found to be 2.0 µm.

[Preparation of Positive Electrode Active Material]
[Preparation of Activated Carbon 1]

A carbonized product was obtained by carbonization treatment of a pulverized coconut shell carbonized product in a compact-type carbonization furnace at 500° C. for 3 hours under nitrogen. The resulting carbonized product was put inside an activation furnace, and steam was introduced inside the activation furnace in 1 kg/h, in a warmed state in a preheating furnace, and activated by increasing temperature up to 900° C. taking 8 hours. A carbonized product thus activated was obtained by taking out the carbonized product after activation, and cooling it under nitrogen atmosphere. Draining was carried out after the resulting activated carbon was washed with passing water for 10 hours. After that, activated carbon 1 was obtained by drying for 10 hours inside an electric drying machine held at 115° C., and then by carrying out pulverizing for 1 hour, using a ball mill.

As for this activated carbon 1, average particle diameter was measured, using a laser diffraction-type particle size distribution measurement apparatus (SALD-2000), manufactured by Shimadzu Corp., and found it to be 4.2 µm. Fine pore distribution thereof was measured using a fine pore distribution measurement apparatus (AUTOSORB-1, AS-1-MP, manufactured by Yuasa Ionics Co. Ltd. As a result, BET specific area was 2360 m$^2$/g, mesopore volume ($V_1$) was 0.52 cc/g, micropore volume ($V_2$) was 0.88 cc/g, and $V_1/V_2$=0.59.

[Preparation of Activated Carbon 2]

A carbonized product having an average particle diameter of 7.0 µm was obtained by carrying out carbonization treatment of a phenol resin in a furnace at 600° C. for 2 hours under nitrogen atmosphere, and then pulverizing it using a ball mill, and carrying out classification. Activation was carried out by mixing this carbonized product and KOH in a weight ratio of 1:5, and heating it at 800° C. for 1 hour in the furnace, under nitrogen atmosphere. Then, activated carbon 2 was obtained by carrying out washing under stirring for 1 hour, in diluted hydrochloric acid adjusted to a concentration of 2 mol/L, then washing with distilled water under boiling till stabilization in a range of pH 5 to 6, and then carrying out drying.

As for this activated carbon 2, average particle diameter was measured, using a laser diffraction-type particle size distribution measurement apparatus (SALD-2000J), manufactured by Shimadzu Corp., and found it to be 7.1 µm. Fine pore distribution thereof was measured using a fine pore distribution measurement apparatus (AUTOSORB-1, AS-1-MP, manufactured by Yuasa Ionics Co. Ltd. As a result, BET specific area was 3627 m$^2$/g, mesopore volume ($V_1$) was 1.50 cc/g, micropore volume ($V_2$) was 2.28 cc/g, and $V_1/V_2$=0.66.

[Preparation of Positive Electrode Coating Solution (Composition a)]

A positive electrode coating solution (composition a) was produced using the resulting activated carbon 1 or 2 as a positive electrode active material, and the resulting lithium carbonate 3 as a lithium compound to be charged.

The coating solution (composition a) was obtained by mixing 59.5 parts by weight of activated carbon 1 or 2, 28.0 parts by weight of lithium carbonate 1, 3.0 parts by weight of Ketjen black, 1.5 parts by weight of PVP (polyvinyl pyrrolidone), and 8.0 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 17.0 m/s.

[Preparation of Positive Electrode Coating Solution (Composition b)]

A positive electrode coating solution (composition b) was produced using the resulting activated carbon 1 or 2 as a positive electrode active material, and the resulting lithium carbonate 3 as a lithium compound to be charged.

The coating solution (composition b) was obtained by mixing 34.5 parts by weight of activated carbon 1 or 2, 56.0 parts by weight of lithium carbonate 3, 2.0 parts by weight of Ketjen black, 1.5 parts by weight of PVP (polyvinyl pyrrolidone), and 6.0 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 17.0 m/s.

[Preparation of Positive Electrode Coating Solution (Composition c)]

A positive electrode coating solution (composition c) was produced by the following method, using the resulting activated carbon 1 or 2 as a positive electrode active material, and without using the lithium compound to be charged.

The coating solution (composition c) was obtained by mixing 78.4 parts by weight of activated carbon 1 or 2, 4.6 parts by weight of Ketjen black, 3.4 parts by weight of PVP (polyvinyl pyrrolidone), and 13.6 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 17.0 m/s.

[Production of Positive Electrode Precursor]

A positive electrode precursor was obtained by coating the coating solution (composition a) of the positive electrode on one surface or both surfaces of an aluminum foil having a thickness of 15 µm, under condition of a coating speed of 1 m/min., using a die coater, manufactured by TORAY ENGINEERING Co., Ltd., and dying at a drying temperature of 100° C. The resulting positive electrode precursor was pressed using a roll press machine, under condition of a pressure of 4 kN/cm, and a surface temperature of the press part of 25° C.

<Production of Negative Electrode>
[Production of Negative Electrode 1]

A composite carbon material 1a was obtained by carrying out a thermal reaction by putting 150 g of commercial coconut shell activated carbon, which has an average particle diameter of 3.0 µm, and BET specific surface area of 1780 m$^2$/g, in a cage made of a stainless-steel mesh, putting the cage on a stainless-steel tray containing 270 g of coal-based pitch (softening point: 50° C.), and placing the both of them in an electric furnace (effective dimension of inside the furnace: 300 mm×300 mm×300 mm). This heat treatment was carried out under nitrogen atmosphere, by increasing temperature up to 600° C. taking 8 hours, and holding at the same temperature for 4 hours. The composite carbon material 1 was taken out from the furnace, after sequential cooling down to 60° C. by natural cooling.

As for the resulting composite carbon material 1, average particle diameter and BET specific area were measured by a similar method as above. Results were as follows: average particle diameter was 3.2 µm, BET specific area was 262 m$^2$/g. Weight ratio of a carbonaceous material derived from coal-based pitch to activated carbon was 78%.

Next, a negative electrode was produced using the composite carbon material 1a as a negative electrode active material.

A coating solution was obtained by mixing 85 parts by weight of the composite carbon material 1a, 10 parts by weight of acetylene black, and 5 parts by weight of PVdF (polyvinylidene fluoride), as well as NMP (N-methylpyrrolidone), and dispersing them using a thin-film spin-type high speed mixer, Filmix, manufactured by PRIMIX Co. Ltd., under condition of a peripheral speed of 15 m/s. Viscosity (ηb) and TI value of the resulting coating solution were measured using an E-type viscometer, TVE-35H, manufactured by Touki Sangyo Co., Ltd. As a result, viscosity (ηb) was 2,789 MPa·s, and TI value was 4.3. A negative electrode 1 was obtained by coating the coating solution on both surfaces of an electrolytic copper foil having a thickness of 10 µm, under condition of a coating speed of 1 m/min., using a die coater, manufactured by TORAY ENGINEERING Co., Ltd., and drying at a drying temperature of 85° C. The resulting negative electrode 1 was pressed using a roll press machine, under condition of a pressure of 4 kN/cm, and a surface temperature of the press part of 25° C. Film thickness of the negative electrode active material layer of the resulting negative electrode 1 was determined by measurement at arbitrary 10 points of the negative electrode 1, using a film thickness meter, Linear Gauge Sensor, GS-551, manufactured by ONO SOKKI Co., Ltd., and by subtracting thickness of the copper foil, from average value of thicknesses thus measured. Film thickness of the negative electrode active material layer of the negative electrode 1 was 40 µm per one surface.

[Production of negative electrodes 2 and 3]

Production and evaluation of the negative electrode active material were carried out similarly as in preparation of the negative electrode 1, except for adjusting so as to attain the substrate and amount thereof, amount of coal-based pitch, heat treatment temperature, as shown in the following Table 7. Production and evaluation of the negative electrode were carried out similarly as in preparation of the negative electrode 1, except for using the resulting negative electrode active material, and adjusting so as to attain the coating solution described in Table 7. Results are shown in the following Table 7.

TABLE 7

| | | Negative electrode active material | | | | | |
|---|---|---|---|---|---|---|---|
| | | Raw material | | | | Weight | BET |
| | Name | Substrate Type | Amount (parts by weight) | Pitch Amount (parts by weight) | Heat treatment temperature (° C.) | ratio of carbonaceous material (%) | Average particle diameter (µm) | specific surface area (m$^2$/g) |
| Negative electrode 1 | Composite carbon material 1a | Coconut shell activated carbon | 150 | 270 | 600 | 78 | 3.2 | 262 |
| Negative electrode 2 | Composite carbon material 1b | Carbon nanoparticles | 150 | 150 | 1000 | 32 | 6.8 | 303 |
| Negative electrode 3 | Composite carbon material 2a | Artificial graphite | 150 | 15 | 1000 | 2 | 4.9 | 6.1 |

| | | Coating solution | | | | | Film thickness per one surface of negative electrode active material Layer (µm) |
|---|---|---|---|---|---|---|---|
| | | Solid content | | | Property Viscosity ηb mPa·s | Adjustment TI value | |
| | | Negative electrode active material | Acetylene black | PVdF | | | |
| | Negative electrode 1 | 85 parts by weight | 10 parts by weight | 5 parts by weight | 2,789 | 4.3 | 40 |
| | Negative electrode 2 | 80 parts by weight | 2 parts by weight | 18 parts by weight | 2,456 | 3.6 | 40 |
| | Negative electrode 3 | 80 parts by weight | 8 parts by weight | 12 parts by weight | 2,798 | 2.7 | 25 |

Raw materials in Table 7 are each as described below.

Coconut shell activated carbon: Average particle diameter 3.0 µm, BET specific surface area 1,780 m$_2$/g Carbon nanoparticles: Average particle diameter 5.2 µm, BET specific surface area 859 m$_2$/g, diameter of primary particles 20 nm Artificial graphite: Average particle diameter 4.8 µm, BET specific surface area 3.1 m$_2$/g Pitch: Coal-based pitch having a softening point of 50° C.

<Preparation of Nonaqueous Electrolytic Solution>

As a nonaqous electrolytic solution, a solution was used, which was obtained by using a mixed solvent of ethylene carbonate (EC) and methyl ethyl carbonate (EMC) (volume ratio=33:67), as an organic solvent, and dissolving therein each of electrolytic salts, so as to attain a concentration ratio of $LiN(SO_2F)_2$ and $LiPF_6$ of 75:25 (molar ratio), and a total concentration of $LiN(SO_2F)_2$ and $LiPF_6$ of 1.2 mol/L, relative to total electrolytic solution.

Concentration of $LiN(SO_2F)_2$ and $LiPF_6$ in the nonaquous electrolytic solution prepared here was 0.3 mol/L and 0.9 mol/L, respectively, resulting in $M_A$=0.9 mol/L, $M_B$=0.3 mol/L, and $M_A/(M_A+M_B)$=0.75.

[Immersion of Aluminum]

Aluminum was made contained in the nonaquous electrolytic solution, by putting 1 g of powder of aluminum hydroxide (014-01925, produced by Fuji Film Wako Pure Chemicals Co., Ltd.) into 100 g of the resulting nonaquous electrolytic solution, and standing still for 5 hours under an environment of 45° C., and equal to or lower than dew point −40° C.

<Production of Nonaqueous Lithium-Type Storage Element>

[Assembling]

The resulting double sided negative electrode 2 and double sided positive electrode precursor 1 were cut to 10 cm×10 cm (100 cm²). The one-sided positive electrode precursor 1 was used at the uppermost surface and lowermost surface, and further, 21 pieces of the double sided negative electrodes 2 and 20 pieces of double the sided positive electrode precursors 1 were used to laminate by sandwiching a microporous film separator having a thickness of 15 µm, between the negative electrode and the positive electrode precursor. After that, a negative electrode terminal and positive electrode terminal were ultrasonic welded to the negative electrode, and the positive electrode precursor, respectively, to prepare an electrode laminated body. This electrode laminated body was vacuum dried under condition of a temperature of 80° C., a pressure of 50 Pa and a drying time of 60 hr. The electrode laminated body after drying was contained inside a casing composed of an aluminum laminate packaging material, under a dry environment of equal to or lower than dew point −45° C., and three sides of the casing of electrode terminal parts and the bottom part were heat sealed under conditions of a temperature of 180° C., a sealing time of 20 second, and a sealing pressure of 1.0 MPa.

[Liquid Injection, Impregnation, Encapsulation]

Into the electrode laminated body contained in the aluminum laminate packaging material, about 80 g of the nonaqueous electrolytic solution was injected, under atmospheric pressure, a temperature of 25° C., and a dry air environment of equal to or lower than dew point −40° C. Subsequently, the nonaqueous lithium-type storage element was put in a reduced pressure chamber to reduce pressure from atmospheric pressure to −87 kPa, then restored to atmospheric pressure, and stood still for 5 minutes. Then, an operation of restoring to atmospheric pressure, after reducing pressure from atmospheric pressure to −87 kPa, was repeated four times, followed by standing still for 15 minutes. Furthermore, after reducing pressure from atmospheric pressure to −91 kPa, atmospheric pressure was restored. An operation procedure for similarly reducing pressure and restoring to atmospheric pressure was repeated seven times in total (pressure was reduced from atmospheric pressure each to −95, −96, −97, −81, −97, −97, −97 kPa). The nonaqueous electrolytic solution was impregnated to the electrode laminated body, by the above procedure.

After that, the nonaqueous lithium-type storage element was put in a reduced pressure sealing machine, and the aluminum laminate packaging material was encapsulated, by sealing in a state of a reduced pressure of −95 kPa, at 180° C. for 10 seconds, and a pressure of 0.1 MPa.

[Lithium Doping]

As for the resulting nonaqueous lithium-type storage element, lithium was doped to the negative electrode, by carrying out initial charging by a method for carrying out charging under constant current till attaining a voltage of 4.5 V, under a current value of 50 mA, and subsequently continuing charging under constant voltage at 4.5 V for 72 hours, using a charging and discharging apparatus (TOSCAT-3100U), manufactured by Toyosystem Corp.

[Aging]

As for the nonaqueous lithium-type storage element after lithium doping, discharging under constant current at 3.0 V was carried out for 1 hour, after carrying out discharging under constant current till attaining a voltage of 3.0 V, at 1.0Å, under an environment of 25° C., voltage was adjusted to 3.0 V. After that, the nonaqueous lithium-type storage element was stored in a thermostat chamber set at 60° C. for 60 hours.

[Gas Venting]

As for the nonaqueous lithium-type storage element after aging, a part of the aluminum laminate packaging material was unsealed at a temperature of 25° C., and under a dry air environment of dew point −40° C. The nonaqueous lithium-type storage element was put in a reduced pressure chamber to reduce pressure from atmospheric pressure to −80 kPa, taking 3 minutes, using a diaphragm pump, manufactured by KNF Co., Ltd., (N816. 3KT. 45. 18), then restored to atmospheric pressure, taking 3 minutes, which operation was repeated 3 times in total. Then, an aluminum laminate packaging material was encapsulated by sealing under a pressure of 0.1 MPa at 200° C. for 10 seconds, after putting the nonaqueous lithium-type storage element in the reduced pressure sealing machine to reduce pressure to −90 kPa.

The nonaqueous lithium-type storage element was completed by the above procedure.

<Evaluation of Nonaqueous Lithium-Type Storage Element>

[Measurement of Static Capacitance]

As for the resulting storage element, charging under constant current was carried out till attaining 3.8 V, under a current value of 20 C, and subsequently charging under constant voltage was carried out by applying a constant voltage of 3.8 V, for 30 minutes in total, using a charging and discharging apparatus (5V, 360 A), manufactured by FUJITSU TELECOM NETWORKS Ltd., in a thermostat chamber set at 25° C. Static capacitance F was 1000 F, which was calculated by F=Q/(3.8−2.2), where Q is capacitance in carrying out discharging under constant current till attaining 2.2 V, under a current value of 2 C.

[Calculation of Ra·F]

As for the resulting storage element, discharging curve (time-voltage) was obtained, by carrying out charging under constant current till attaining 3.8 V, under a current value of 20 C, subsequently carrying out charging under constant voltage by applying a constant voltage of 3.8 V, for 30 minutes in total, and subsequently carrying out discharging under constant current till attaining 2.2 V, under a current value of 20 C, using a charging and discharging apparatus (5V, 360 A), manufactured by FUJITSU TELECOM NETWORKS Ltd. Inner resistance Ra in normal temperature discharging was calculated by reduced voltage $\Delta E=3.8-E_o$, and $R=\Delta E/(20 \text{ C (current value A)})$, where $E_0$ is voltage corresponding to discharge time=0 second obtained by extrapolation using collinear approximation, from voltage value during 2 seconds and 4 seconds of discharging time, in this discharging curve.

Product of static capacitance F and inner resistance Ra in normal temperature discharging, i.e., Ra·F, was 1.41 ΩF.

[Calculation of Rd/Ra After Storage Test Under High Temperature]

As for the resulting storage element, charging under constant current was carried out till attaining 4.0 V, under a current value of 100 C, and subsequently charging under constant voltage was carried out by applying a constant voltage of 4.0 V for 10 minutes in total, using a charging and discharging apparatus (5V, 360 A), manufactured by FUJITSU TELECOM NETWORKS Ltd., in a thermostat chamber set at 25° C. After that, the cell was stored under an environment of 60° C., taken out from the environment of 60° C. every two weeks, and charging to a cell voltage of 4.0 V by similar charging operation was carried out, and then stored it again under an environment of 60° C. This operation was repeated two months, and inner resistance Rd in normal temperature discharging, after the storage test under high temperature, was calculated, similarly as in the [calculation of Ra·F], for the storage element after the storage test under high temperature. Ratio Rd/Ra was 2.56, which was calculated by dividing this Rd (Ω) with inner resistance Ra (Ω) in normal temperature discharging, before the storage test under high temperature, determined in the [calculation of Ra·F].

[Gas Generation Amount After Storage Test Under High Temperature]

As for the resulting storage element, charging under constant current was carried out till attaining 4.0 V, under a current value of 100 C, and subsequently charging under constant voltage was carried out by applying a constant voltage of 4.0 V for 10 minutes in total, using a charging and discharging apparatus (5V, 360 A), manufactured by FUJITSU TELECOM NETWORKS Ltd., in a thermostat chamber set at 25° C. After that, the cell was stored under an environment of 60° C., taken out from the environment of 60° C. every two weeks, and charging to a cell voltage of 4.0 V by similar charging operation was carried out, and then stored it again under an environment of 60° C. This operation was repeated two months, and Va, cell volume before starting the storage test, and Vb, cell volume after 2 months of the storage test, were measured by the Archimedes method. Gas generation amount determined by (Vb−Va)/F, using static capacitance F, was $16.0 \times 10^{-3}$ cc/F.

[Increasing Ratio of Inner Resistance in Normal Temperature Discharging After Charging and Discharging Cycle Test Under High Load]

As for the resulting storage element, charging and discharging operation was repeated 60000 times, where charging under constant current was carried out till attaining 3.8 V, under a current value of 300 C, and subsequently discharging under constant voltage was carried till attaining 2.2 V, under a current value of 300 C, using a charging and discharging apparatus (5V, 360 A), manufactured by FUJITSU TELECOM NETWORKS Ltd., in a thermostat chamber set at 25° C. Inner resistance Re in normal temperature discharging after the charging and discharging cycle test under high load was calculated, similarly as in the [calculation of Ra·F], after the charging and discharging cycle test under high load. Ratio Re/Ra was 1.77, which was calculated by dividing this Re (Ω) with inner resistance Ra (Ω) before the charging and discharging cycle test under high load, determined in the [calculation of Ra·F].

[Quantitative Determination of Aluminum]

The resulting storage element was disassembled inside an Ar box located in a room of 23° C., and managed to conditions of equal to or lower than dew point −90° C., and an oxygen concentration of equal to or lower than 1 ppm, and 0.2 g of the nonaqueous electrolytic solution was taken out. In to a Teflon (registered trade name) container, 0.2 g of the nonaqueous electrolytic solution was injected, and 4 cc of 60% nitric acid was added. This was decomposed using a microwave decomposition apparatus (ETHOS PLUS, manufactured by Milestone General K. K.), and diluted in a measuring cylinder to 50 ml using pure water. Quantitative easurement of aluminum in this nonaqeous electrolytic solution was carried out using ICP-MS (X series 2, manufactured by Thermo Fischer Scientific Inc.) to determine aluminum concantration (ppm), per unit weight of the nonaqeous electrolytic solution, and found to be 51 ppm.

[Preparation of Positive Electrode Sample]

The resulting remained nonaqueous lithium-type storage element was disassembled in an argon box at dew point temperature −72° C., and the positive electrode coated with the positive electrode active material layer at both surfaces was cut out to a size of 10 cm×5 cm, immersed in 30 g of a diethyl carbonate solvent, and washed for 10 minutes by moving it occasionally with a pair of tweezers. Subsequently, the positive electrode was taken out, air dried for 5 minutes in the argon box, immersed in newly prepared 30 g of a diethyl carbonate solvent, and washed for 10 minutes by a similar method as above. A positive electrode sample was obtained by taking out the positive electrode from the argon box, and drying for 20 hours under condition of a temperature of 25° C. and a pressure of 1 kPa, using a vacuum drying machine (manufactured by Yamato Scientific Co., Ltd.).

[Quantitative Determination of Lithium Compound]

The positive electrode sample was cut out to a size of 5 cm×5 cm (weight 0.256 g), and immersed in 20 g of methanol, and after covering a container with a lid, it was stood still for 3 days under an environment of 25° C. After that, the positive electrode was taken out and vacuum dried for 10 hours under condition of 120° C. and 5 kPa. Weight $M_0$ of the positive electrode in this time was 0.249 g, and as for the methanol solution after washing, GC/MS was measured under condition in preparation of a calibration curve, in advance, and it has been confirmed that amount of diethyl carbonate present was less than 1%. Subsequently, the positive electrode was impregnated in 25.00 g of distiller water, and by covering the container with the lid, stood still for 3 days under an environment of 45° C. Weight of distiller water after 3 days of standing still was 24.65 g, therefore 0.35 g of distiller water was added. After that, the positive electrode was taken out and vacuum dried for 12 hours under conditions of 150° C. and 3 kPa. Weigh $M_1$ of the positive electrode in this time was 0.234 g, and as for distiller water after washing, GC/MS was measured under condition in preparation of the calibration curve, in advance, and it has been confirmed that amount of methanol present was less than 1%. An active material layer on a positive electrode power collector was removed using a spatula, a brush, etc., and weight $M_2$ of the positive electrode power collector was measured, and found to be 0.099 g. Lithium carbonate in the positive electrode was quantitatively determined by equation (4), and was found to be 10.0% by weight.

[Measurement of SEM and EDX of Cross-Section of Positive Electrode]

A cross section perpendicular to surface direction of the positive electrode sample 1 was prepared, by cutting out from the positive electrode sample 1 to a size of 1 cm×1 cm, using SM-09020CP, manufactured by JEOL, and using argon gas, under conditions of an acceleration voltage of 4 kV and a beam diameter of 500 μm. After that, SEM and EDX of cross-section of the positive electrode were measured under air exposure by conditions shown below.

[Measurement Conditions of SEM-EDX]
- Measurement apparatus: Field emission-type SEM, FE-SEM, S-4700, manufactured by Hitachi High-Technologies Corp., and energy dispersion-type X-ray analysis apparatus, EMAX, manufactured by Horiba, Co. Ltd.
- Acceleration voltage: 10 kV
- Emission current: 1 μA
- Measurement magnification: 2000 times
- Electron beam incident angle: 90°
- X-ray take out angle: 30°
- Dead time: 15%
- Mapping elements: C, O, F
- Measurement pixel number: 256×256 pixels
- Measurement time: 60 sec.
- Integration number: 50 times
- Luminance and contrast were adjusted so that there were no pixels attaining to the maximum luminance, and average value of brightness fell within a range of 40% to 60% of the luminance.

<Calculation of $X_1$>

$X_1$ was calculated by image analysis of the resulting image from SEM and EDX of the cross section of the positive electrode measured above, using image analysis software (ImageJ). Such particles that contained bright part, binarized based on average value of brightness value, to the resulting oxygen mapping, in an area of equal to or more than 50%, were defined as particles X of lithium carbonate, and cross-sectional area S was determined for all of the X particles observed in the cross-sectional SEM image, to determine particle diameter d calculated by the following equation (7) (circular constant is represented by π):

$$d = 2 \times (S/\pi)^{1/2} \qquad \text{equation (7)}$$

Volume average particle diameter $X_0$ was determined by the following equation (8), using the resulting particle diameter d:

$$X_0 = \Sigma[4/3\pi \times (d/2)^3 \times d]/\Sigma[4/3\pi \times (d/2)^3] \qquad \text{equation (8)}$$

Average particle diameter $X_1$, which is an average value of $X_0$, was found to be 3.5 μm, by measurement of 5 points in total, by changing view field of the cross-section of the positive electrode.

<Examples 3-2 to 3-42, as Well as Comparative Examples 3-1 to 3-10>

Nonaqueous lithium-type storage elements of Examples 3-2 to 3-42, and Comparative Examples 3-1 to 3-10 were prepared similarly as in Example 3-1, except for setting preparation conditions of the nonaqueous lithium-type storage elements, each as shown in the following Table 8, and various kinds of evaluations were carried out. Evaluation results of the resulting nonaqueous lithium-type storage elements are shown in the following Table 9.

TABLE 8

| | Positive electrode precursor | | | | | Electrolytic solution | | | | | Immersion condition of aluminum compound | | Doping |
| --- | --- | --- | --- | --- | --- | --- | --- | --- | --- | --- | --- | --- | --- |
| | Lithium compound | | | | | Lithium salt A | | Lithium salt B | | Lithium salt | | | |
| | Active material | Type | Particle diameter (μm) | Coating solution composition | Negative electrode | Type | Molar concentration $M_A$ (mol/L) | Type | Molar concentration $M_B$ (mol/L) | composition ratio $M_A/(M_A + M_B)$ | Temperature | Time (h) | Time (h) |
| Example 3-1 | Activated carbon 1 | Lithium carbonate 3 | 5.1 | a | Negative electrode 2 | Salt A1 | 0.9 | Salt B1 | 0.3 | 0.75 | 45 | 5 | 72 |
| Example 3-2 | Activated carbon 1 | Lithium carbonate 3 | 5.1 | a | Negative electrode 3 | Salt A1 | 0.9 | Salt B1 | 0.3 | 0.75 | 45 | 5 | 72 |
| Example 3-3 | Activated carbon 1 | Lithium carbonate 3 | 5.1 | a | Negative electrode 3 | Salt A1 | 0.9 | Salt B1 | 0.3 | 0.75 | 45 | 5 | 72 |
| Example 3-4 | Activated carbon 1 | Lithium carbonate 3 | 5.1 | a | Negative electrode 1 | Salt A1 | 0.9 | Salt B1 | 0.3 | 0.75 | 45 | 5 | 72 |
| Example 3-5 | Activated carbon 2 | Lithium carbonate 3 | 5.1 | a | Negative electrode 2 | Salt A1 | 0.9 | Salt B1 | 0.3 | 0.75 | 45 | 5 | 72 |
| Example 3-6 | Activated carbon 2 | Lithium carbonate 3 | 5.1 | a | Negative electrode 3 | Salt A1 | 0.9 | Salt B1 | 0.3 | 0.75 | 45 | 5 | 200 |
| Example 3-7 | Activated carbon 2 | Lithium carbonate 3 | 5.1 | a | Negative electrode 3 | Salt A1 | 0.9 | Salt B1 | 0.3 | 0.75 | 45 | 5 | 170 |
| Example 3-8 | Activated carbon 2 | Lithium carbonate 3 | 5.1 | a | Negative electrode 3 | Salt A1 | 0.9 | Salt B1 | 0.3 | 0.75 | 45 | 5 | 130 |
| Example 3-9 | Activated carbon 2 | Lithium carbonate 3 | 5.1 | a | Negative electrode 3 | Salt A1 | 0.9 | Salt B1 | 0.3 | 0.75 | 45 | 5 | 100 |
| Example 3-10 | Activated carbon 2 | Lithium carbonate 3 | 5.1 | a | Negative electrode 3 | Salt A1 | 0.9 | Salt B1 | 0.3 | 0.75 | 45 | 5 | 60 |
| Example 3-11 | Activated carbon 2 | Lithium carbonate 3 | 5.1 | a | Negative electrode 3 | Salt A1 | 0.9 | Salt B1 | 0.3 | 0.75 | 45 | 5 | 50 |
| Example 3-12 | Activated carbon 2 | Lithium carbonate 3 | 5.1 | b | Negative electrode 3 | Salt A1 | 0.9 | Salt B1 | 0.3 | 0.75 | 45 | 5 | 40 |
| Example 3-13 | Activated carbon 2 | Lithium carbonate 3 | 5.1 | b | Negative electrode 3 | Salt A1 | 0.9 | Salt B1 | 0.3 | 0.75 | 45 | 5 | 30 |
| Example 3-14 | Activated carbon 2 | Lithium carbonate 3 | 5.1 | b | Negative electrode 3 | Salt A1 | 0.9 | Salt B1 | 0.3 | 0.75 | 45 | 5 | 24 |
| Example 3-15 | Activated carbon 2 | Lithium carbonate 3 | 5.1 | a | Negative electrode 3 | Salt A1 | 0.9 | Salt B1 | 0.3 | 0.75 | 25 | 1 | 72 |
| Example 3-16 | Activated carbon 2 | Lithium carbonate 3 | 5.1 | a | Negative electrode 3 | Salt A1 | 0.9 | Salt B1 | 0.3 | 0.75 | 25 | 5 | 72 |
| Example 3-17 | Activated carbon 2 | Lithium carbonate 3 | 5.1 | a | Negative electrode 3 | Salt A1 | 0.9 | Salt B1 | 0.3 | 0.75 | 25 | 10 | 72 |
| Example 3-18 | Activated carbon 2 | Lithium carbonate 3 | 5.1 | a | Negative electrode 3 | Salt A1 | 0.9 | Salt B1 | 0.3 | 0.75 | 45 | 2 | 72 |
| Example 3-19 | Activated carbon 2 | Lithium carbonate 3 | 5.1 | a | Negative electrode 3 | Salt A1 | 0.9 | Salt B1 | 0.3 | 0.75 | 45 | 7 | 72 |
| Example 3-20 | Activated carbon 2 | Lithium carbonate 3 | 5.1 | a | Negative electrode 3 | Salt A1 | 0.9 | Salt B1 | 0.3 | 0.75 | 45 | 10 | 72 |
| Example 3-21 | Activated carbon 2 | Lithium carbonate 3 | 5.1 | a | Negative electrode 3 | Salt A1 | 0.9 | Salt B1 | 0.3 | 0.75 | 45 | 15 | 72 |

TABLE 8-continued

| | Positive electrode precursor | | | | | Electrolytic solution | | | | | Immersion condition of aluminum compound | | Doping |
| --- | --- | --- | --- | --- | --- | --- | --- | --- | --- | --- | --- | --- | --- |
| | Active material | Lithium compound Type | Particle diameter (μm) | Coating solution composition | Negative electrode | Lithium salt A Type | Molar concentration M_A (mol/L) | Lithium salt B Type | Molar concentration M_B (mol/L) | Lithium salt composition ratio M_A/(M_A + M_B) | Temperature | Time (h) | Time (h) |
| Example 3-22 | Activated carbon 2 | Lithium carbonate 3 | 5.1 | a | Negative electrode 3 | Salt A1 | 0.9 | Salt B1 | 0.3 | 0.75 | 45 | 20 | 72 |
| Example 3-23 | Activated carbon 2 | Lithium carbonate 3 | 5.1 | a | Negative electrode 3 | Salt A1 | 0.9 | Salt B1 | 0.3 | 0.75 | 45 | 25 | 72 |
| Example 3-24 | Activated carbon 2 | Lithium carbonate 3 | 5.1 | a | Negative electrode 3 | Salt A1 | 0.0 | Salt B1 | 1.2 | 0.00 | 45 | 5 | 72 |
| Example 3-25 | Activated carbon 2 | Lithium carbonate 3 | 5.1 | a | Negative electrode 3 | Salt A1 | 0.1 | Salt B1 | 1.1 | 0.08 | 45 | 5 | 72 |
| Example 3-26 | Activated carbon 2 | Lithium carbonate 3 | 5.1 | a | Negative electrode 3 | Salt A1 | 0.15 | Salt B1 | 1.05 | 0.13 | 45 | 5 | 72 |
| Example 3-27 | Activated carbon 2 | Lithium carbonate 3 | 5.1 | a | Negative electrode 3 | Salt A1 | 0.25 | Salt B1 | 0.95 | 0.21 | 45 | 5 | 72 |
| Example 3-28 | Activated carbon 2 | Lithium carbonate 3 | 5.1 | a | Negative electrode 3 | Salt A1 | 0.6 | Salt B1 | 0.6 | 0.50 | 45 | 5 | 72 |
| Example 3-29 | Activated carbon 2 | Lithium carbonate 3 | 5.1 | a | Negative electrode 3 | Salt A1 | 0.7 | Salt B1 | 0.5 | 0.58 | 45 | 5 | 72 |
| Example 3-30 | Activated carbon 2 | Lithium carbonate 3 | 5.1 | a | Negative electrode 3 | Salt A1 | 1.0 | Salt B1 | 0.2 | 0.83 | 45 | 5 | 72 |
| Example 3-31 | Activated carbon 2 | Lithium carbonate 3 | 5.1 | a | Negative electrode 3 | Salt A1 | 1.2 | Salt B1 | 0 | 1.00 | 45 | 5 | 72 |
| Example 3-32 | Activated carbon 2 | Lithium carbonate 3 | 5.1 | b | Negative electrode 3 | Salt A2 | 0.9 | Salt B1 | 0.3 | 0.75 | 45 | 5 | 72 |
| Example 3-33 | Activated carbon 2 | Lithium carbonate 3 | 5.1 | b | Negative electrode 3 | Salt A1 | 0.9 | Salt B2 | 0.3 | 0.75 | 45 | 5 | 72 |
| Example 3-34 | Activated carbon 2 | Lithium carbonate 3 | 5.1 | b | Negative electrode 3 | Salt A1 | 0.9 | Salt B3 | 0.3 | 0.75 | 45 | 5 | 72 |
| Example 3-35 | Activated carbon 2 | Lithium carbonate 3 | 1.00 | a | Negative electrode 2 | Salt A1 | 0.9 | Salt B1 | 0.3 | 0.75 | 45 | 5 | 72 |
| Example 3-36 | Activated carbon 2 | Lithium carbonate 3 | 1.20 | a | Negative electrode 2 | Salt A1 | 0.9 | Salt B1 | 0.3 | 0.75 | 45 | 5 | 72 |
| Example 3-37 | Activated carbon 2 | Lithium carbonate 3 | 1.30 | a | Negative electrode 2 | Salt A1 | 0.9 | Salt B1 | 0.3 | 0.75 | 45 | 5 | 72 |
| Example 3-38 | Activated carbon 2 | Lithium carbonate 3 | 7.10 | a | Negative electrode 2 | Salt A1 | 0.9 | Salt B1 | 0.3 | 0.75 | 45 | 5 | 72 |
| Example 3-39 | Activated carbon 2 | Lithium carbonate 3 | 11.50 | a | Negative electrode 2 | Salt A1 | 0.9 | Salt B1 | 0.3 | 0.75 | 45 | 5 | 72 |
| Example 3-40 | Activated carbon 2 | Lithium carbonate 3 | 13.5 | a | Negative electrode 2 | Salt A1 | 0.9 | Salt B1 | 0.3 | 0.75 | 45 | 5 | 72 |
| Example 3-41 | Activated carbon 2 | Lithium carbonate 3 | 17.5 | a | Negative electrode 2 | Salt A1 | 0.9 | Salt B1 | 0.3 | 0.75 | 45 | 5 | 72 |
| Example 3-42 | Activated carbon 2 | Lithium oxide | 5.1 | a | Negative electrode 2 | Salt A1 | 0.9 | Salt B1 | 0.3 | 0.75 | 45 | 5 | 72 |
| Comparative Example 3-1 | Activated carbon 2 | Lithium carbonate 3 | 5.1 | a | Negative electrode 3 | Salt A1 | 0.9 | Salt B1 | 0.3 | 0.75 | 45 | 5 | 300 |

TABLE 8-continued

| | Positive electrode precursor | | | | | Electrolytic solution | | | | | Immersion condition of aluminum compound | | Doping |
| --- | --- | --- | --- | --- | --- | --- | --- | --- | --- | --- | --- | --- | --- |
| | | Lithium compound | | | | Lithium salt A | | Lithium salt B | | Lithium salt | | | |
| | Active material | Type | Particle diameter (μm) | Coating solution composition | Negative electrode | Type | Molar concentration $M_A$ (mol/L) | Type | Molar concentration $M_B$ (mol/L) | composition ratio $M_A/(M_A + M_B)$ | Temperature | Time (h) | Time (h) |
| Comparative Example 3-2 | Activated carbon 2 | Lithium carbonate 3 | 5.1 | b | Negative electrode 3 | Salt A1 | 0.9 | Salt B1 | 0.3 | 0.75 | 45 | 5 | 10 |
| Comparative Example 3-3 | Activated carbon 2 | Lithium carbonate 3 | 5.1 | b | Negative electrode 3 | Salt A1 | 0.9 | Salt B1 | 0.3 | 0.75 | 25 | 0 | 72 |
| Comparative Example 3-4 | Activated carbon 2 | Lithium carbonate 3 | 5.1 | b | Negative electrode 3 | Salt A1 | 0.9 | Salt B1 | 0.3 | 0.75 | 45 | 40 | 72 |
| Comparative Example 3-5 | Activated carbon 2 | Lithium carbonate 3 | 0.8 | a | Negative electrode 3 | Salt A1 | 0.9 | Salt B1 | 0.3 | 0.75 | 25 | 0 | 72 |
| Comparative Example 3-6 | Activated carbon 2 | Lithium carbonate 3 | 5.1 | b | Negative electrode 3 | Salt A1 | 0.9 | Salt B1 | 0.3 | 0.75 | 45 | 45 | 10 |
| Comparative Example 3-7 | Activated carbon 2 | Lithium carbonate 3 | 5.1 | b | Negative electrode 3 | Salt A1 | 0.9 | Salt B1 | 0.3 | 0.75 | 25 | 0 | 10 |
| Comparative Example 3-8 | Activated carbon 2 | Lithium carbonate 3 | 5.1 | a | Negative electrode 3 | Salt A1 | 0.9 | Salt B1 | 0.3 | 0.75 | 45 | 45 | 300 |
| Comparative Example 3-9 | Activated carbon 2 | Lithium carbonate 3 | 5.1 | a | Negative electrode 3 | Salt A1 | 0.9 | Salt B1 | 0.3 | 0.75 | 25 | 0 | 300 |
| Comparative Example 3-10 | Activated carbon 2 | — | — | c | Negative electrode 3 | Salt A1 | 0.9 | Salt B1 | 0.3 | 0.75 | 45 | 5 | 72 |

TABLE 9

| | Positive electrode | | Electrolytic solution | Initial character-istics Ra · F (ΩF) | Storage test | | Cycle test Re/Ra |
|---|---|---|---|---|---|---|---|
| | Lithium compound (% by weight) | Average particle diameter of lithium compound X1 (μm) | Aluminum concentration (ppm) | | Rd/Ra | Gas amount (×10^(−3) cc/F) | |
| Example 3-1 | 10.0 | 3.5 | 51 | 1.41 | 2.56 | 16.0 | 1.77 |
| Example 3-2 | 9.4 | 3.1 | 48 | 1.27 | 2.87 | 18.1 | 1.68 |
| Example 3-3 | 11.4 | 4.1 | 46 | 1.73 | 2.45 | 15.6 | 1.86 |
| Example 3-4 | 10.3 | 3.7 | 52 | 1.34 | 2.63 | 16.6 | 1.52 |
| Example 3-5 | 9.6 | 3.5 | 51 | 1.12 | 2.86 | 18.3 | 1.67 |
| Example 3-6 | 1.1 | 3.2 | 47 | 1.00 | 2.97 | 19.6 | 1.69 |
| Example 3-7 | 2 | 3.6 | 46 | 1.02 | 2.95 | 19.2 | 1.67 |
| Example 3-8 | 2.7 | 3.8 | 50 | 1.03 | 2.93 | 18.9 | 1.64 |
| Example 3-9 | 6.1 | 3.9 | 52 | 1.04 | 2.89 | 18.6 | 1.66 |
| Example 3-10 | 14.6 | 4.1 | 49 | 1.06 | 2.83 | 17.9 | 1.63 |
| Example 3-11 | 24.2 | 4.2 | 51 | 1.09 | 2.75 | 17.5 | 1.65 |
| Example 3-12 | 27 | 3.8 | 50 | 1.10 | 2.68 | 17.0 | 1.68 |
| Example 3-13 | 43 | 4.4 | 47 | 1.11 | 2.65 | 16.8 | 1.67 |
| Example 3-14 | 49 | 4.7 | 49 | 1.12 | 2.58 | 16.3 | 1.66 |
| Example 3-15 | 9.9 | 3.5 | 1.2 | 1.10 | 2.94 | 19.7 | 1.16 |
| Example 3-16 | 10.1 | 3.8 | 3 | 1.14 | 2.92 | 19.5 | 1.21 |
| Example 3-17 | 10.2 | 3.6 | 6 | 1.09 | 2.91 | 19.2 | 1.60 |
| Example 3-18 | 9.7 | 3.7 | 11 | 1.08 | 2.88 | 18.8 | 1.65 |
| Example 3-19 | 10.0 | 3.9 | 65 | 1.11 | 2.83 | 18.0 | 1.69 |
| Example 3-20 | 10.6 | 3.8 | 147 | 1.15 | 2.75 | 17.5 | 1.70 |
| Example 3-21 | 10.4 | 3.4 | 173 | 1.14 | 2.68 | 17.0 | 1.71 |
| Example 3-22 | 9.7 | 3.5 | 197 | 1.12 | 2.63 | 16.7 | 1.73 |
| Example 3-23 | 10.1 | 3.6 | 289 | 1.13 | 2.58 | 16.4 | 1.75 |
| Example 3-24 | 9.4 | 3.3 | 48 | 1.03 | 2.46 | 16.4 | 2.32 |
| Example 3-25 | 9.8 | 3.1 | 53 | 1.08 | 2.50 | 16.5 | 2.23 |
| Example 3-26 | 9.6 | 3.6 | 50 | 1.10 | 2.54 | 16.8 | 1.71 |
| Example 3-27 | 9.7 | 3.5 | 52 | 1.12 | 2.63 | 17.2 | 1.66 |
| Example 3-28 | 9.9 | 3.7 | 49 | 1.19 | 2.81 | 18.5 | 1.65 |
| Example 3-29 | 10.2 | 3.8 | 52 | 1.28 | 2.84 | 18.9 | 1.65 |
| Example 3-30 | 8.9 | 3.6 | 50 | 1.32 | 2.87 | 19.1 | 1.64 |
| Example 3-31 | 9.4 | 3.4 | 49 | 2.31 | 3.23 | 28.9 | 1.61 |
| Example 3-32 | 9.2 | 3.2 | 51 | 2.32 | 2.87 | 18.4 | 1.66 |
| Example 3-33 | 9.5 | 3.5 | 53 | 1.85 | 2.89 | 18.9 | 1.71 |
| Example 3-34 | 9.6 | 3.3 | 48 | 1.89 | 2.91 | 19.2 | 1.79 |
| Example 3-35 | 10.1 | 0.05 | 50 | 2.65 | 2.61 | 16.2 | 2.89 |
| Example 3-36 | 10.5 | 0.12 | 53 | 1.30 | 2.65 | 16.8 | 1.61 |
| Example 3-37 | 10.4 | 0.52 | 51 | 1.35 | 2.64 | 16.6 | 1.55 |
| Example 3-38 | 10.6 | 4.70 | 54 | 1.37 | 2.71 | 16.8 | 1.52 |
| Example 3-39 | 9.7 | 8.00 | 53 | 1.39 | 2.66 | 16.8 | 1.49 |
| Example 3-40 | 9.6 | 9.5 | 52 | 1.41 | 2.60 | 16.3 | 1.45 |
| Example 3-41 | 9.9 | 13.0 | 50 | 2.78 | 2.61 | 16.4 | 2.78 |
| Example 3-42 | 10.1 | 3.5 | 57 | 1.72 | 2.86 | 18.9 | 1.54 |
| Comparative Example 3-1 | 0.5 | 3.0 | 48 | 1.06 | 5.87 | 58.2 | 1.69 |
| Comparative Example 3-2 | 52.1 | 4.8 | 51 | 3.72 | 2.68 | 16.9 | 1.71 |
| Comparative Example 3-3 | 9.9 | 3.3 | 0 | 1.12 | 5.94 | 59.8 | 1.71 |
| Comparative Example 3-4 | 10.2 | 3.5 | 350 | 3.87 | 2.71 | 17.4 | 3.59 |
| Comparative Example 3-5 | 0.5 | 0.4 | 0 | 1.23 | 7.43 | 74.2 | 4.12 |
| Comparative Example 3-6 | 52.2 | 4.8 | 361 | 4.51 | 4.67 | 45.3 | 4.32 |
| Comparative Example 3-7 | 51.8 | 4.6 | 0 | 3.56 | 5.64 | 58.1 | 1.81 |
| Comparative Example 3-8 | 0.7 | 3.5 | 336 | 2.34 | 5.81 | 57.4 | 3.95 |
| Comparative Example 3-9 | 0.6 | 4.1 | 0 | 2.54 | 5.86 | 58.2 | 1.75 |
| Comparative Example 3-10 | 0 | — | 48 | 6.53 | 1.72 | 19.1 | 4.61 |

Abbreviated designations in Table 8 mean, each as follows.
[Lithium Salts]
Salt A1: LiPF$_6$
Salt A2: LiBF$_4$
Salt B1: LiN(SO$_2$F)$_2$
Salt B2: LiN(SO$_2$CF$_3$)$_2$
Salt B3: LiN(SO$_2$C$_2$F$_5$)$_2$ From the above Examples, it has been verified that the storage element of the present embodiment is the nonaqueous lithium-type storage element superior in initial I/O characteristics, charging and discharging cycle characteristics under high load, and storage durability at high temperature.

INDUSTRIAL APPLICABILITY

The nonaqueous lithium-type storage element of the present invention is capable of preparing the storage module, for example, by connection of multiple pieces of the nonaqueous lithium storage elements in series or in parallel. The nonaqueous lithium-type storage element and the storage module of the present invention can be utilized suitably in various power storage systems, for example, in a power regeneration system in an automotive hybrid drive system, where charging and discharging cycle characteristics under high load is required; a power load smoothing system in natural power generation, such as solar power generation, wind power generation, etc., or microgrid, etc.; an uninterruptible power source system in production facility of a plant, etc.; a non-contact power supply system aiming at microwave power transmission, smoothing of voltage variation of, such as electrolytic resonance, etc., and energy storage; an energy harvest system aiming at utilization of power generated by vibration power generation, etc.

The nonaqueous lithium-type storage element of the present invention is preferable, because effect of the present invention is expressed at the maximum, when applied, for example, as the lithium ion capacitor or the lithium ion secondary battery.

What is claimed is:

1. A nonaqueous lithium-type storage element, comprising a positive electrode containing a lithium compound other than a positive electrode active material, a negative electrode, a separator, and a nonaqueous electrolytic solution containing lithium ions,
    wherein the positive electrode comprises a positive electrode power collector, and a positive electrode active material layer located at one surface or both surfaces of the positive electrode power collector, and containing the positive electrode active material,
    the negative electrode comprises a negative electrode power collector, and a negative electrode active material layer located at one surface or both surfaces of the negative electrode power collector, and containing the negative electrode active material,
    $2 \leq C \leq 300$, where C (ppm) is concentration of Na and/or K element, contained in the positive electrode active material layer, and
    $1.0 \leq D \leq 15$, $10 \leq E \leq 100$, $0.2 \leq C/D \leq 38$, and $0.1 \leq C/E \leq 7.2$, where D (g/m$^2$) is basis weight of the lithium compound other than the positive electrode active material, contained in the positive electrode active material layer, per one surface of the positive electrode, and E (g/m$^2$) is basis weight of the positive electrode active material contained in the positive electrode active material layer, per one surface of the positive electrode.

2. The nonaqueous lithium-type storage element according to claim 1, wherein the lithium compound is lithium carbonate.

3. The nonaqueous lithium-type storage element according to claim 1, wherein the concentration C is $2.5 \leq C \leq 300$.

4. The nonaqueous lithium-type storage element according to claim 1, wherein $0.01 \leq D/E \leq 0.52$.

5. The nonaqueous lithium-type storage element according to claim 1, wherein A$_1$ is 40% to 99%, where A$_1$ is area overlap ratio of fluorine mapping to oxygen mapping, binarized based on average value of brightness, in an element mapping obtained using SEM-EDX of the surface of the positive electrode.

6. The nonaqueous lithium-type storage element according to claim 1, wherein A$_2$ is 10% to 60%, where A$_2$ is area overlap ratio of fluorine mapping to oxygen mapping, binarized based on average value of brightness, in the element mapping obtained using SEM-EDX of the cross-section of the BIB processed positive electrode.

7. The nonaqueous lithium-type storage element according to claim 1, wherein
    (h) Fe/F is 1.01 or higher,
        where Fe (F) is static capacitance after carrying out charging and discharging cycle 60,000 times under an environmental temperature of 25° C., a cell voltage of from 2.2 V to 3.8 V, a rate of an electric current value of 200C, and subsequently carrying out charging under a constant voltage of 4.5 V for 1 hour, and F (F) is static capacitance before the charging and discharging cycle, for the nonaqueous lithium-type storage element.

8. The nonaqueous lithium-type storage element according to claim 1, using a positive electrode precursor comprising the positive electrode active material layer containing the positive electrode active material containing activated carbon, and the lithium compound other than the positive electrode active material, wherein $20 \leq C_0 \leq 1300$ ppm, where C$_0$(ppm) is concentration of Na and/or K element contained in the positive electrode active material layer of the positive electrode precursor; $8.0 \leq D_0 \leq 50.0$, where D$_0$ (g/m$^2$) is basis weight of the lithium compound other than the positive electrode active material contained in the positive electrode active material layer, per one surface of the positive electrode precursor; $10 \leq E_0 \leq 100$, $0.2 \leq C_0/D_0 \leq 38$, and $0.1 \leq C_0/E_0 \leq 7.2$, where E$_0$ (g/m$^2$) is basis weight of the positive electrode active material contained in the positive electrode active material layer, per one surface of the positive electrode precursor.

9. The nonaqueous lithium-type storage element according to claim 1, wherein $1.00 \leq C_1/C_2 \leq 15.00$, where C$_1$(ppm) is concentration of Na and/or K element contained in the negative electrode active material layer, and C$_2$(ppm) is concentration of Na and/or K element contained in the electrolytic solution,
    the lithium compound is one or more compounds selected from lithium carbonate, lithium oxide, lithium hydroxide, lithium fluoride, lithium chloride, lithium bromide, lithium iodide, lithium nitride, lithium oxalate, and lithium acetate,
    $0.1\ \mu m \leq X_1 \leq 10\ \mu m$, where X$_1$ is average particle diameter of the lithium compound, $2\ \mu m \leq Y_1 \leq 20\ \mu m$, and $X_1 < Y_1$, where Y$_1$ is average particle diameter of the positive electrode active material, and an amount of the lithium compound contained in the positive electrode is 1% by weight to 50% by weight, based on the total weight of the positive electrode active material layer.

10. The nonaqueous lithium-type storage element according to claim 9, wherein an amount of lithium, calculated from an area of peaks in -40 ppm to 40 ppm, in a solid $^7$Li-NMR spectrum of the positive electrode active material layer, is $10.0 \times 10^{-4}$ mol/g to $300 \times 10^{-4}$ mol/g.

11. The nonaqueous lithium-type storage element according to claim 9, wherein the nonaqueous electrolytic solution contains at least one organic solvent selected from ethylene carbonate, propylene carbonate, butylene carbonate, vinylene carbonate and fluoroethylene carbonate.

12. The nonaqueous lithium-type storage element according to claim 9, wherein the nonaqueous electrolytic solution contains at least one of $LiPF_6$ and $LiBF_4$.

13. The nonaqueous lithium-type storage element according to claim 9, wherein concentration of $LiN(SO_2F)_2$ in the nonaqueous electrolytic solution is 0.3 mol/L to 1.5 mol/L, based on the total amount of the nonaqueous electrolytic solution.

14. The nonaqueous lithium-type storage element according to claim 9, wherein the positive electrode power collector and the negative electrode power collector are metal foils not having through holes.

15. The nonaqueous lithium-type storage element according to claim 9, wherein
(a) Ra·F, that is a product of Ra and F, is 0.3 to 3.0,
(b) E/V is 15 to 50,
where Ra($\Omega$) is initial inner resistance at a cell voltage of 4 V, F(F) is static capacitance, E(Wh) is electric energy, and V(L) is volume of a casing containing an electrode laminated body, in the nonaqueous lithium-type storage element.

16. The nonaqueous lithium-type storage element according to claim 9, wherein
(e) Rd/Ra is 0.9 to 3.0,
(g) Re/Ra is 0.9 to 2.0
where Ra ($\Omega$) is initial inner resistance at a cell voltage of 4 V, F (F) is static capacitance, Rd($\Omega$) is inner resistance at 25° C., after storage for 2 months at a cell voltage of 4 V and an environmental temperature of 60° C., and Re($\Omega$) is inner resistance after carrying out charging and discharging cycle 60,000 times under an environmental temperature of 25° C., a cell voltage of from 2.2 V to 3.8 V, and a rate of 300C, in the nonaqueous lithium-type storage element.

17. The nonaqueous lithium-type storage element according to claim 1, wherein
the negative electrode active material contains a carbon material, which is capable of intercalating/releasing lithium ions,
the positive electrode active material contains activated carbon,
the positive electrode contains the lithium compound other than the positive electrode active material in an amount of 1% by weight to 50% by weight, based on the total weight of the positive electrode active material layer,
Al concentration of the nonaqueous electrolytic solution is 1 ppm to 300 ppm.

18. The nonaqueous lithium-type storage element according to claim 7, wherein the nonaqueous electrolytic solution further contains a lithium salt of
(A) at least one of $LiPF_6$ and $LiBF_4$; as well as
(B) at least one of $LiN(SO_2F)_2$, $LiN(SO_2CF_3)_2$, and $LiN(SO_2C_2F_5)_2$.

19. The nonaqueous lithium-type storage element according to claim 18, wherein molar concentration ratio $M_A/(M_A+M_B)$ is in a range of from 1/10 to 9/10, where $M_A$ (mol/L) is the total molar concentration of the (A), and $M_B$ (mol/L) is the total molar concentration of the (B), based on the total amount of the nonaqueous electrolytic solution.

20. The nonaqueous lithium-type storage element according to claim 19, wherein molar concentration ratio $M_A/M_B$ of the lithium salt is in a range of from 2/10 to 6/10.

21. The nonaqueous lithium-type storage element according to claim 18, wherein the total molar concentration $M_B$ (mol/L) of the (B) is 0.1 mol/L to 1.5 mol/L.

22. The nonaqueous lithium-type storage element according to claim 18, wherein the (A) is $LiPF_6$, and the (B) is $LiN(SO_2F)_2$.

23. The nonaqueous lithium-type storage element according to claim 17, wherein $0.1\ \mu m \leq X_1 \leq 10\ \mu m$, where $X_1$ is average particle diameter of the lithium compound other than the positive electrode active material contained in the positive electrode.

24. The nonaqueous lithium-type storage element according to claim 17, wherein the lithium compound other than the positive electrode active material contained in the positive electrode is lithium carbonate.

25. The nonaqueous lithium-type storage element according to claim 17, wherein
(a) Ra·F, that is product of Ra and F, is 0.3 to 3.0,
where Ra ($\Omega$) is initial inner resistance in normal temperature discharging, and F (F) is static capacitance, of the nonaqueous lithium-type storage element.

26. The nonaqueous lithium-type storage element according to claim 17, wherein
(e) Rd/Ra is 0.9 to 3.0,
(f) gas amount generated during storage for 2 months, under a cell voltage of 4 V, and an environmental temperature of 60° C., is $30 \times 10^{-3}$ cc/F or less, at 25° C.,
where Ra ($\Omega$) is initial inner resistance in normal temperature discharging, and Rd ($\Omega$) is inner resistance in normal temperature discharging, after storage for two months, under a cell voltage of from 4 V, and an environmental temperature of 60° C., of the nonaqueous lithium-type storage element.

27. The nonaqueous lithium-type storage element according to claim 17, wherein
(g) Re/Ra is 0.9 to 2.0,
where Ra ($\Omega$) is initial inner resistance in normal temperature discharging, and Re ($\Omega$) is inner resistance in normal temperature discharging, after carrying out charging and discharging cycle 60,000 times under an environmental temperature of 25° C., a cell voltage of from 2.2 V to 3.8 V, and a rate of 300C, of the nonaqueous lithium-type storage element.

28. The nonaqueous lithium-type storage element according to claim 1, wherein the positive electrode active material contained in the positive electrode active material layer is activated carbon, wherein $0.3<V_1\leq0.8$, and $0.5\leq V_2\leq1.0$, where $V_1$ (cc/g) is mesopore volume, derived from fine pores having a diameter of 20 Å to 500 Å, calculated by the BJH method, and V2 (cc/g) is micropore volume, derived from fine pores having a diameter of smaller than 20 Å, calculated by the MP method, and a specific surface area of the activated carbon measured by the BET method is 1,500 m$^2$/g to 3,000 m$^2$/g.

29. The nonaqueous lithium-type storage element according to claim 1, wherein the positive electrode active material contained in the positive electrode active material layer is activated carbon, wherein $0.8<V_1\leq2.5$, and $0.8<V_2\leq3.0$, where $V_1$ (cc/g) is mesopore volume, derived from fine pores having a diameter of 20 Å to 500 Å, calculated by the BJH method, and $V_2$ (cc/g) is micropore volume, derived from fine pores having a diameter of smaller than 20 Å, calculated by the MP method, and a specific surface area of the activated carbon measured by the BET method is 2,300 m²/g to 4,000 m²/g.

30. The nonaqueous lithium-type storage element according to claim 1, wherein a doping amount of lithium ions of the negative electrode active material is 530 mAh/g to 2,500 mAh/g, per unit weight of the negative electrode active material.

31. The nonaqueous lithium-type storage element according to claim 1, wherein a BET specific area of the negative electrode active material is 100 m²/g to 1500 m²/g.

32. The nonaqueous lithium-type storage element according to claim 1, wherein a doping amount of lithium ions of the negative electrode active material is 50 mAh/g to 700 mAh/g, per unit weight of the negative electrode active material.

33. The nonaqueous lithium-type storage element according to claim 1, wherein a BET specific area of the negative electrode active material is 1 m²/g to 50 m2/g.

34. The nonaqueous lithium-type storage element according to claim 1, wherein an average particle diameter of the negative electrode active material is 1 μm to 10 μm.

35. A storage module using the nonaqueous lithium-type storage element according to claim 1.

36. A power regeneration system using the nonaqueous lithium-type storage element according to claim 1.

37. A power load leveling system using the nonaqueous lithium-type storage element according to claim 1.

38. An uninterruptible power source system using the nonaqueous lithium-type storage element according to claim 1.

39. A non-contact electric supply system using the nonaqueous lithium-type storage element according to claim 1.

40. An energy harvest system using the nonaqueous lithium-type storage element according to claim 1.

41. A power storage system using the nonaqueous lithium-type storage element according to claim 1.

* * * * *